United States Patent
Laverty et al.

(10) Patent No.: US 6,791,707 B2
(45) Date of Patent: *Sep. 14, 2004

(54) AUTOMATED, HOSTED PREPRESS APPLICATIONS

(75) Inventors: Timothy A. Laverty, Seattle, WA (US); Cory E. Klatt, Edmunds, WA (US); Brent A. Krum, Redmond, WA (US); Larry G. Roy, Bothell, WA (US)

(73) Assignee: ImageX, Inc., Kirkland, WA (US)

( * ) Notice: Subject to any disclaimer, the term of this patent is extended or adjusted under 35 U.S.C. 154(b) by 157 days.

This patent is subject to a terminal disclaimer.

(21) Appl. No.: 10/004,951

(22) Filed: Dec. 3, 2001

(65) Prior Publication Data

US 2002/0191213 A1 Dec. 19, 2002

Related U.S. Application Data

(63) Continuation of application No. 09/480,866, filed on Jan. 10, 2000, now Pat. No. 6,429,947.

(51) Int. Cl.[7] ............................................. G06F 15/00
(52) U.S. Cl. ................................ 358/1.15; 358/1.1
(58) Field of Search ........................ 358/1.1, 1.9, 1.13, 358/1.15, 1.16, 1.17, 1.18, 407, 468, 500, 501, 504, 515, 518, 523, 527, 530, 537, 538, 540; 707/500, 505, 506, 517, 527, 528, 911; 382/162, 163

(56) References Cited

U.S. PATENT DOCUMENTS

| | | | |
|---|---|---|---|
| 5,029,115 A | 7/1991 | Geraci | 345/601 |
| 5,113,356 A | 5/1992 | Nickell et al. | 358/1.8 |
| 5,287,194 A | 2/1994 | Lobiondo | |

(List continued on next page.)

FOREIGN PATENT DOCUMENTS

| | | | |
|---|---|---|---|
| EP | 0537391 A1 | 4/1993 | G06F/15/24 |
| EP | 0605210 | 7/1994 | |
| EP | 0605210 B1 | 7/1994 | H04N/1/411 |
| EP | 0692763 A1 | 1/1996 | G06F/9/46 |
| EP | 0782068 A1 | 7/1997 | G06F/3/12 |
| EP | 0837401 A2 | 4/1998 | G06F/17/24 |
| EP | 0919909 | 6/1999 | |
| EP | 0919909 A1 | 6/1999 | G06F/3/13 |
| WO | WO98/08176 | 2/1998 | G06F/17/60 |

OTHER PUBLICATIONS

Beale, Stephen, "Get Prepress Ready PDFs from QuarkXPress", Macworld, Jun. 1998, Macworld Commun., USA, vol. 15, No. 6, pp. 101–103.

(List continued on next page.)

*Primary Examiner*—Gabriel Garcia

(57) ABSTRACT

An on-line automated printing system quickly produces consistent printed materials. The system includes front-end customer setup and product setup modules available on a web server. A Print Ready File is produced embodying the product to be printed. The Print Ready File is compiled and all operations on the file can be completed via reference to the information contained therein. A state flag is associated with each element of the file, the flag having states such as preview, print, both, or none. The file is stored on an asset management file server. The file (unchanged) may be previewed or printed using internal flags and logic built-in to the PostScript language. A batcher service batches print jobs. A plater service accepts the Print Ready Files and outputs a plate file to a print vendor's ordering system. Over the Internet the plate file is sent to a vendor computer. The plate file is sent to a raster image processor (RIP) which outputs a bitmap to be printed. Included within the system are any number of hosted prepress applications, each a subsystem. A client application requests processing of a file by one of the subsystems. The client sends the parameters along with input and output files to a master service. The master service selects a lower-level service for conversion. A prepress application module (with hardcoded parameters) processes the file and outputs the result.

12 Claims, 37 Drawing Sheets

U.S. PATENT DOCUMENTS

| | | | | |
|---|---|---|---|---|
| 5,581,667 | A | 12/1996 | Bloomberg | 358/1.9 |
| 5,625,766 | A | 4/1997 | Kauffman | 382/294 |
| 5,644,720 | A | 7/1997 | Boll et al. | |
| 5,666,543 | A | 9/1997 | Gartland | 715/526 |
| 5,713,032 | A | 1/1998 | Spencer | 358/1.9 |
| 5,761,392 | A | 6/1998 | Yacoub et al. | 715/505 |
| 5,813,348 | A | 9/1998 | Zingher | |
| 5,848,415 | A | 12/1998 | Guck | 358/615 |
| 5,911,776 | A | 6/1999 | Guck | |
| 5,988,899 | A | 11/1999 | Benson et al. | |
| 6,011,905 | A | 1/2000 | Huttenlocher et al. | |
| 6,012,070 | A | 1/2000 | Cheng et al. | |
| 6,049,390 | A | 4/2000 | Notredame et al. | |
| 6,055,064 | A | 4/2000 | Lifshitz et al. | 715/500 |
| 6,088,710 | A | 7/2000 | Dreyer et al. | |
| 6,205,452 | B1 | 3/2001 | Warmus et al. | |
| 6,229,623 | B1 | 5/2001 | VerMurlen | 358/1.9 |
| 6,247,011 | B1 | 6/2001 | Jecha et al. | |

OTHER PUBLICATIONS

Fuchs, W. et al., "Darstellung, Konvertierung und Farbreduktion von Rasterbildern auf Basis eines universellen Zwishchenformates", Mar. 1994, IT–TI Informationstechnik und Technische informatik, Munchen, DE, pp. 30–37.

IBM Technical Disclosure Bulletin, "Build–A–Check", 8 IBM Corp. 1991, vol. 34, No. 6, Nov., 1991.

Adobe System Incorporated, "How to Create Adobe® PDF Files for Print and Press", Copyright 1998, pp. 1–53. <http://www.adobe.com/products/postscript/pdfs/highres_book.pdf>.

Weiner, PostScript Quick Tips: Converting PostScript to EPS, copyright 1995, p. 1. <http://www.wiskit.com/postscript/quicktips/ps_to_eps.pdf>.

PostScript Language Reference Manual, Second Edition Adobe Systems Inc. Addison–Wesley Publishing Co., Inc.Dec. 1990. ISBN 0–201–18127–4.

Lawsuit: ImageX, Inc. vs. iPrint Technologies, "Complaint for Patent Infringement of U.S. Pat. No. 6,429,947".-

On-line Automated Printing System Overview

Color Washing System

DSC Header For Unwashed EPS File (with EPS file embedded in it)

%!PS-Adobe-2.0 EPSF-1.2
%%Title: UNTITLED-2
%%Creator: FreeHand 8.0
%%CreationDate: Tue Aug 31 09:46:24 1999
%%BoundingBox: 0 0 146 146
%%FHPathName:C:\WINNT\Profiles\timl\Desktop\UNTITLED-2
%ALDOriginalFile:C:\WINNT\Profiles\timl\Desktop\UNTITLED-2
%ALDBoundingBox:-149 -445 463 347
%%FHPageNum:1
%%DocumentSuppliedResources: procset Altsys_header 4.0
%%ColorUsage: Color
%%DocumentProcessColors: Black
%%EndComments
%%BeginResources: procset Altsys_header 4.0

FIG. 22

Washed Print EPS file header and footer

%!PS-Adobe-3.0 EPSF-3.0
%%Title: (UNTITLED-2)
%%Version: 1 2
%%Creator: (FreeHand 8.0)
%%CreationDate: (D:19990831161926)
%%DocumentDate: Clean7Bit
%%BoundingBox: 0 0 146 146
%%Pages: 0
%%DocumentProcessColors: (atend)
%%DocumentSuppliedResources:
%%+procset (Adobe Acrobat - PDF operators) 1.2 0
%%EndComments
%%BeginProlog
%%EndProlog
%%BeginSetup
...
Footer:
%%PageTrailer
%%EndPage
%%Trailer
%%DocumentProcessColors: Magenta Yellow Black
%%ImageX-WashStamp: 08-31-99 16:22:49
%%EOF

FIG. 23

Post Script to Bitmap Conversion Subsystem

PostScript to PDF Conversion Subsystem

AUTOMATED, HOSTED PREPRESS APPLICATIONS

CROSS-REFERENCE TO RELATED APPLICATIONS

This application is a continuation of U.S. patent application Ser. No. 09/480,866 now U.S. Pat. No. 6,429,947, filed Jan. 10, 2000 entitled "Automated, Hosted Prepress Applications", which is hereby incorpoated by reference.

This application is related to U.S. patent application Ser. No. 09/480,334 now U.S. Pat. No. 6, 633,890, U.S. patent application Ser. Nos. 09/480,821, 09/481,550, 09/480,332, 09/480,869, now U.S. Pat. No. 6,396,593, U.S. patent application Ser. Nos. 09/480,881, 09/481,372, 09/480,335, 09/480,645, 09/480,185, 09/480,987, now U.S. Pat. No. 6,559,966, U.S. patent application Ser. Nos. 09/480,980, 09/481,007, now U.S. Pat. No. 6,559,966, U.S. patent application Ser. Nos. 09/480,820, now U.S. Pat. No. 6,353,483, U.S. patent application Ser. No. 09/481,010, now U.S. Pat. No. 6,381,032, and U.S. patent application Ser. No. 09/480,333, now U.S. Pat. No. 6,362,895, all filed on Jan. 10, 2000, which are hereby incorporated by reference. This application is also related to U.S. patent application Ser. No. 09/460,307 filed Dec. 13, 1999, entitled "System and File Structure for Consistent Visual Medium Materials."

FIELD OF THE INVENTION

The present invention relates generally to a computer system for quickly and consistently producing printed materials. More specifically, the present invention relates to hosting prepress applications in a printing system that allows automation of printing.

BACKGROUND OF THE INVENTION

The existing methods of procuring printed business materials are characterized by cumbersome and labor-intensive procedures. These procedures carry with them certain inefficiencies and are often prone to error. For the majority of small to medium sized printers, the printing of business cards and stationery entails a time-consuming series of steps which generally must be repeated every time a new order is placed.

Referring to FIG. 1, a representative block diagram 100 is shown of certain steps that might be used to procure an order by a customer. While the order might consist of any textual or graphical material, a business card example is used throughout to facilitate discussion. In general, an administrator in an organization first collects data from the employee who desires the business cards. Such data includes name, title, telephone and facsimile numbers, mobile telephone number, e-mail address, etc. This data then gets sent via telephone or facsimile to the printer as shown in step 102. The printer typesets the information in step 104, and then sends back a proof to the administrator in step 106. The administrator then typically sends the proof to the employee for verification, and receives the returned proof with marked-up corrections. The proof is then sent back to the printer in step 108. The printer typesets the corrections in step 110 and sends the proof back to the customer in step 112. Steps 108–112 might be repeated several times until the customer approves the proof in step 114. After the order is final, the printer must go through several additional steps before the order is printed. For instance, the customer service department might enter the job into the printer's internal tracking and billing system. The job then goes to the prepress department in step 116 which reproduces the content into a format so that it is ready to print. The manufacturing process is applied in step 118 and the order is printed.

Getting through this series of steps with the printer usually takes several days. Seven to ten days after this process is completed, the cards are received by the employee who ordered them. Because each job is entered manually, a new order for a similar customer may not look precisely like the last one. Add the complexities of a multi-location organization (with many employees) and a relatively simple product purchase can become very complex.

Moreover, the printing of more complex items, such as full color pamphlets and brochures, results in many more iterations between the design agency, the customer and the prepress department. The iterations due to color correction and perfection of all design elements likely results in even more time required to complete the product. Despite the iterative steps described above, it is estimated that 15% to 30% of print jobs for traditional business materials arrive at the customer with errors. The propensity for errors and the general lack of consistency produced using the traditional process is due in large part to the manual nature of the task. At each step in the process the file may be opened and manipulated repeatedly, which introduces new opportunities for errors and inconsistencies.

FIG. 2 illustrates a prior art block diagram 200 of representative steps in the process and describes potential problems that may occur.

Preview

The process begins with a customer providing the print vendor with the information on the product to be composed. The customer will typically provide the information on an order form, make annotations to a physical sample, and/or communicate the data verbally. The print vendor's job is to create a layout of the sprint product for the customer to preview and approve. The print vendor will typically interpret the customer's information and compose a preview layout of the product in a publishing tool such as Pagemaker or Quark Xpress. In FIG. 2 this is shown by the print vendor computer 202 creating a preview layout file 206.

Unfortunately, this task is made more complicated by a common practice called "mastering". To control costs in printing, it is common to pre-print or "master" stock in bulk with certain static elements. In many cases the static elements are "spot color" or "process color" graphics (while the variable information is usually in a single color, often black). In order to provide a preview of what the printed product will actually look like, the preview layout must contain both the variable information and the mastered elements. Once the preview layout is completed, it is then printed and sent to the customer for their approval.

The customer then reviews the facsimile of the proof, annotates any changes, sends the proof back to the vendor via facsimile and/or communicates the changes to the vendor verbally. Once the customer approves the preview layout, the vendor begins the prepress process. It is important to note that the "preview" that the customer is approving is a facsimile copy of a low-quality printout. Because the quality is so low, it is possible (even under the best of conditions) that the final printed product may look slightly different from the proof that the customer approved. If the customer is very demanding, these differences may not be acceptable and will require that the vendor re-print the order.

A number of available software tools can be used by a human operator to create, review, and edit EPS files. However, EPS files that ultimately are output from products such as Illustrator, Quark, Pagemaker, or Photoshop all have certain differences, or eccentricities, which are difficult to account for and process on a consistent basis. Also, they do not ensure referential integrity or consistent settings for color in such files. Some checking may be done to analyze and detect problems in EPS files, however, such checking does nothing to fix or standardize an output EPS file. In addition, as described below, each time a human operator must open a file manually and review it using a particular software program there is the potential for errors to be introduced into the file.

Composition

Step 208 in FIG. 2 shows the next process step of composition. In particular, now that the customer has approved the item, the vendor must create a layout that is suitable for printing. To do this, all of the mastered elements that were included in the preview layout must be removed. This means that the vendor must open the preview layout file and manipulate the file data manually by hand. This is problematic, however, because the vendor is changing a file (or data structure) that the customer has already approved. It is possible that alterations will be made, either intentionally or accidentally, that will change the content or appearance of the product when it is finally printed. The result is the print layout file 210, as so modified.

The errors that can occur are numerous and varied. Even simple procedures can result in major problems. One simple example is the use of "keyboard shortcuts". Many professionals use a series of keyboard shortcuts (as offered by various programs) instead of a mouse to save time in performing simple tasks. These shortcuts typically require the user to press a modifier key (such as "ALT" or "CTRL") and then press the desired shortcut key. Sometimes, however, the user will mistype and accidentally end up inserting text into a document inadvertently. For example, if the user is trying to cut a graphic or piece of text from a document, the user might use the keyboard shortcut for "cut" (CRTL-X). If the user fails to fully depress the CTRL key, the letter "x" will be inserted into the document. While this a relatively straightforward problem, such mistakes might not be detected until late in the process. This might require the vendor to re-print the product, which is expensive and time-consuming. Hence, any reduction in the overall risk of introducing human intervention into the process would be advantageous.

As another representative example, the act of opening the file can lead to the common problem of "font substitution." Note that the preview layout file does not (generally) contain the font data necessary to display the text. To save space, the file simply refers to a font file that is stored on the computer used to open the document. If the computer does not have one or more of the fonts referred to by the preview layout file, the closest possible match will generally be substituted from the fonts available. This is known as "font substitution." Publishing programs may not inform the user that font substitution is taking place. If the user does not notice the swap, the substituted fonts will be saved with the new document.

When the vendor finally exports the data as a PostScript file for printing, the file will refer to the substituted fonts, not the original fonts. Sometimes the substituted fonts are very similar to the correct fonts, so they might look fine. However, in most cases the substituted fonts are significantly different, and this can cause the final printed product to look vastly different from the preview. Typical problems range from low impact results (e.g., the text looking slightly different), to severe differences (e.g., the text wrapping onto multiple lines, the text coming out completely garbled, etc.). Because final proofing will not be done until later in the process, these problems are often very costly to fix when (and if) they are eventually found.

Trapping

Trapping is a printing process used to adjust areas where two distinct colors meet so that press mis-registration will not cause white specks. Trapping can also be done during the proofing process. It would occur after layout of the product was accomplished, after graphic elements had been identified and placed, and after variable data (name, telephone, address, etc.) had been identified and placed. Trapping involves specific manipulation of certain areas in the file. As in composition, if the file is manually manipulated there is the potential for error. The trapping process produces a trapped file 207.

Imposition

Step 212 next shows the imposition being performed and is used to create an imposed layout file 214. Imposition is the process of preparing the print layout for production on a press. The main goal of imposition is to arrange multiple pages and/or images in the proper order for efficient printing. For example, it is far more efficient to impose four or more business cards onto a single plate than to print each business card individually. The imposition process also requires the addition of elements such as crop marks, registration marks, fold marks, color bars, die marks, and the like to the original print layout file. Imposition can be performed manually or via an automated program. Again, manually opening the file to perform imposition can lead to problems.

Color Separation

Color separation, as shown in step 216, is the process of separating a color image into a series of single color images that will be used to produce plates. When each single-color plate is printed on top of one another, the result is a composite color image. The color separation step produces an imposed color separated file 218.

In many cases color separation is performed by a raster image processor (RIP). Sometimes, however, the imposed layout file must be color separated prior to the RIP, which means that the vendor must use another software program. In such cases, errors including font and graphic substitution can occur just as they did in the composition and imposition stages.

Printing

Once an imposed color separated file is produced it is converted 220 into PostScript resulting in a plate file 222, for processing by an RIP 224. There are many techniques used to create PostScript files. Depending on the workflow employed by the print vendor, the PostScript file may include font subsetting as well as OPI comments that are processed by the RIP device. In either of these cases, it is possible to introduce font and graphic substitution errors. The output from the RIP (which is generally a bitmap file) is sent to an output device 226, which might include a recorder or image setter. The output device 226 places the image on a medium to be used by the press device 228. Alternatively, the binary file 230 could be received directly by a digital press device 232 for printing.

Prior Electronic Solutions

Based upon the above-described problems with the traditional process, different prior electronic solutions have been proposed. While such solutions have attempted to solve the consistency problem in processing a print job, they have generally proven to be insufficient. Below are detailed certain example solutions, and problems associated with each solution.

One proposed solution includes attempting to automate the process of preview and print layout generation by writing custom plug-ins to commercially-available publishing programs such as Quark XPress or Adobe PageMaker. One drawback to this solution is that the modified software cannot generally keep track of which elements in a layout are mastered and which are not. This means that at least two PostScript files must be generated, one for the preview layout and one for the print layout. Also, the modified software lacks the ability to store special production information in the PostScript file, such as ink codes, stock information, and other details. The overall solution therefore relies on humans to properly recall this information, or the solution must retrieve such information from yet another document, without any assurance of the accuracy of the production information in the other document. Moreover, these systems do not maintain a reference for standard corporate design or procurement rules for printed matter, and as such are prone to error and not susceptible to automated validation.

Another solution involves using Open Prepress Interface, or OPI. The *OPI Specification* 1.3 from Adobe Corporation defines the Open Prepress Interface as a collection of PostScript-language comment conventions that allows a page-layout program to use low- or medium-resolution TIFF images for layout and proofing, and have a prepress system or OPI server automatically substitute a high resolution TIFF or other image when the final film or plates are generated. Both desktop prepress software and high-end prepress systems can use OPI comments to minimize network traffic and image storage requirements.

Certain functionality is desired, however, which OPI does not inherently provide. Example of such drawbacks include the following. OPI does not generate preview or print layouts. It simply provides a low-resolution file for display on screen and then provides a high-resolution counterpart that is used when it comes time to print. Also, OPI itself cannot determine whether the system is printing the preview layout or the print layout. Moreover, even if OPI could discern which layout it is printing, it lacks the logic to decide which image to use in which situation. Further, OPI only works for graphic images; it cannot be used to control text data.

Still other processes have tried to solve the consistency problem by using a simple Internet solution. Such solutions involve an on-line web site for product ordering that also generates a low-resolution bitmap of preview images that are displayed to the customer at order time for approval. One drawback of these solutions is that their bitmap file formats are unable to differentiate between mastered and non-mastered elements such as graphics or text, so the system must generate one low-resolution bitmap image for preview and another high-resolution image for the other stages of the production process. Also, the bitmap images used in these solutions cannot store production-specific information such as ink codes, stock information, and other details. Hence, such solutions generally reproduce the problems associated with the traditional process, but in a computer-controlled environment.

Still another solution might involve an implementation using some form of programming language. PostScript (for instance) is a programming language for imaging devices. Many solutions propose using some form of PostScript programming. However, it should be noted that the PostScript language, by itself, does not constitute a complete solution to the aforementioned problems. For example, the PostScript language does not contain any concept that differentiates between preview and print elements and cannot automatically solve the problems with consistency in the print process.

Prepress Software Applications

To sum up, then, a traditional print ordering process entails the follow steps: 1) a customer contacts a vendor with a requested print job; 2) the customer provides art, variable data information, and product specifications (inks, layout, etc.) for the product; 3) the vendor creates the order, passing proofs to the customer for approval; 4) the customer approves the proof, and a print order quantity is established; 5) the vendor manually outputs PostScript using a desktop publishing program; 6) the vendor manually traps PostScript as necessary; 7) the vendor manually imposes PostScript either using a software imposition program or by stripping film manually; 8) the vendor manually color separates PostScript; 9) the vendor uses a raster image processor on the PostScript to produce film; and 10) the vendor creates physical plate files and executes a press run, thus creating a printed product.

The prepress applications (such as color washing, trapping, imposition, color separation, PostScript to bitmap conversion, PostScript to PDF conversion, PDF to PostScript conversion, and others) that might be used in this traditional print ordering process are all implemented manually. For example, many steps are performed by a "stripper," a knowledgeable person in the prepress industry who manipulates film directly. As mentioned above, when a human operator manually runs a prepress application to process a file there is a great potential for error. For one, because of the subjective nature of the process, the operator may inadvertently make a mistake. Also, similar printed materials may not be consistent because the operator may unknowingly use different settings when a job is processed over and over again. There is no standard format or automated way for the operator to save particular settings for a job to be run under a certain prepress application. In general, there is a need for more certainty, consistency, and standardization in the use of prepress software applications. Customers could also benefit from a system and technique that would provide greater scalability and greater speed in the processing of printing orders.

A number of available software tools can be used by a human operator to manually perform a prepress application, but each has its own quirks and eccentricities. In addition, settings of parameters for these applications are all set through proprietary user interfaces in each product. Settings specified by human hands introduces the possibility for errors in the process as each new job may be variable according to the user's choice. Also, conversion can take a variable length of time (possibly hours) depending on which settings are used, any changes needed, any proofing, etc., and human intervention is needed to oversee and drive all steps in the process. In a nutshell, there are currently no software tools in use that provide scalable, robust, fast order processing for prepress applications in the context of an overall printing system.

Therefore, it would be desirable to have a system and technique that would remedy many of the above problems associated with use of pre-press applications in the printing process.

SUMMARY OF THE INVENTION

In response to aforementioned costly, cumbersome and error-prone environment, the present invention utilizes certain technology, along with an interface medium such as the Internet, to offer a fully automated, efficient and cost-effective solution for producing print jobs and the like. The present invention reduces the number of times that human intervention is required in the process and thereby reduces labor intensity, labor cost, time, and high error rates.

In particular, any number of prepress applications are hosted on a server and are automated to provide consistent, error-free and rapid processing of files used in the printing process. Automation of order processing is accomplished by hosting pre-press specific applications on a server or other networked computer, and by maintaining control of their operations as part of a distributed pre-press software operation. Data, settings, rules, etc. needed by a particular prepress application are stored in an image logic information database (ILIAD), and files needed and files produced are stored in an asset management file server (AMFS). Automating applications in this manner allows for a scalable, robust, fast order processing system.

Proofing is automated and is done through a web site, quantities of desired products are selected at the web site, PostScript is automatically created, trapped, imposed, and color separated. Compressed PostScript, ready for a raster image processor, is then sent via FTP to a print vendor. Standard, consistent, imagesetter-ready plate files are produced. The PostScript produced can either be output to film or output directly to plate using "computer to plate" (CTP) technology, a specific print processing method. The on-line automated printing system herein described significantly decreases the time necessary when processing customer orders by automating internal printing processing steps.

The present invention provides numerous other advantages. For one, by hosting a prepress application on a server, the prepress application can be invoked automatically by any of a variety of client applications (such as the product setup module, web server, plater service, etc.) as part of a complete printing system. No human intervention or manipulation of a file is needed which greatly reduces errors. In addition, the turnaround time for a printing job is greatly reduced; order processing can be completed for large projects in approximately 30 seconds to 5 minutes (depending on file sizes). Secondly, the ability to save and reuse parameter values for particular prepress application means that similar jobs for a client will be output in consistent form. In specific embodiments, default parameter values may be hardcoded into the specific module that runs the prepress application (such as the trapping module, imposition module, etc.) so that the application is run consistently with respect to those parameters. Also, any job parameters determined at run time by either the customer or the entity executing the system are stored in the image logic information database (ILIAD) for future use. For example, a decision made with respect to the look of a business card is stored in the database and reused, thus producing a consistent output for future business card orders. Output is consistent for the same jobs run over and over again. Thirdly, the system is also highly scalable. Hosting a prepress application on a server means that more servers and/or more applications can be added as the need arises. The Farm system as described herein provides an environment where servers and/or modules can be added as required.

In order to eliminate the numerous opportunities for error that appear in the many stages of the traditional print process, in one particular embodiment the present invention utilizes a single electronic file format, a "Print Ready File" (PRF) format, that can be used at all stages of the process. This format provides the ability to tag certain elements to indicate whether they should be included in the preview layout, the print layout, or both. At each stage, the software programs that read and process the information check these tags to determine the exact content required at that stage.

The Print Ready File has each element precisely mapped. Because no human is required to alter it, the data for the product and the location of its elements need not change. This eliminates a large source of human error. Additionally, because the present system uses the PostScript language (or its equivalent), the present system does not necessarily need to employ commercial page layout software. The present system allows the font and graphic information to be embedded directly into the file. This eliminates errors, including the font and graphic substitution errors common to the traditional process. Thus, a single file contains all of the data needed for the entire process. The file that the customer previews is the same file that is sent to the vendor (or ultimately the printer). This leads to consistency throughout the life of a print order, and provides for extremely low error rates overall.

According to one aspect, an Internet site is used to provide a printing service embodying the present invention. Once a particular customer job is set up, the customer can modify, order, proof, and control its printed and graphic materials. The solution provided by the present invention helps to eliminate the back and forth process between the customer and the printer.

Resulting features of the overall system include the following: 1) the system contains all of the data the customer needs in order to print the customer's materials; 2) data is completely secure and is the property of the customer; 3) the system incorporates rules to ensure that no matter which party might happen to input data, the resulting printed materials are printed in a manner consistent with the corporate image and design policies that have been approved; and 4) the system incorporates a variety of business logic, authorization security and billing rules defined by the company that allow an administrator to review and then release a particular order to a printer.

BRIEF DESCRIPTION OF THE DRAWINGS

The invention, together with further advantages thereof, may best be understood by reference to the following description taken in conjunction with the accompanying drawings in which:

FIG. 22 is an example of a Document Structuring Conventions (DSC) header for an unwashed EPS file.

FIG. 23 is an example of a washed Print EPS file header and footer.

DETAILED DESCRIPTION OF THE INVENTION

For ease of discussion, the following detailed description makes reference to the generation and printing of a business card. It should be kept in mind that the inventive concepts disclosed herein apply equally well to many other types of materials such as film, screens, overlays, cloth, and to other printed matter such as letterhead, envelopes, notepads, posters, newsletters, coffee mugs, pens, hats, shirts, and also to electronic materials such as virtual cards, web pages, e-mail, etc. In accordance with one aspect of the present invention the Adobe PostScript language is used. However, any other functional equivalent might be used for image generation according to a set of programming language instructions. Similarly, where other product examples are referred to, or used to achieve an end result, the same functional equivalent might also be used within the spirit and scope of the present invention.

In addition, an Internet-based ordering system provides the customer with the ability to interact with the system to preview and approve orders. The figures below will provide an overview of the ordering system in order to demonstrate the context in which customers make use of the system. It should be noted that the present invention would also work with other ordering techniques. The Internet-based ordering system described below is one example of how the invention may be used.

On-Line Automated Printing System Overview

Figure 1:
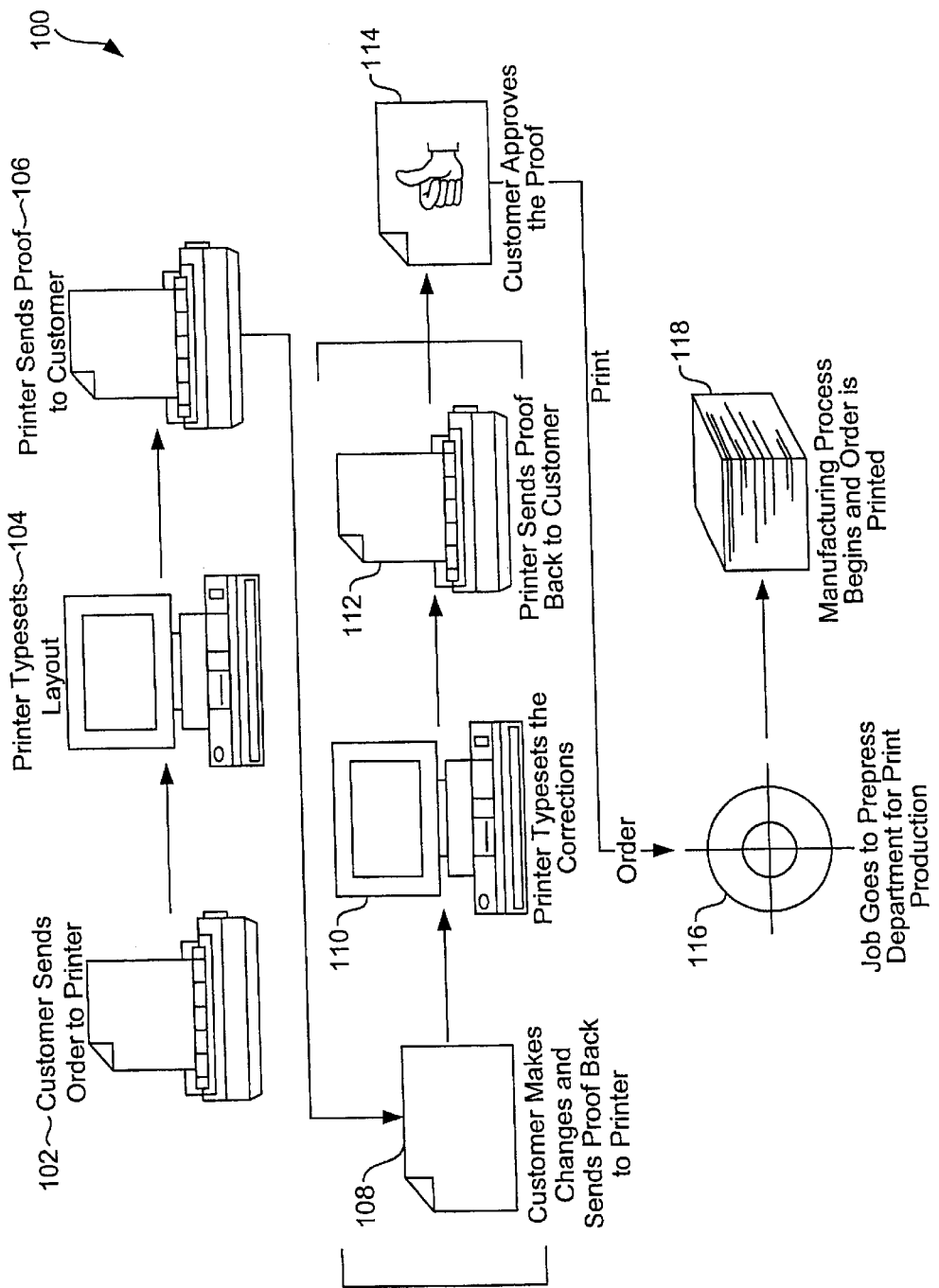
FIG. 1 is a representative prior art block diagram of the overall flow of a traditional print job ordering process.
Figure 2:
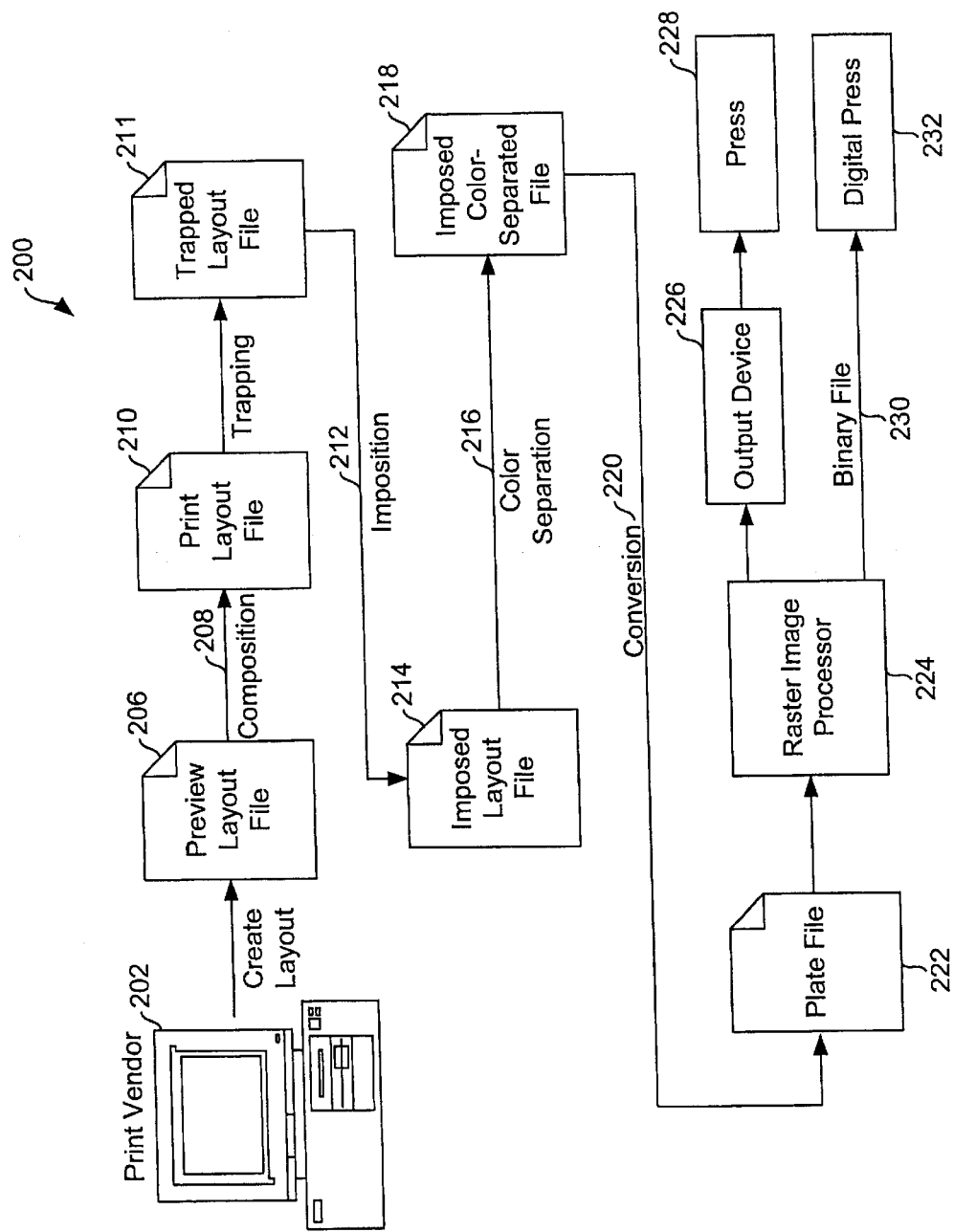
FIG. 2 is a representative prior art block diagram of the modification of files in the traditional print job ordering process.
Figure 3:
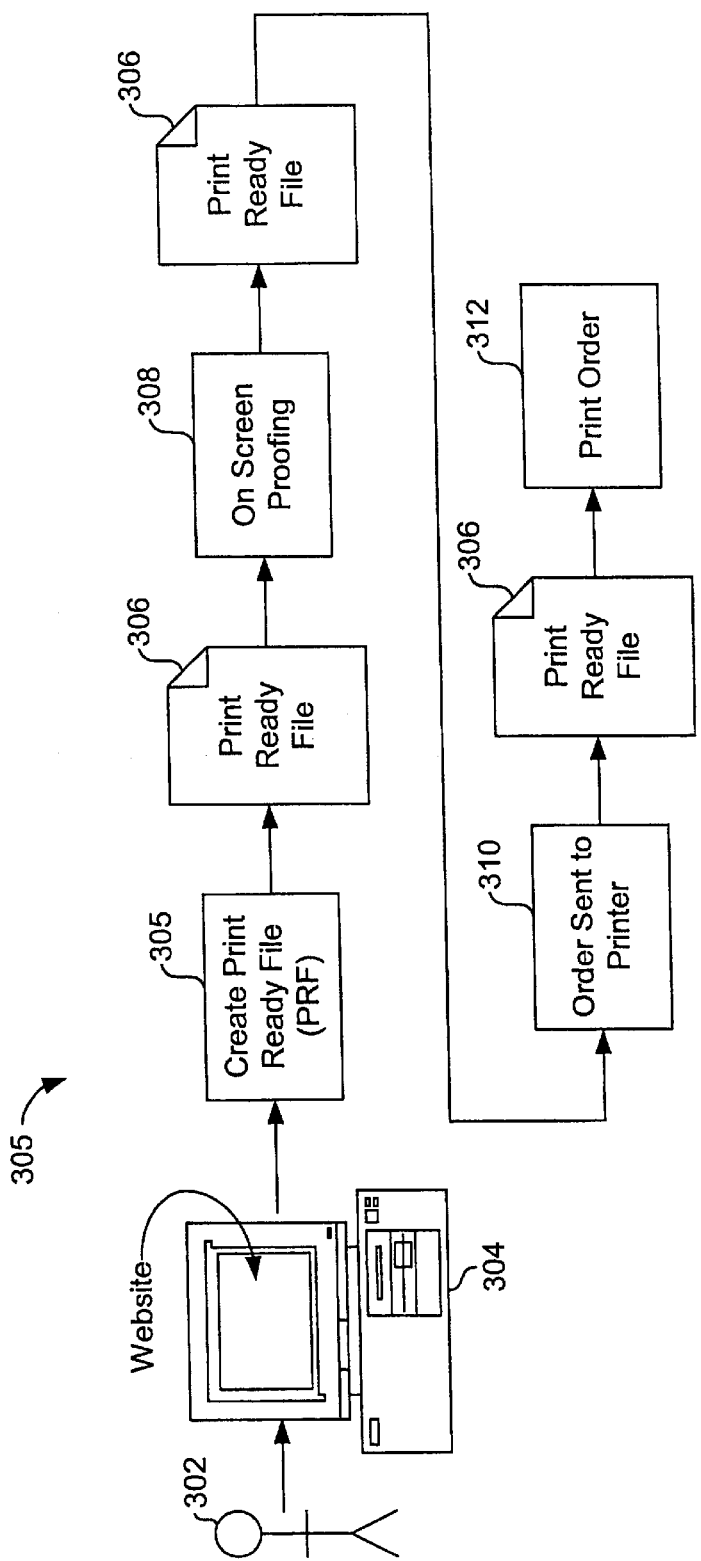
FIG. 3 illustrates an overview of an On-line Automated Printing System.

FIG. 3 shows a block diagram 300 of a generalized series of steps used in creating a print order. A customer 302 contacts a web site via the computer 304. The customer inputs data on the web site according to data prompts needed to generate the customer's desired print job. The system creates a Print Ready File (PRF), as shown in element 305. The PRF 306 is shown to the customer 302 for on-screen proofing 308 of various elements comprising the product. Once the order is approved, step 310 shows the order being sent to the printer. The PRF 306 is thereafter sent to printer as a print order 312, and the manufacturing (or printing) process begins.

In the specific embodiment of an Internet-based ordering system, an Internet front-end provides a custom web site for a customer. The customer goes to the web site and selects a particular product to order. The web site loads a pre-configured order form for the selected product, and the customer enters the data they wish to appear on the business card. The web site then transmits the data to the system which generates the Print Ready File (e.g., as a unique PostScript file).

The web site then takes this Print Ready File and uses it to create the preview layout. It does this by sending the Print Ready File to a viewer program (i.e. the Adobe Acrobat Distiller program), which reads the Print Ready File and creates a Portable Document Format (PDF) file. This file is then sent to the customer via the Internet and is viewed on the computer screen of the customer. In the preferred embodiment, the preview is displayed as a PDF file. While other types of files might be used (GIF, etc.) PDF files are preferred because first, they are extremely high in resolution quality, and second, a PDF file provides a customer with a well-known format to process and view the preview layout.

The customer then views the file and determines approval (or not) of the item. If the customer desires to change their individual data, the customer then views the order form again, changes their data, and the system generates a new preview file. If the item is approved, the customer clicks a button that tells the system to save the order. The order data for the customer (i.e. quantity, shipping address, etc.) is saved to a back-end database, and the Print Ready File is saved on a server. Once the order is saved, it is tagged as a "pending" order or a "released" order. Some customers wish for all of their orders to be stored in a holding queue so that an administrator may grant them final approval. These are considered "pending" orders. Once the administrator grants final approval, the "pending" order is marked as a "released" order.

Once an order has been released, it goes through the various stages of the production process (e.g. setup, composition, imposition, etc.) which are described in further detail below. Each stage of the process preferably uses the Print Ready File that was generated when the user created their preview. Once the order is printed, it is shipped to the customer, and the order is complete.

On-Line Automated Printing System

Figure 4:
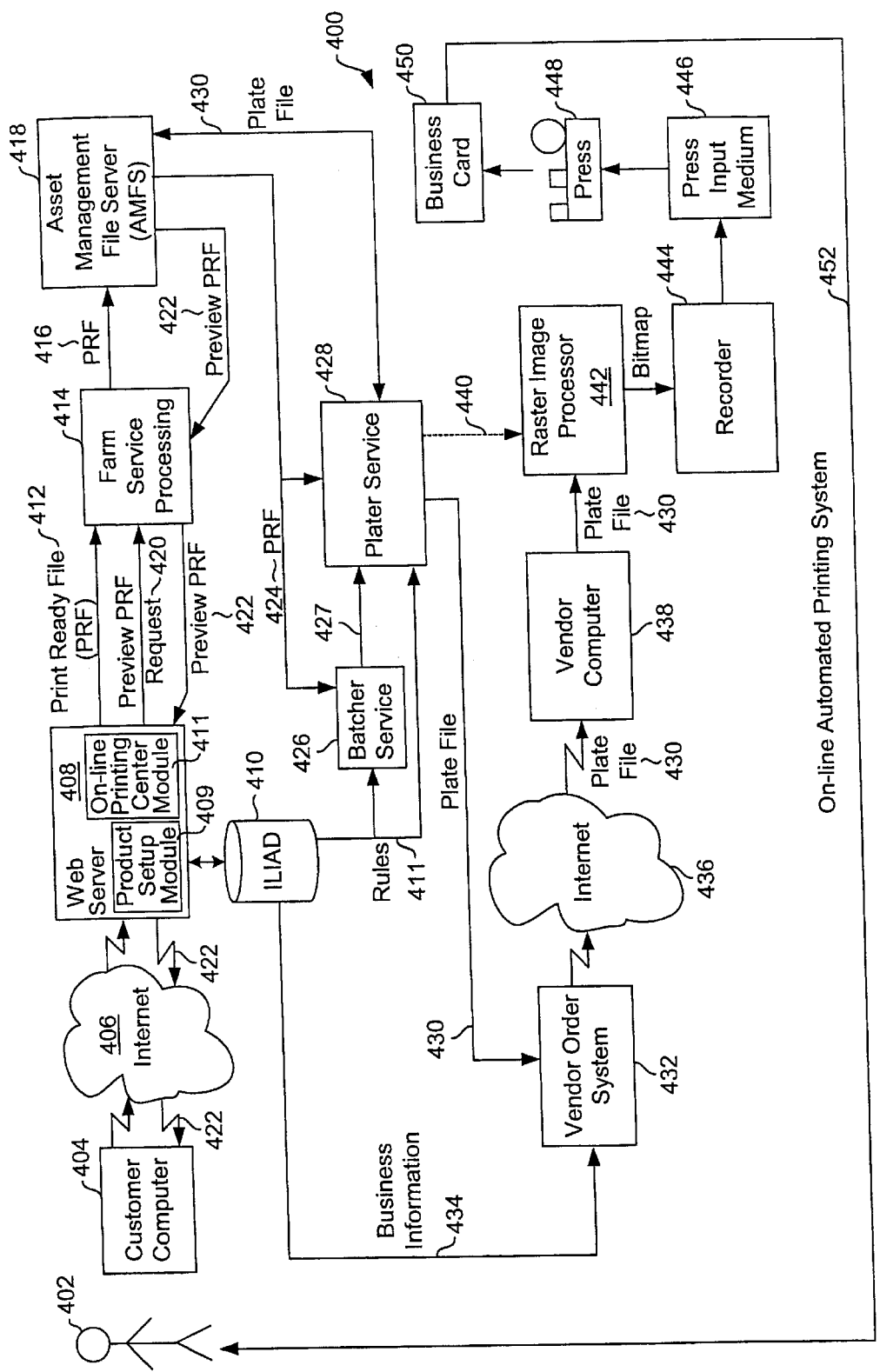
FIG. 4 illustrates a block diagram of the On-line Automated Printing System.

Referring now to FIG. 4, further system-level details of this overall process are shown. A block diagram 400 is shown of the system and the interaction of representative components. In general, this figure describes an overview of an Internet-based ordering system; as stated above, other ordering modes might be used. The customer 402 is shown interacting with a customer computer 404. A web site residing on the primary web server 408 is contacted via the Internet link 406. An Image Logic Information Database (ILIAD) 410 is coupled to the server 408.

Figure 14:
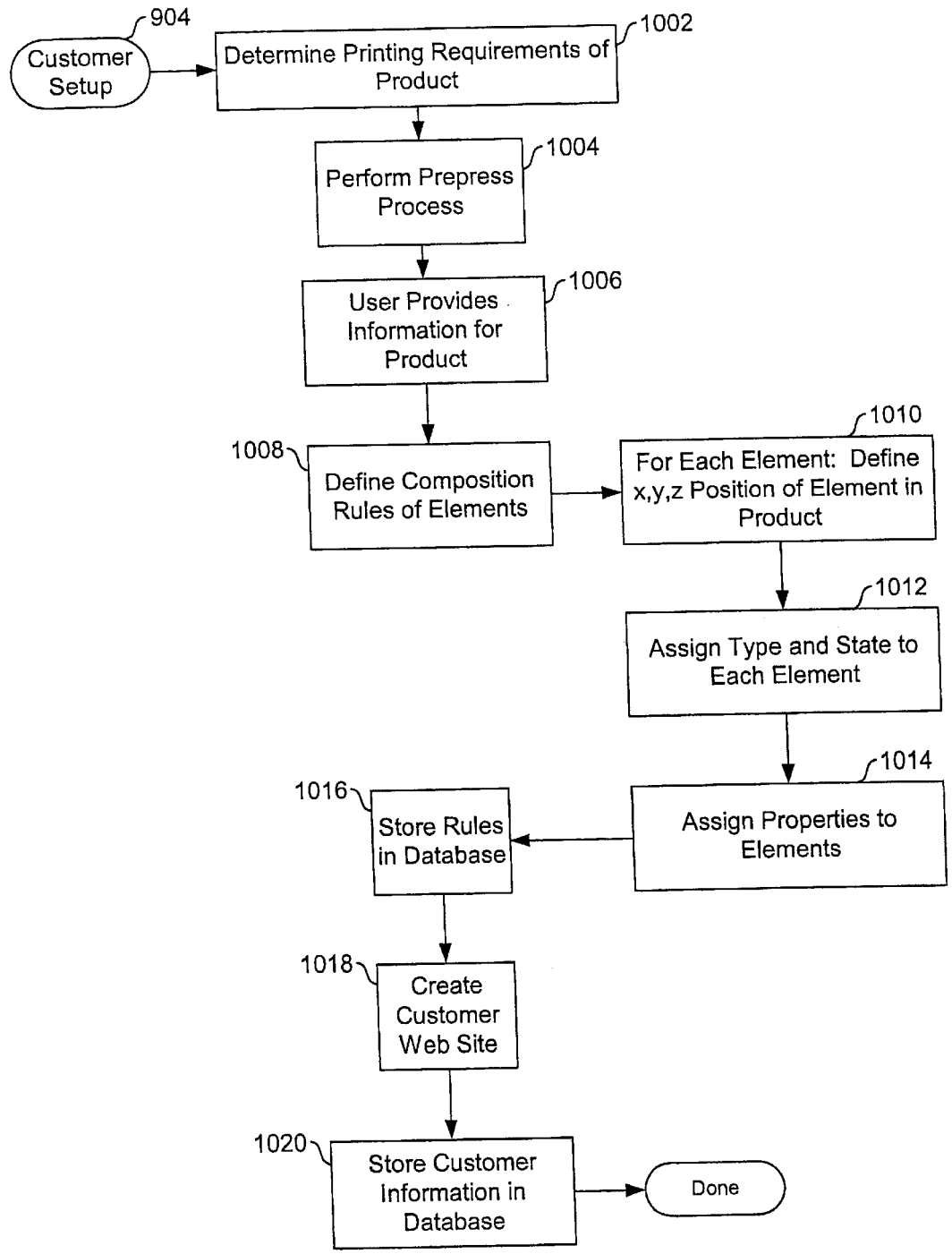
FIG. 14 is a flow diagram of representative steps comprising the "Customer Setup" step of FIG. 13.

A product setup software module 409 preferably resides on web server 408 and is used to implement the steps of FIG. 14 (Customer Setup) by which the customer provides product information, provides business rules, a custom web site is created, and any prepress application appropriate for setup (such as color washing) is performed. The OPC module is used by customers to actually order products. The product setup module is used internally by product specialists to enter data for these customer's products into ILIAD. Preferably they are separate tools, one for setup, one for ordering.

Once created, the PRF 412 is next sent to the farm processing service 414 (or "the Farm"). The Farm 414 is generally comprised of at least one, and usually several, high powered computers (e.g., a PC running Windows NT). The Farm is designed to load balance file processing tasks by determining system impact of various jobs and distributing them accordingly. The Farm is also highly scalable, with control being routed through a single point of contact (i.e. a process running on a server, referred to as the "Master Farmer Service"). Each different file processing module runs out of process from a main process. Within the Farm, each file processing module is controlled by an intermediate module which is specific to a number of file processing modules. The intermediate module communicates with the lower level modules and handles all the specific interactions with the modules. Jobs can be re-routed if failures occur within any particular high-level, intermediate or low-level file processing modules. Time estimates can also be provided regarding the processing of jobs. The Farm Processing Service, in general, introduces little overhead in processing of tasks, and each individual service running within can be configured to run any of the file processing tasks. The Farm 414 provides a platform apart from the web server 408 for running processing steps on the Print Ready File. It should be noted that any such processing could also be done on the web server 408, with load balancing of the job processing managed there.

The completed PRF 416 is thereafter passed onto the asset management file server (AMFS) 418. The general data composition of the AMFS is further described in FIG. 7. The AMFS 418 is file server (or database) used to store components relating to a client's product which should generally not change. In other words, these are the "assets" of the client, such as company logos and the like. Such components are intended to include encapsulated PostScript (EPS) files containing customer logos and graphics, diagrams, illustrations, static text and the like.

Referring again to FIG. 4, the user can also request a preview of the PRF 420. The Farm 414 reads back the preview PRF 422 from the AMFS 418 data store. The preview PRF 422 is then sent back to the web server 408 which applies software such as the Adobe Acrobat Distiller program. This (or similar) software reads the PRF and creates a PDF or similar file. The preview PRF file 422 is then sent to the user via the Internet and is viewed on the customer's computer screen.

If the preview PRF is accepted by the user, the completed PRF 424 is thereafter retrieved from the AMFS 418 and sent for further processing operations. A batcher service 426 and plater service 428 are shown which are each typically a software module running on a high-powered PC or the like. The batcher 426 receives the PRF 424 and performs logical imposition on the data. This would include server based software for automatic imposition. The plater 428 performs further steps including, for instance, imposition and color separation, and the formation of a high resolution print file. Both the batcher 426 and the plater 428 communicate via link 411 with the ILIAD 410 in order to read and use the rules stored therein in performing their designated tasks. The batcher 426 and plater 428 also communicate via link 427, which might include a TCP/IP link or the like.

A plate file 430 is thereafter, stored in the AMFS 418. The plate file 430 is also sent to a vendor order system (VOS) 432. The VOS 432 is typically comprised of a PC or the like. The VOS 432 serves as a transactional machine, or a gate for all other vendors which might exist downstream. The VOS 432 might process tasks or information, including but not limited to, job instructions, purchase orders, invoices, payments, and shipping status of orders. The VOS 432 includes a link 434 to the ILIAD 410 in order to retrieve various business information pertaining to particular customers. The VOS 432 receives a plate file 430 from the plater 428. In this example, the plate file 430 is yet another type of PostScript file.

The VOS 432 may be used to send the plate file 430 to any other system or to any request source via any reasonable medium. Such information could be traded, auctioned off, or distributed across many different markets, in many different ways, and across many different mediums. Such information could also be supplied by various customers and aggregated for processing by VOS 432 and ILIAD 410. In this example, an Internet connection 436 is shown wherein a vendor computer 438 interacts with the VOS 432. The vendor computer 438 negotiates an order with the VOS 432 and receives the plate file 430. Many other such vendor computers might exist and contact the VOS 432.

Vendor computer 438 thereafter sends the plate file 430 to a raster image processor (RIP) 442. Note that the plate file might alternatively be sent directly to the RIP via link 440 if the VOS 432 is not a desired element in the process. The RIP 442 is typically a PC or the like running RIP software. The output to the RIP should preferably be in Level 1 PostScript, to support all possible RIPs. To accommodate these features, the preferred embodiment implements the Print Ready File in the Adobe PostScript language. It should be noted that other languages aside from PostScript can also be used that support the above conditions. For example, other page composition languages/formats can be used. Also, other RIPs or specialized equipment can be supported for custom print orders, and the like.

The RIP produces a bitmap file 443 which is sent to a recorder 444. The recorder 444 is an image setting device which takes the raw bits from the RIP and translates them into a press input medium 446. Such media 446 might include film, RC paper, or whatever input source the press 448 is looking for. The press 448 takes the input medium source and produces the end result, in this case a business card 450. The business card 450 is shipped or routed 452 back to the customer 402 to complete the overall process.

Figure 5:
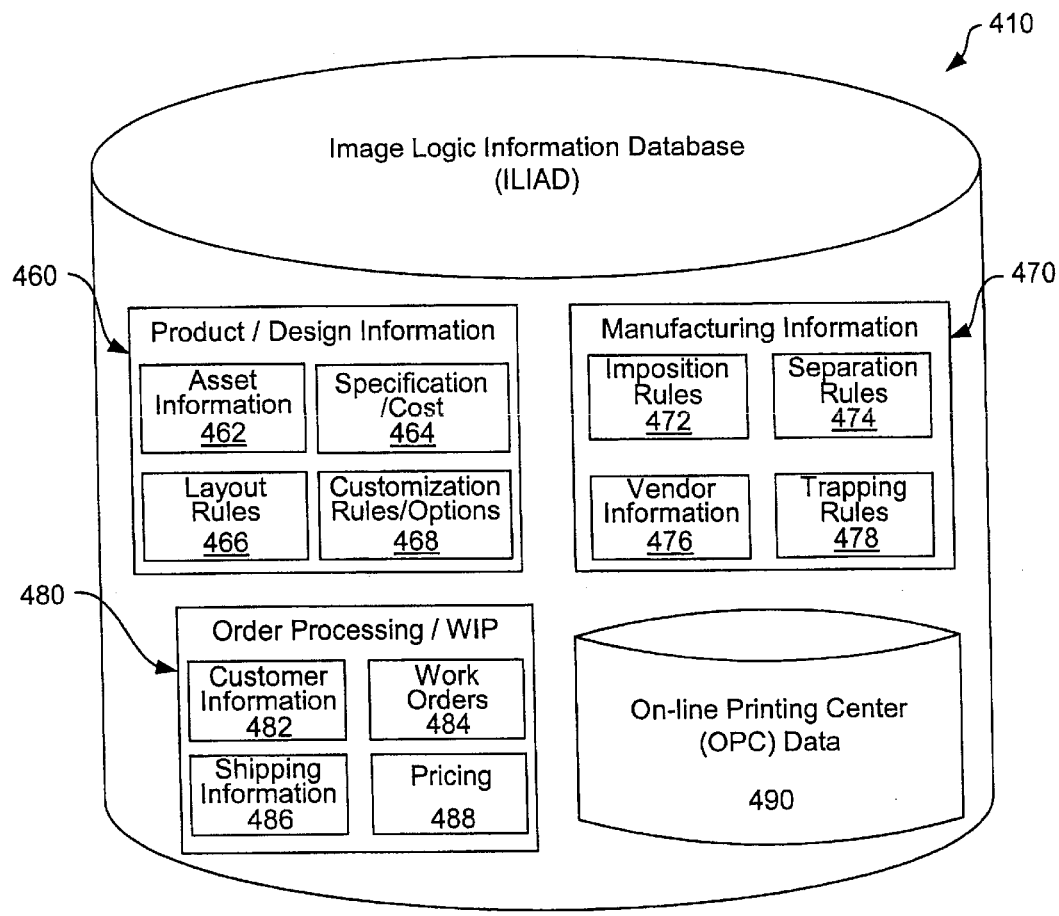
FIG. 5 illustrates further details regarding the ILIAD database of FIG. 4.

The general data composition of ILIAD 410 is further described in FIG. 5. The elements shown are meant to be illustrative, and are not meant to limit the data structure of ILIAD to such elements. Product and design information are shown generally as element 460, and is shown to further include asset information 462. Asset information is intended to include various customer logos, text, or fonts (i.e. "assets" of the customer) to be used on the printed products. Such information might be provided as data files, or via menu prompts and the like, from the customer. Specifications and costs 464 would include information pertaining to individualized costs for implementation of certain designs, and the like. Layout rules 466 would include the various rules to be used in arranging figures or text on the printed product, so that conflicts and inappropriate layout schemes do not occur. Customization rules and options 468 might provide for further custom design capabilities in arranging unique layouts.

ILIAD 410 is also shown to include manufacturing information 470. Such manufacturing information might include (but is not limited to) imposition rules 472, separation rules 474, vendor information 476, and trapping rules 478. These various rules are used in the system for arranging and preparing the images and/or elements in the Print Ready File (PRF). Order processing and work-in-progress (WIP) information 480 is also shown. Such information might include (but is not limited to) customer information 482, work orders 484, shipping information 486, and pricing information 488. An on-line printing center (OPC) database 490 is shown incorporated within ILIAD, with further details regarding its data contents described in FIG. 6. The OPC database might also exist separately from the ILIAD, but is shown incorporated here as one embodiment.

Figure 6:
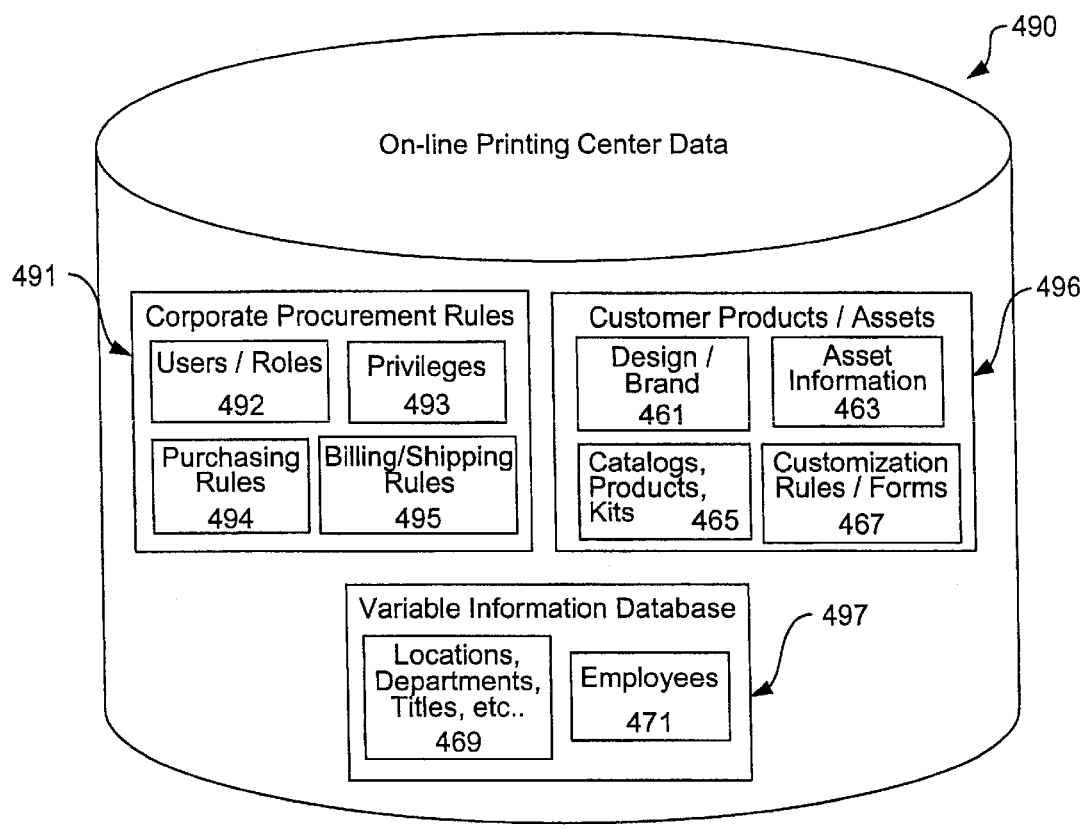
FIG. 6 illustrates further details regarding the OPC database incorporated within the ILIAD database of FIG. 5.

Referring now to FIG. 6, the OPC 490 is shown to include (but is not limited to) corporate procurement rules 491. Such rules might further include users/roles 492, privileges 493, purchasing rules 494, and billing/shipping rules 495. Customer Products/Assets 496 includes design/brand information 461, asset information 463, catalogs-products-kits 465, and customization rules/forms 467. The OPC 490 is shown to further include a variable information database 497. This data store contains information that regularly changes, such as locations, departments, titles, etc. 469. Employees 471 are also included in this data grouping 497.

Figure 7:
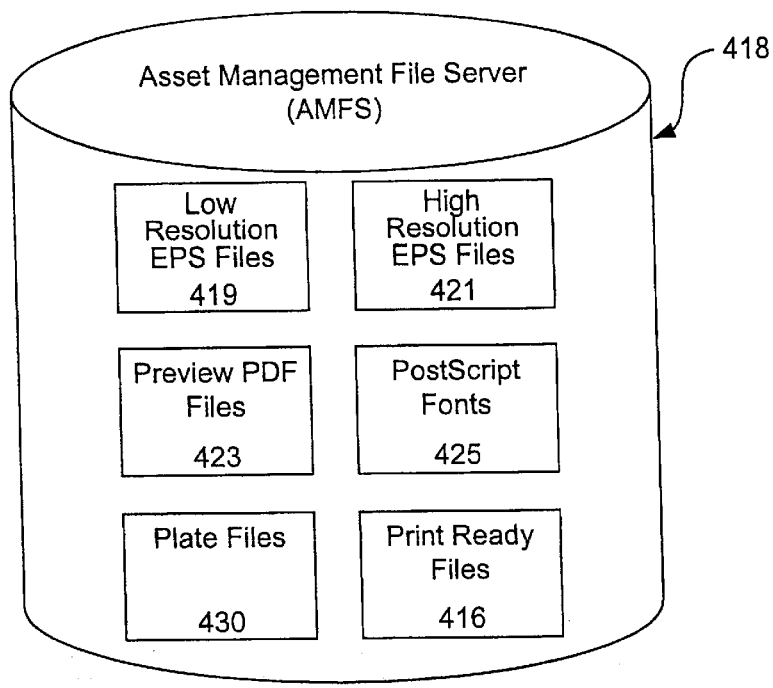
FIG. 7 illustrates further details regarding the asset management file server of FIG. 4.

Referring now to FIG. 7, the AMFS 418 is shown to contain representative data, including for example low resolution EPS files 419, high resolution EPS files 421, Preview PDF files 423, and PostScript fonts 425.

Master Farmer Service, Farm Services, and Load Balancing

Figure 8:
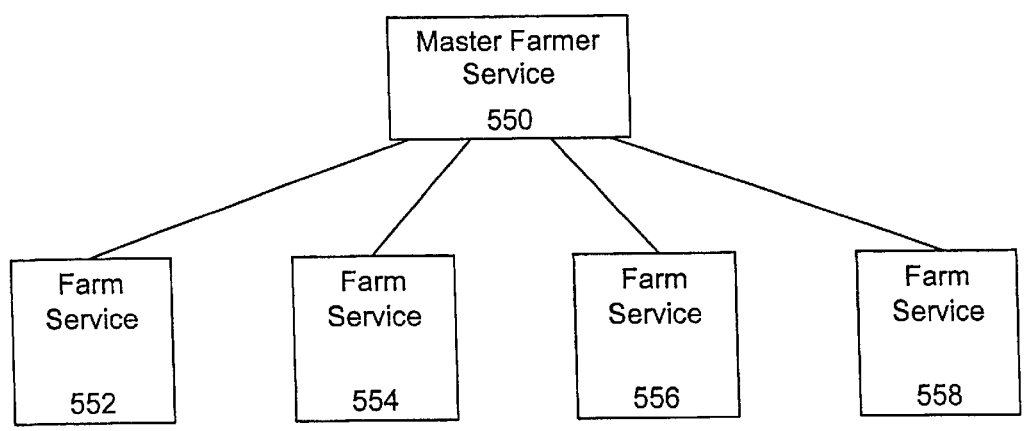
FIG. 8 illustrates a Master Farmer service managing any number of Farm service processes.

FIGS. 8–11 illustrate a preferred embodiment for the farm service processing unit 414 of FIG. 4. Referring now to FIG. 8, a Master Farmer service 550 is shown interacting with a plurality of Farm services 552, 554, 556, and 558. Still other Farm services might also be connected to the Master Farmer. The collective interaction of the Master Farmer and the Farm services is referred to as the Farm system.

Figure 9:
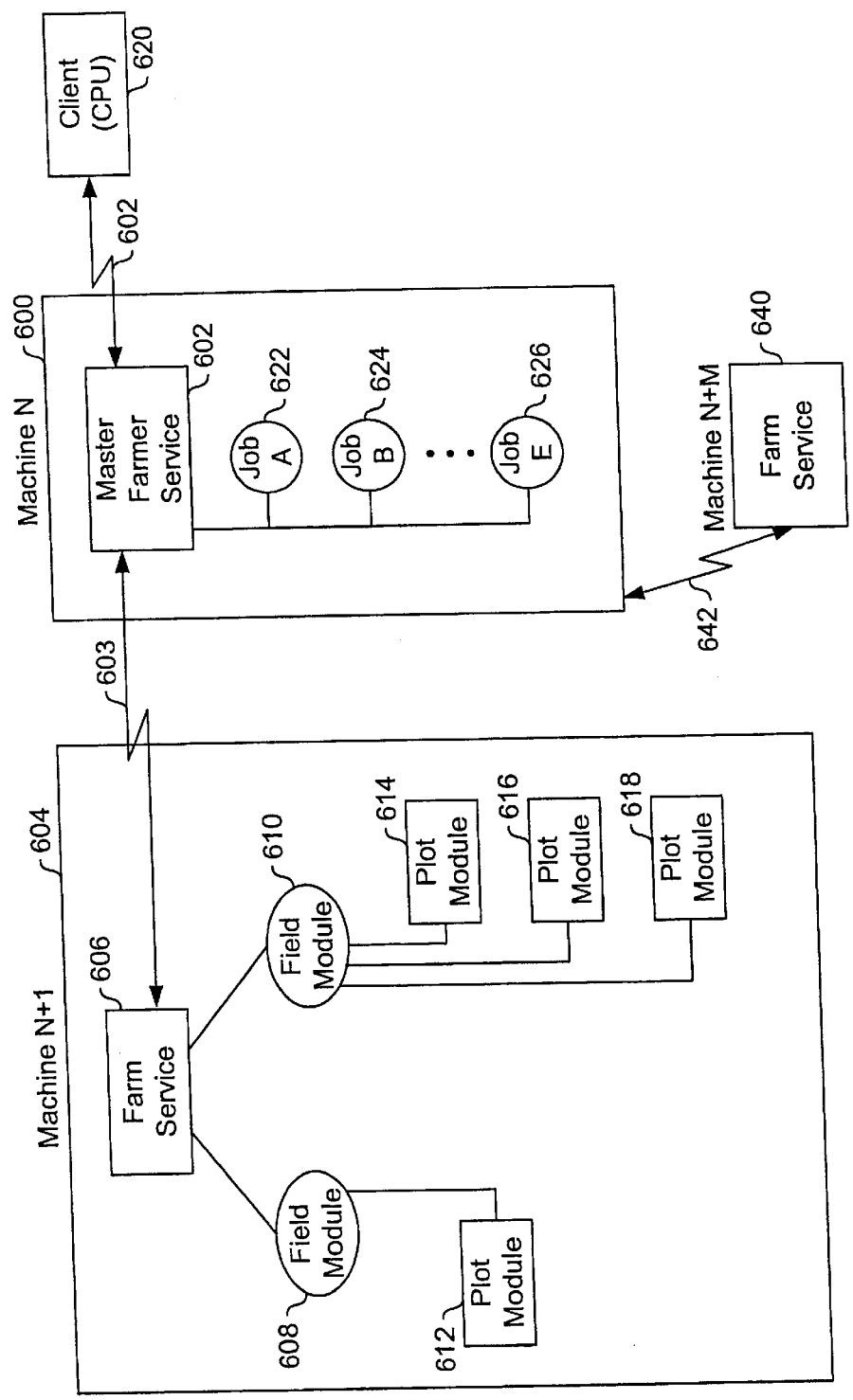
FIG. 9 illustrates the Master Farmer service interacting with a client computer and a server computer running a farm service process.

FIG. 9 shows the interaction between the Master Farmer and Farm services in more detail. A first machine N (600) is shown hosting (or running) the Master Farmer 602. A second machine N+1 (604) is shown hosting (or running) Farm service 606. The Master Farmer 602 interacts with the Farm 606 via link 603. This link might be over any of a variety of transmission mediums, including the Internet. Still other machines, i.e. machine N+M (640), can be included to host other Farm services, and interact with the Master Farmer via link 642.

According to the present terminology, the basic structure underneath a Farm service 606 includes Field modules, e.g. 608 and 610. The purpose of a Field module is to communicate with a specific Plot module (e.g. 612, 614, 616, and 618). A Plot is an application (or the like) that can be made to run out-of-process from the Farm service. A Plot module runs a secondary application with job data, in order to generate an output. Each Plot is responsible for making sure the task (or job) gets completed. The Plot is used to turn the job packet into a format that a particular application can understand. It is generally the function of the Plot to monitor the job and encapsulate the time estimation for completing the job.

This out-of-process structure of Plots is maintained so that if something were to go wrong with the Plot, it does not necessarily affect (in an adverse way) the running of the Farm service. Each Plot processes a file or task, and each Plot is tied to one application. The Field serves as a place for the Plot to find out the status of the Plots. The Field is generally configured to run as part of the Farm service process. If the Field goes down, then the associated Farm service may also go down. Plots, however, generally run out-of-process since the system will have little control over third party applications. If a third party application ceases to work, then it will not take down the whole associated system.

A client 620 (as typically shown using a CPU) interacts with the Master Farmer 602 via link 605. The client provides tasks or jobs, such as files or the like, to be processed by the system. These tasks or jobs are represented as job A (622), job B (624, and so forth through job E (626). As each file or task request comes into the Master Farmer, it is thereafter distributed to a Farm service, and then to a Field module, and then to a Plot module for handling that task. Typically a Plot is configured (or chosen) to handle one particular type of incoming task. The Plot processes the task, and sends back a message regarding the success or failure in performing the task.

An example Plot module might include Adobe Acrobat Distiller, which converts a PostScript file into a PDF file. PDF (Portable Document Format) is a file format that has captured all the elements of a printed document as an electronic image that can be viewed, navigated, printed, or forwarded. PDF files are created using Adobe Acrobat, Acrobat Capture, or other comparable products. To view and use the files, the Acrobat Reader is typically used. PDF files are particularly useful for documents such as magazine articles, product brochures, or flyers, when it is desired to preserve the original graphical appearance of the pages. Still another example of a Plot application includes Vipre (Versatile Product Rendering Engine), which is the rendering engine used to generate Print Ready Files. The overall system structure might include many such Plot modules, each of which are capable of running the same application such as Distiller, Viper (or others). Such redundancy allows for simultaneous processing of similar tasks or jobs.

Each separate Plot is configured to communicate with its associated Field, and the Farm will "oversee" (manage, monitor, etc.) the Fields underneath it. The system is designed to let any number of Fields run on a particular Farm. If it is determined that any particular Plot is too processor intensive, that particular Plot can be run on a single Farm service, and/or on a single Farm machine. This can be used to speed up the processing of Plot applications on other Farm machines. Moreover, the different elements of this system can be segregated and moved very readily from one machine to another. For instance, a Field (with all of its Plots) running on a particular machine can be moved onto a different machine. This can provide extra processing speed for Fields remaining on the original machine.

As a result, the overall Farm system is generally scalable, since the system is controlled by a single point of contact, namely the Master Farmer service. The Master Farmer distributes work among the Farm services. Each machine in the Farm system has an instance of the Farm service running on it. Each Farm service communicates with the Master Farmer, thereby making itself available for jobs. Each Farm can have one or all of the file processing tasks running on it. As many new machines as are needed can be added to run the Farm service, and thereby accommodate varying loads. Each Farm service can include configurable parameters to control its system usage (e.g. Windows NT threads, or the like). The service can also be tuned to particular tasks that the service performs, and to the machine that the service is running on. The Farm system can take advantage of multiple processors, and be made to scale upwards (or downwards) according to the system on which it is running.

As for errors, there are generally two types: job or task errors, and system failures. System failures are when a particular Farm service, Field, or Plot fails unexpectedly when trying to process a task. This failure would generally be in an area that should not be a failure. In such a case, the Farm service will alert the Master Farmer that it will no longer accept tasks, and shut itself down. When a particular Farm has shut itself down, or stopped communicating, the Master Farmer will route all tasks running on that Farm to other Farm machines running that specific file processing task.

The Master Farmer therefore serves as a central load balancing area. The overall Farm (i.e., the combination of the Master Farmer and Farm services) is designed to load balance file processing tasks. To perform such balancing, the overall Farm system determines how processor intensive each particular application is, and processes the file either locally or remotely. The Farm system is configured to determine the system impact by the size of the job rather than the actual task being performed. Each different type of file processing task judges the relative size of each task and the Farm uses this size, and the current processor load, to determine how to distribute (or load balance) the various tasks.

If a client machine needs to process a job, then the client machine will interact directly with the Master Farmer. Example jobs might include: creating a consistent PostScript file, converting a PostScript file into a PDF file, or converting a PostScript file into a bitmap file. The Master Farmer has one or more Farm machines connected to it. The Master Farmer machine might also be configured to have a Farm process running on that same machine. The Master Farmer is constantly receiving updates from each Farm machine (or server), wherein the Farm machine provides feedback on the burden level of the Master Farmer. The burden level relates to how long a particular job will take on that Farm Service.

Figure 10:
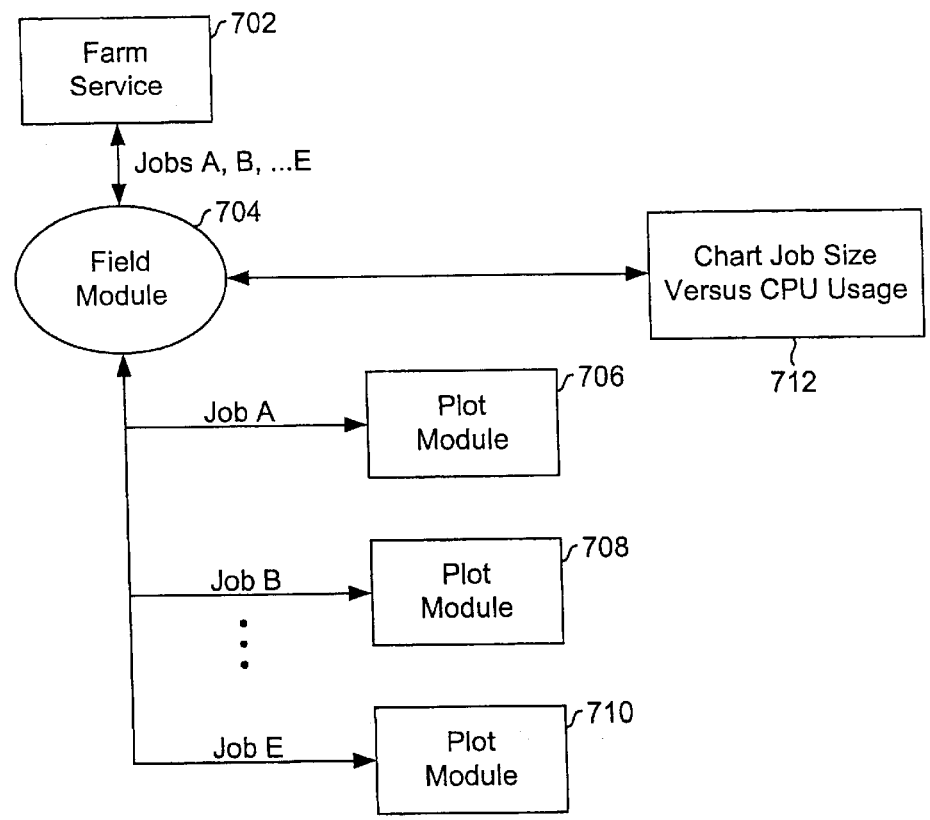
FIG. 10 illustrates load balancing performed by a Farm service for any number of jobs.

Referring now to FIG. 10, yet another level of detail is shown regarding the relationship between the Farm services, Field, and Plot modules in terms of load balancing. Each Farm service 702 receives jobs A, B, ... E from the Master Farmer. The Farm sends the respective jobs to a Field, which has associated Plots 706, 708, and 710. The jobs are sent to the respective Plots according to the job type. For instance, if a client wants to convert a PostScript file into a PDF file, the client sends that particular request to the Master Farmer. The Master Farmer then determines which particular Field has the necessary application (or Plot) associated with it to accomplish this task. The Master Farmer maintains an evolving list of the Farm services and associated Fields and Plots. The Master Farmer walks through each Farm service, and determines which potential Plots might be able to process the task.

The Master Farmer also determines the level of burden for each Farm service. The level of burden is a function of the CPU usage for the machine associated with the Farm service, and the size of the jobs being processed by each set of Plots associated with a Field. Each task being sent to the Master Farmer has a size associated with it. This is a relative number that is used to estimate and load balance the task.

Figure 11:
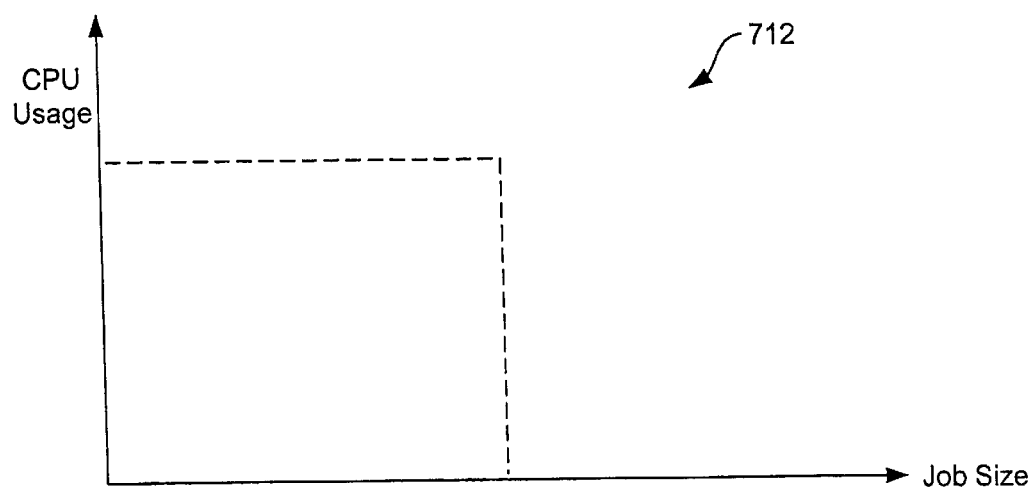
FIG. 11 shows a representative example of a chart from FIG. 10 used for load balancing.

Each Field maintains its own chart 712 of CPU usage versus job size, in order to provide an estimate of how long the particular job will take. FIG. 11 shows a representative example of such a chart 712 in more detail. The charts are compiled into an overall level of burden on the Farm service, and the Master Farmer decides which Farm service will receive any particular incoming task based upon the relative burden level for such Farm services. An estimate of how long it will take to process the job is sent back to the client. The job is sent to a particular Farm service, and the Farm service provides an update of the time estimate to complete the job, which in turn is again sent back to the client. The Master Farmer might detect that a job is going to take longer than it should, and thereafter re-estimate how long the job will take, in light of all the other traffic on the system. Clients can also request new estimates.

The chart therefore serves as an indication of how busy the Farm service is over a given period of time, and/or provides a historical curve of performance for particular applications. Over certain time periods, each Field is updating this chart, and the Farm service packages up all this information and updates the Master Farmer with such information. Hence, if a client wants to run Distiller on a file, then an X-Y performance curve for Distiller over a time period, for instance the last few hours, will exist for estimation purposes. If an incoming file is 2 MB, then an estimate can be made regarding processing a file of this size. An important feature of the present system is that it looks at pending files. If for instance a 600 MB file were pending, then estimates would be adjusted accordingly. The chart is analyzed for each Farm service in light of the size of the incoming jobs for that Farm service. As a result, a job might be shifted and queued up to be fifth in line on a first Farm service, as opposed to first in line on second Farm service, because it has been estimated that the job will run faster despite being fifth in line on the first Farm Service. Hence, regardless of queue position, the time estimate for completion will control the ultimate placement of the job on a Farm service. Both queuing and historical performance estimates are thereby used in deciding which Farm service will handle the job.

It should be noted that prepress applications are generally very file intensive. As a result, the system is constantly reading and writing to such files during the course of processing them. This allows estimates on system usage to be based upon system impact assumptions (and predictions) relating to such file usage. For instance, prepress applications generally have a large impact on the system; and/or a large impact on the network card if the application is reading and writing to the network; and/or a large impact on the drive if the application is reading and writing to the local disk; and so forth along similar relations. Hence, a chart can be constructed regarding system impact. By way of example, if the processor is running at 75% utilization, and job comes in of size "X", then predictions (and/or extrapolations) can be made as to how long it will take to process that particular job. Each Field maintains its own chart of CPU usage versus job size in order to predict how long a job will take. As network (or other such) conditions change, then the chart will be revised. If, for instance, a size "5" job at 75% CPU utilization will take 3 seconds to process, then it might be extrapolated that the same sized job at 50% CPU utilization will only take 2 seconds.

For prepress applications, the size of the job is generally easy to determine. For instance, if a PostScript file comes into the system having a certain file size, then it is relatively straightforward to estimate how large the resulting PDF file will be. For most prepress applications, there are generally input files and output files, which follow similar predictive patterns. In other systems—which might host business logic or the like—it is generally difficult to predict the impact that different jobs might have on the general applications server. File (or job) sizes, however, provide for more regular estimation.

The present invention is also configured to introduce little to no overhead in the processing of tasks. Certain speed advantages might be realized by running an application locally on a client machine. However, the present Farm system passes the job request from the Master Farmer to a Farm service, and to the Field, and to the Plot, with no significant tradeoffs in speed. Moreover, a very large file might be processed more quickly on a larger machine (or machines) of the Farm system, as compared a smaller (less powerful) local machine.

The present Farm system is also easily expandable, wherein each of the Farm services can be configured to run any of the file processing tasks. If a particular task is very resource intensive, it can be run alone on the system. When each Farm service tells the Master Farmer that it is running and ready for tasks, it also identifies the tasks that it is servicing. Adding new file processing tasks is as simple as placing the new Field and Plot on a machine in a particular directory.

Print Ready File

In order to accommodate the "state" of the file (e.g., Print or Preview), a global numeric variable, or "flag", is used to indicate which elements will image when this file is processed. In this example, this flag is a PostScript integer and will be used for applying a bit mask to each of the state flags of the individual elements. Each element has four possible states: Print, Preview, Both, and none. This global flag is written into the PostScript stream such that an application can find the position of the flag within the file, and alter the value as needed. The default or original value of the flag will be set to include elements that are in a Preview or Both state. It is a unique and efficient aspect of this invention that a single flag may be used. However, alternative embodiments might use multiple flags, comparative elements, or run-time logic to evaluate the appropriate state and direct processing, all within the spirit of the invention.

The Line and Text elements will each check their respective state flag against the global flag to see if their bit values are contained within the global flag, using a standard bit-masking technique of a logical AND operator. If the elemental state flag bits are not within the global flag (a zero result from the logical AND), a function is utilized to move the PostScript interpreter's file pointer past the end of that particular element. The element is thereby skipped, and the element does not image.

Embedded graphics will use a different method than Line and Text elements for selecting Print, Preview, and Both states. When writing a graphic with a state of Preview, the graphic is embedded in the file, but OPI comments are used to link to a blank PostScript file. When using this file with a global flag set in a Print state, the blank PostScript file is used instead of the Preview one that is embedded within the file. When writing a Print graphic, a blank PostScript file is embedded, and OPI comments are used to link to the graphic. When writing a graphic that is in the Both state, the graphic is embedded with no OPI. There is a caveat to graphics in a Both state, and that is when the image is high resolution. High resolution raster graphics are usually very large. One purpose of the present system is to create a file that is relatively small, thereby enhancing speed in working with the file. Here, the OPI comments are used to facilitate a solution. The low-resolution version of the graphic is embedded in the file, and the OPI comments are used to link to the high-resolution version. In this state, when using the file for Preview, the low-resolution graphic is seen. When using the file for Print, the high-resolution file is used. Because of the OPI implementation, the programs used for creating Previews of the PostScript file are preferably configured to remove the OPI comments. The programs that utilize the PostScript file in a Print state should preferably be configured to process the OPI comments.

One feature of the present system are the OPI links to external documents. Along with the Print Ready File, each of the externally referenced files need not change. This is implemented, in part, by securing the directory where the graphics reside, and using operating system security. Only applications controlled by the present system might be used to add files to this directory. These applications might not allow the modification or deletion of any of these files, but only the adding of new files. In this manner the externally referenced files are secured such that they cannot be altered by accident, or on purpose. They can also be secured by access codes or authorization, as between print and preview modes.

Figure 12:
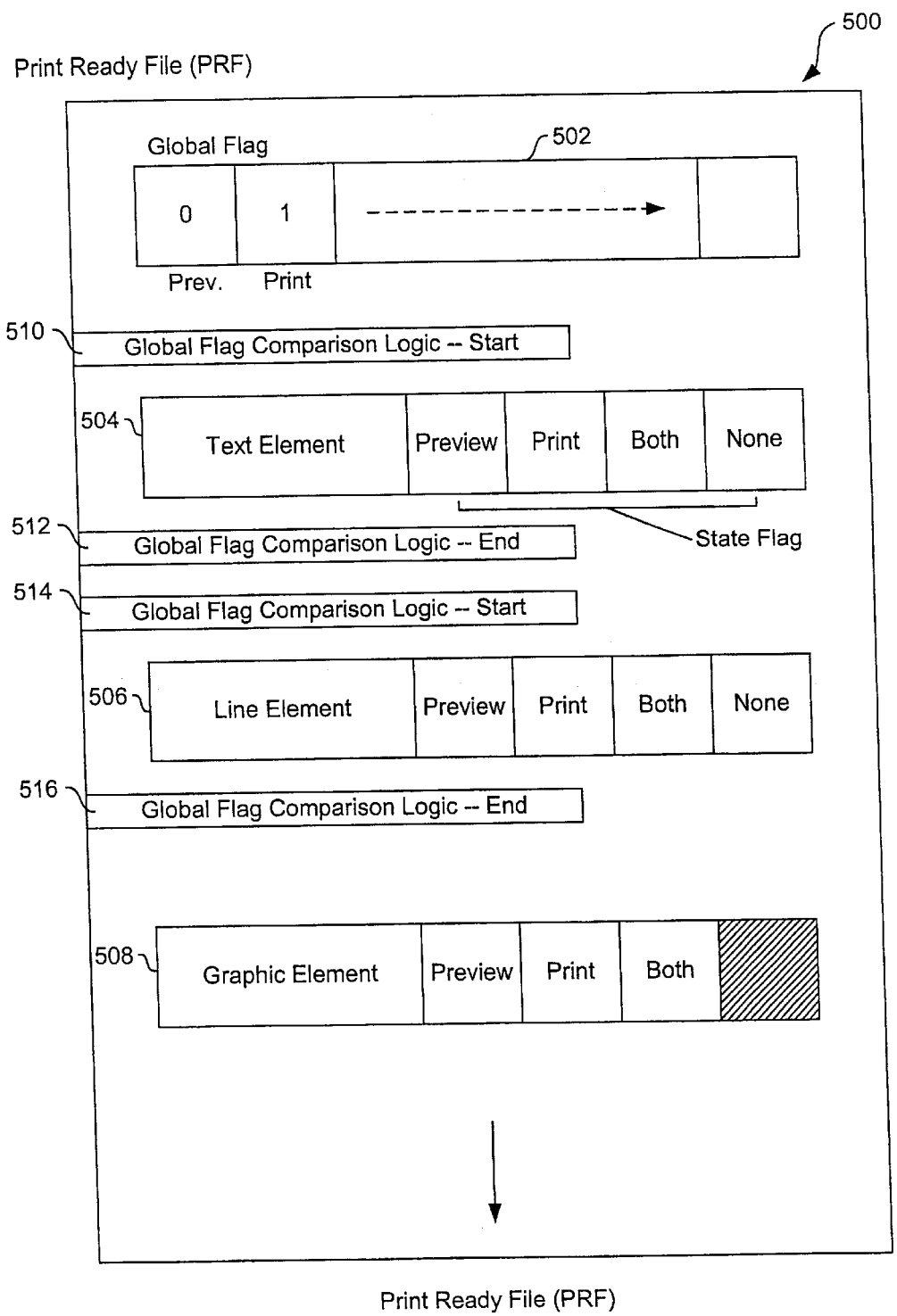
FIG. 12 illustrates basic data constructs of certain elements of a Print Ready File.

Referring now to FIG. 12, a representative construct of the Print Ready File 500 is shown. A global flag 502 is used to indicate which elements can print. This flag is numeric and is used to apply a bit mask to the elements. For example the value "1" indicates that the elements only in the "Preview" state will not print, while those in "Print" state should be printed. In this example, it is shown as a 32-bit PostScript integer. Additionally, shown is a text element 504, a line element 506, and a graphical element 508. Each text and line element has associated with it four "states": Print, Preview, Both, and none. However, the graphical element does not use the "none" state. Preferably, these states of an element are represented in a 32-bit integer, similar to the global flag, termed a "state" flag.

The text and line elements 504 and 506 will each check their respective state flags against the global flag to see if they should be imaged. If the text or line element state flag does not match with the global flag, then the present invention will apply a routine of PostScript operators to move the interpreter's file pointer past the end of the element in question, thereby skipping that element such that it does not image. For example, if text element has its "Preview" bit set, it would still not be imaged during a preview unless the "Preview" bit of the global flag was also set. This routine, hereafter referred to as "global flag comparison logic" is shown encompassing the text element 504 with a start function 510 and an end function 512. The same logic is also shown encompassing the line element 506 with a start function 514 and an end function 516. Each element in the file preferably has this logic wrapped around it.

The global flag comparison logic operates as follows. For each text and line element, the state flags of the element are compared to the global flag. If the global flag matches the state flags, then the element is processed. If the global flag does not match the state flags, then the element is not processed. The preferred embodiment skips the element by moving the pointer past the element via a PostScript routine. The global flag comparison logic then loops back until each element is completed.

Embedded graphic elements will use a different method depending upon the setting of the Print, Preview, and the Both state flags. The Print Ready File is being passed from point to point. In general, it is desired to keep the size of the Print Ready File down to a minimum for certain operations, thereby increasing the efficiency of the overall system. This is done by directly embedding a low resolution graphical object into the file for preview operations. For print operations, the preview graphic is removed and a link to a high resolution graphic is supplied instead. When the flag is set for "both," then a low resolution graphic is embedded in the file, and a link is provided to a high resolution graphic. Further details of operation of the Print Ready File are found in U.S. patent application Ser. No. 09/460,307 filed on Dec. 13, 1999.

Print Production Process Flow

Different applications are used at different stages of the print production process to produce a final printed product. Below, an overall flow of the process steps are first described. Thereafter, certain stages of the print production process are described in further detail. Use of a Print Ready File is disclosed as the preferred embodiment, but is not required. While described as flowchart steps, it is generally recognized that persons of ordinary skill in the art will recognize how to implement such applications from the flowchart descriptions.

Figure 13:
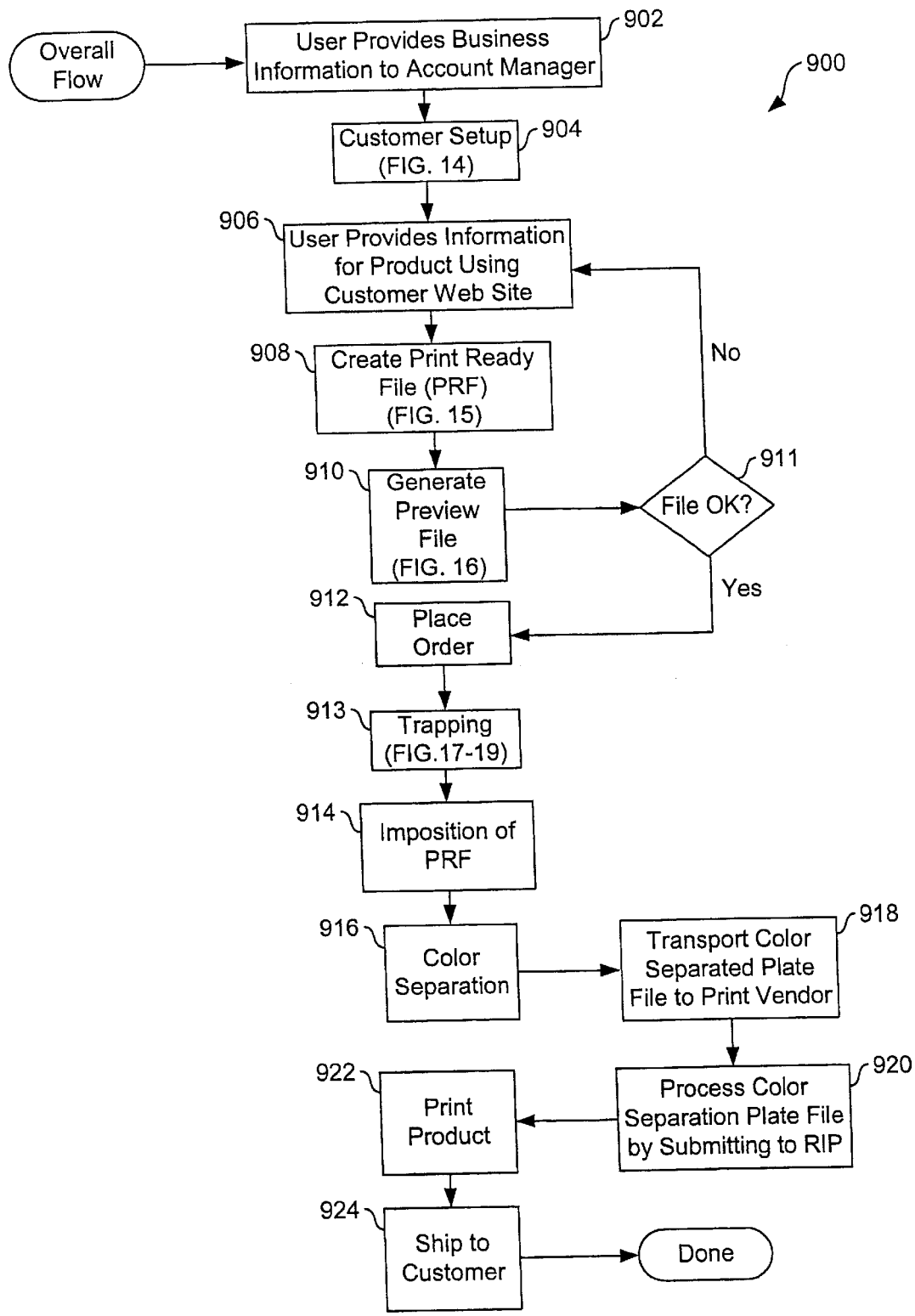
FIG. 13 is a representative flowchart of the overall process the printing system.

FIG. 13 shows an overall flowchart 900 of the print production process. In step 902, the user first provides business information to a person responsible for setting up the user account. This first step involves considerable human interaction, but the step generally needs to be done only once in order to properly set up the account. Such information might include: purchase orders, authorizations, employee information, employee lists, product styles, style guides, samples, graphical information and fonts. Products would include items such as business cards, envelopes, stationery and the like. Step 904 involves a customer setup process, wherein the elements within a business card or product are defined and stored. Customer setup 904 is described in further detail in FIG. 14 and is preferably implemented using product setup module 409 hosted on web server 408. Step 906 involves the customer providing information regarding the product by using the customer web site referred to in FIG. 14. Once such information has been entered, the system can perform the composition step in 908. Composition creates the Print Ready File according to steps further detailed in FIG. 15. Generally, the user will request a preview file in step 910 in order to view the results on-screen before printing. The steps involved in the generation of the preview file are further described in FIG. 16. The decision block 911sends the user back to step 906 if further changes are desired. If the preview file is acceptable, then the order is placed in step 912. In step 913 trapping is performed and is further described below.

Thereafter, the process of imposition (including batching and plating) of the PRF is performed in step 914. The imposition steps are further described below. Color separation 916 is next performed, with steps described in further detail below. Color separation produces color separated plate files which are transported to the print vendor in step 918. In a preferred embodiment, both imposition and color separation are performed in the same pass by a third party software tool. Step 920 shows the processing of the color separated plate file by submitting the file to a raster image processor (RIP). The RIP generally produces a bitmap file which is converted into the printed product 922. The product is thereafter shipped to the customer in step 924.

FIG. 14 shows certain more detailed steps associated with the customer setup application 904 from FIG. 13. In the setup process, product setup software is used to create each of the basic elements, and associate a state flag with each one. This software therefore identifies the position, size, contents, etc. of each element type. Step 1002 is the process of determining the printing requirements of a product. This is generally done via a human specialist interacting with the customer to gather and generate graphic and textual materials pertaining to that customer. In other systems, tabular layout or other document definitions are used to gather and create the derived graphic and textual material (as in XML-based processing of data and Document Type Definitions). Other steps might include die creation, and other related procedures. Step 1004 next is the performance of the prepress process. This typically consists of generating and verifying the customer assets (e.g., EPS files and fonts). These assets are then added to the asset management file server (AMFS) 418, or other such database.

An EPS is a file format used in prepress operations, and generally contains information required to create a printed document containing graphics images. Along with the imaging bits, EPS files contain other data respecting reproduction of the image for digital display, or for print, such as color selections, color settings, scaling of graphics, embedded fonts and so forth. Such files often need to be "Washed" or converted into a consistent format for automated processing. Washing is one of several prepress operations that can be automated by hosting the application on a server, or other networked computer, and maintaining control of certain operations as part of a distributed prepress software operation.

In step 1006, the user is further prompted for information regarding the product, as might be needed for a particular print job. Step 1008 shows the process of defining the composition rules for each of the particular elements. Step 1010 further shows that for each element, the x, y, and z position of the element in the product is defined. In step 1012, a type and state is assigned to each element. The "type" includes line, text, and graphical, whereas the "state" includes Preview, Print, Both, or none. Step 1014 next shows the assignment of various other properties (as needed) to each of these elements. Once finalized, this information is stored via step 1016 in a rules database such as ILIAD 410.

A customer web site is created in step 1018. The customer accesses the web site to provide various customer information. The user is prompted for information in step 906. Text elements might require a prompt, in that the user is providing textual information in response to a question. Line and graphical elements, however, might be retrieved directly from the appropriate database via a locator, index, or the like. Once the user enters the requirement information, it is stored in ILIAD 410 as per step 1020.

The next stage of the process involves composition of the Print Ready File. When created, the Print Ready File in the preferred embodiment follows PostScript conventions including, for instance, DCS standards, platform independent operators, and color separation functions. The file might also include a bounding box, which is not required for a multi-page PostScript file, but might be used by other applications in the process to identify the size of the image to be rendered.

Figure 15:
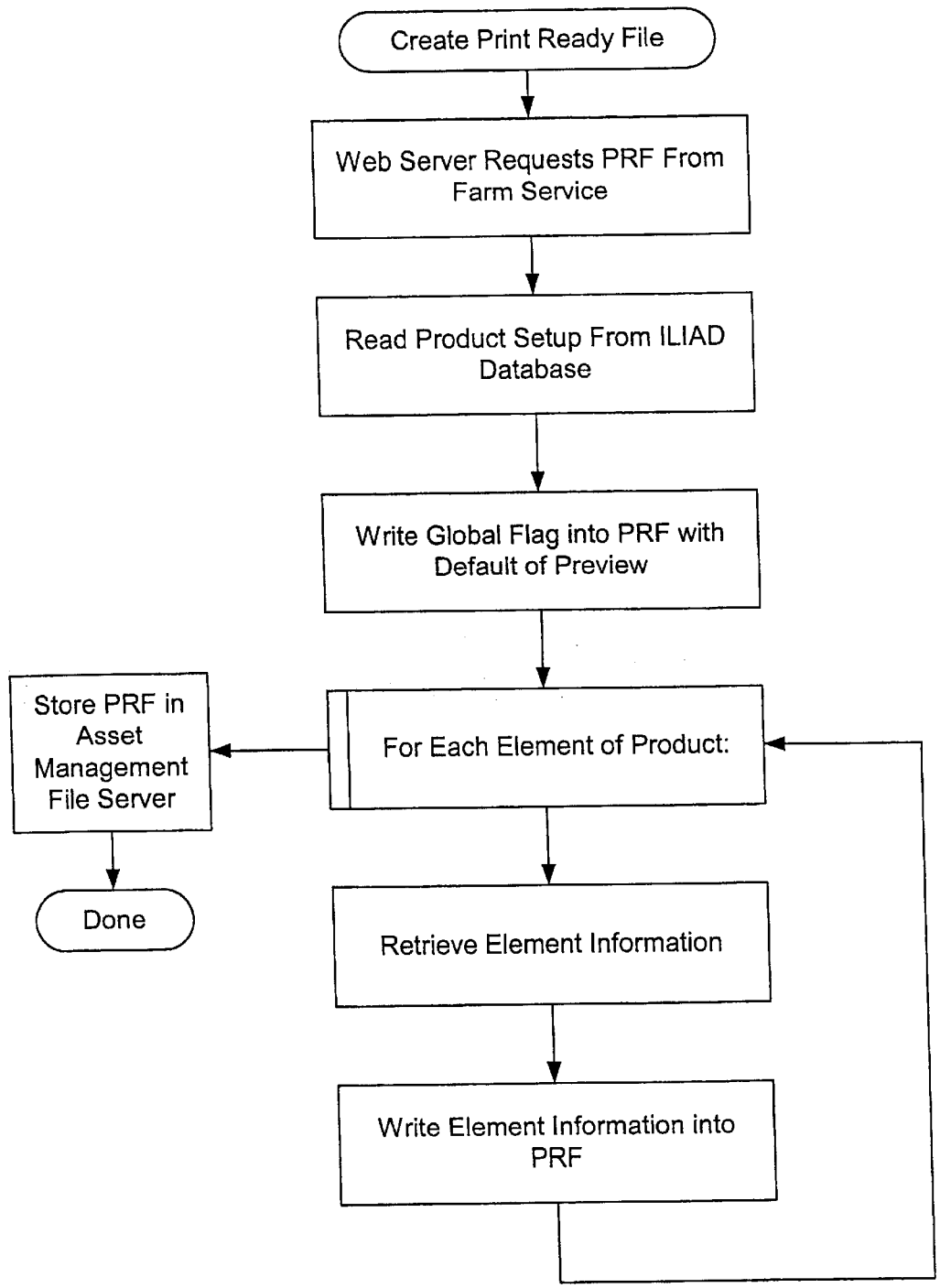
FIG. 15 is a flow diagram of representative steps of the "Create Print Ready File" step of FIG. 13.

Referring now to FIG. 15, a more detailed flowchart is shown of the composition process 908 from FIG. 13 In step 1102, the web server 408 requests the PRF from the Farm 414, along with related user information. In step 1104, the rules regarding the product setup are read from the ILIAD 410 database. The global flag is next written into the PRF with a default setting of "Preview" as shown in step 1106. A loop is then performed for each element of the product 1108. The element information is retrieved, e.g. data source, component data, and state. Based upon this information, and the logic described above, the element is written into the PRF in step 1112. The loop continues via link 1114 until each element of the product is completed and written into the PRF. When finished, the PRF is stored in the Asset Management File Server (418). An alternative embodiment could substitute receipt of one or more data streams in response to the web server request in step 102, as with XML output from one or multiple machines performing the required prepress operations. The rest of the operations described proceed as depicted.

Figure 16:
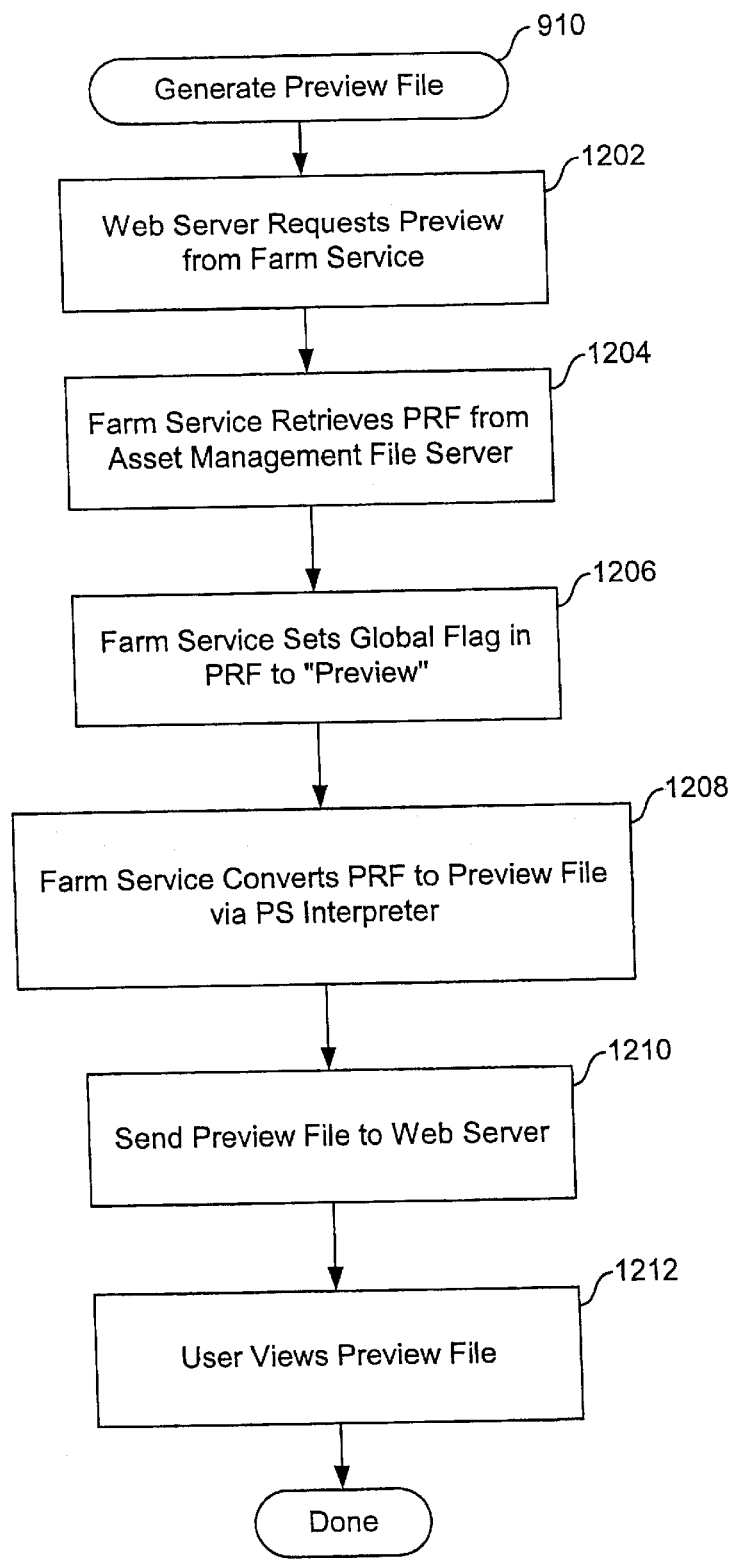
FIG. 16 is a flow diagram of representative steps of the "Generate Preview File" step of FIG. 13.

Once the PRF is created, a preview file is generated as will now be explained. Referring now to FIG. 16, a flowchart is shown of representative steps associated with the element "Generate Preview File" 910 from FIG. 13. If the user desires to preview the file, the web server 408 requests a preview file from the Farm 414 as shown in step 1202. The Farm then retrieves the PRF from the asset management file server 418 in step 1204. The Farm sets the global flag in the PRF to preview mode in step 1206. In step 1208, the Farm converts the PRF to a preview file. This is done via a PostScript interpreter which results in common image formats using the global flag comparison logic (and the OPI comments). Common image formats include, for instance, bit map and PDF. In step 1210, the preview file is thereafter sent to the web server 408. In step 1212, the user then accesses and views the preview file via a web browser or the like. Further details on creating a preview may be found in U.S. patent application Ser. No. 09/460,307 filed on Dec. 13, 1999.

Color Washing Subsystem

Color washing is further described in U.S. patent application Ser. No. 09/480,334, which is herein incorporated by reference. Washing is a process for manipulating encapsulated PostScript (EPS) files and producing a file in a consistent format for use by other applications. Washing is one of many prepress operations that can be automated by hosting the associated application on a server or other networked computer. In general, a client application communicates with the Master Farmer service and requests the Master Farmer to perform certain tasks. For example, the client might ask the Master Farmer to take a PostScript file and convert it into a PDF file. Additionally, the client might request that the PDF file be converted into an EPS file. Each such job or task will carry with it a different set of parameters. Additionally, the job will operate on a source file and produce a destination file. In the present system, these files are stored in the asset management file server (AMFS).

Figure 17:
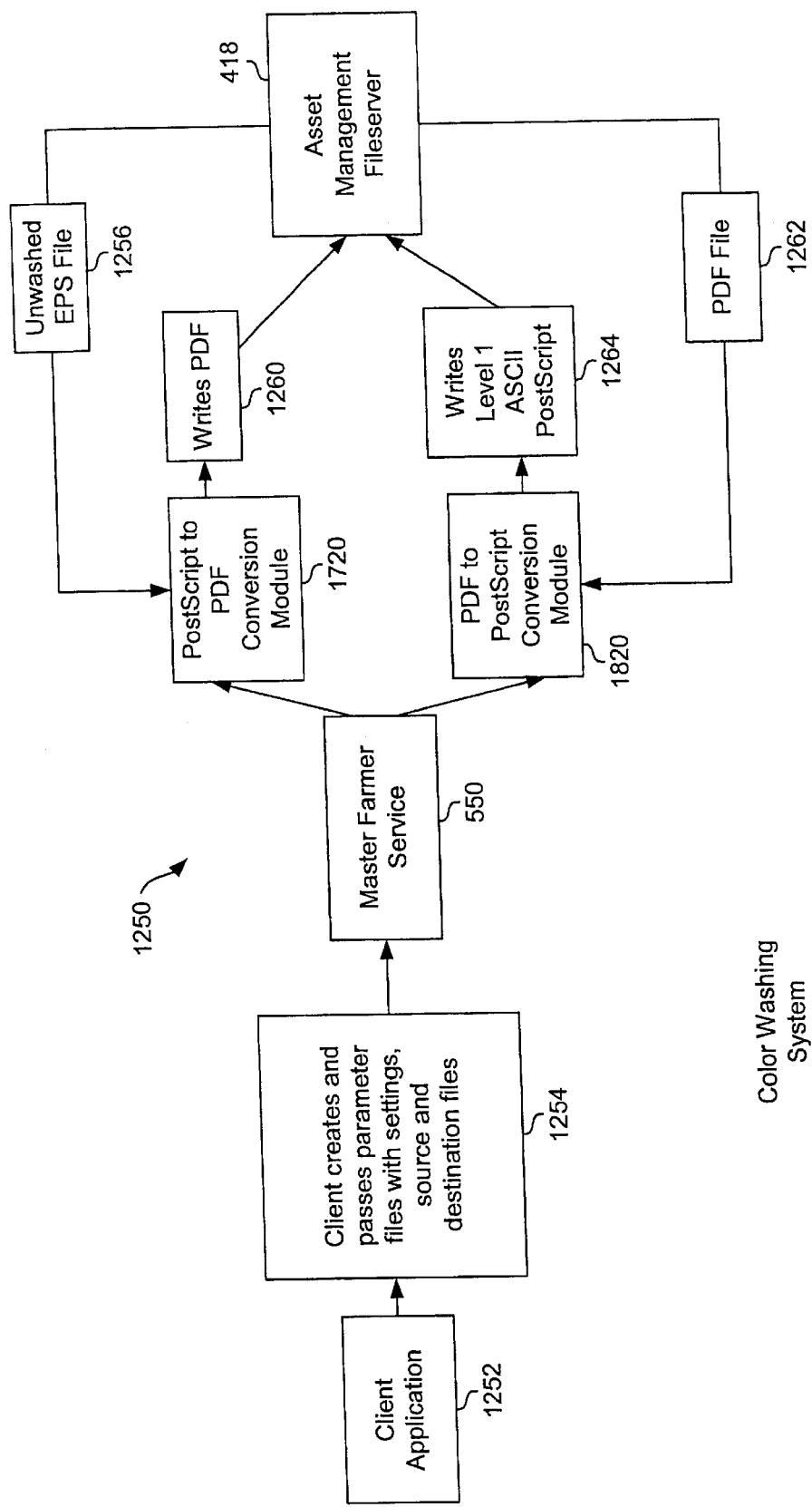
FIG. 17 illustrates a color washing subsystem.

Referring now to FIG. 17, a color washing subsystem is shown. In step 1252 a client application forms a design that it wishes to have washed. A client application may be any application as described herein. In step 1254 the client creates and passes parameter files with certain settings. The source and destination files are created and stored on the asset management file server. Each Farm service functions essentially as a large file processor and will take input parameters that point to stored source and destination files. As such, the client will place an unwashed EPS file on the AMFS, and provide directions and input parameters for the washing subsystem to perform a certain operation on the file.

The washing process utilizes two conversion modules, 1720 and 1820. First, a Level 2 or Level 3 PostScript file is supplied as the source file. This file may have many embedded problems, such as multiple embedded EPS files. The unwashed EPS file 1256 is retrieved from the AMFS 418 and used by module 1720 to RIP the file and break it down into a known (or public) format. Module 1720 then writes the resulting PDF file 1260 back onto the AMFS 418.

The second module 1820 thereafter retrieves the PDF file 1262 from the AMFS 418. This module uses a PDF library of routines, any of which might be used to perform operations on certain source or destination files. In the present instance, module 1820 takes the file 1262 from the AMFS 418, and writes an ASCII Level 1 PostScript file (which is a "washed" EPS file) as shown in block 1264. This resulting Level 1 file is stored on the AMFS 418 in the specified destination file location.

The client communicates with the Master Farmer 550 through a specific set of parameters. The client essentially supplies the input files, and the desired location for the output files. A collection of settings are supplied regarding how to create the output file. The AMFS serves as common storage. The client stores the unwashed EPS file (i.e., a raw PostScript file) on the AMFS before invoking this series of steps (in FIG. 17) by talking to, or interacting with, the Master Farmer. The resulting washed EPS file will be embedded in the final PRF file.

In the present system, the process is automated. The PDF file is created with pre-defined settings from the unwashed EPS file. The PDF file is thereafter converted into the Level 1 ASCII PostScript format. In a prior art pre-press environment, the user of the Distiller program would set up their own local parameters to run Distiller (or the like). Similar local parameters would be used in converting PDF to PostScript to form the washed EPS. As such, the user would control (among other things) the fonts, letting, turning, setting, scaling, and the like. This level of unguided user control makes for irregular results. The present system, however, provides a consistent and predefined method for manipulation of the file. The referential integrity (or consistent color settings) are the result of the normalization (or washing) process that permits applications to run in an automated environment, wherein the color settings are set as policies. Policies are input parameters for processing of the files, i.e., whether the files are going to have font subsetting, or whether the fonts are going to be embedded, and the like. These policies are managed, updated, and tested automatically.

In more detail, an EPS file goes through Distiller (under control of PostScript to PDF conversion module 1720), which simply turns the PostScript into PDF. Distiller has the capability to convert any PostScript file to PDF format. Exceptions exist, however, including files with duotones where RIP specific device transfer functions are used. Print graphics are converted to PDF format unchanged. Preview graphics are downsampled (changing their dpi values for images) and converted to RGB color space using Distiller parameters. Preview graphics are manipulated to force them to smaller sizes to facilitate viewing over the OPC module. Distiller allows control of internal parameters used in conversion to PDF format by placement of Distiller specific operators in PostScript files.

Essentially, the PostScript to PDF conversion module 1720 (the hosted application), writes a new PostScript file containing the Distiller-specific parameters and links to the target EPS file(s) being washed. A table of parameters are shown with certain representative settings in Appendix F. Notably, an API (application programming interface) is a specific interface prescribed by a computer operating system or by an application program by which a programmer writing a client program can make requests of the operating system or other application. Appendix F represents custom parameters of an API, with settings that may be specified for Print and Preview graphics according to the present color washing process.

The resulting PDF file is exported back into EPS format using the Adobe PDF library as a Level 1 ASCII PostScript file. The Adobe PDF library exposes functionality through use of an API. This exposed functionality is used by the PDF to PostScript conversion module 1820 to control EPS output. The settings are stored in a structure and there is a user-defined type with parameters; these parameters become the actual variable names. The variables are set with values and then a particular function is called. In the present instance, customer parameters may be specified for print and preview graphics with reference to the API listed in Appendix G. The function call used to export the PDF file format to EPS file format in the PDF library is "PDFLPrintPDF." Its function definition is as follows:

ACEX1 void ACEX2 PDFLPrintPDF (PDDoc pdDoc, ASPath-Name pathName, PDPrintParams psparams).

The structure holding the parameters for the function call is named "PDPrintParamsRec." Each of the values listed in the washing parameters of the API of Appendix G (e.g., incBaseFonts, PDInclusion, incEmbeddedFonts, etc.) are members of this structure. The aforementioned PDF library is very large, with thousands of functions available in it. The present solution uses one such function with the same parameter names as defined by the PDF Library. Hence, a programmer familiar with the Adobe PDF library would find these same parameter names for this function.

A comparative table can be created which allows the process to automatically determine and convert setup parameters for the particular application. When parsing through a PostScript file, settings can be determined which are "off" and "on." The present system allows conversion of the set parameters to ones that will ultimately be used by the system. For instance, for creating a Print file there are certain policies that will be used while for creating a Preview file still other policies will be used.

Moreover, once this table is established, validation can be performed in the system of the file to be viewed or printed. The image that is ultimately going to be displayed or printed is the one that is valid in the ILIAD database. The image is valid because the process described herein has been performed properly, and the results stored for access by a variety of applications.

Validation of inks is accomplished by parsing the standard exchange output PostScript file. Inks inside the file are located and recorded. The inks are then checked against inks in a database, and also against their low resolution/high resolution counterparts. In pre-washed EPS files in the prior art, the various inks in the file can be located in different (and inconsistent) places throughout the file output structure. The present invention provides a significant advantage over such prior art systems, in that it would be extremely difficult to find and record inks in such a pre-washed prior art EPS file.

The size of the low resolution graphics can also be manipulated by using the Distiller down-sampling capabilities. Distiller exposes an API which can be used for manipulating the dpi (dots per inch) values of color, black and white, and grayscale images.

The present process may be embedded with any suitable application, such as a forms design application, or the like. In general, it makes no difference who is asking for the washing to be performed. Any application such as a web site design tool that manipulates color images may so benefit. For instance, a web site user interface might be used to create the washed EPS files. If a user were hosting a web site, and wanted to use the herein mentioned system to produce the correct logo for a client, an appropriate function call could be made. The network connection with the AMFS would allow access to a stored bitmap image, or printed document, and the appropriate level of the image could thereby be generated.

In the present example, the chosen client application is product setup module 409 for creating new business cards and the like. The same process could similarly be coded into other types of client applications. Clients might even author their own documents, using their own layout tools or third party layout tools. The present product setup module utilizes the benefits of the present invention by feeding back a viewable image so that a proof of the business card can be generated with the washed imagery therein.

When adding a new template to the product setup module, the process will wash the EPS automatically and report if the EPS contains any colors not in the ILIAD database, or if the colors are spelled differently from their ILIAD counterparts. If the color information is incorrect, the product setup module will not allow the graphic into the system until it is corrected. The product setup module will import the color information into ILIAD only if it correctly identifies the colors in the EPS file created by module 1820. When creating Print Ready Files, the system will preferably not accept unwashed EPS files. As a result, no unwashed graphics are used in such a system.

Figure 18:
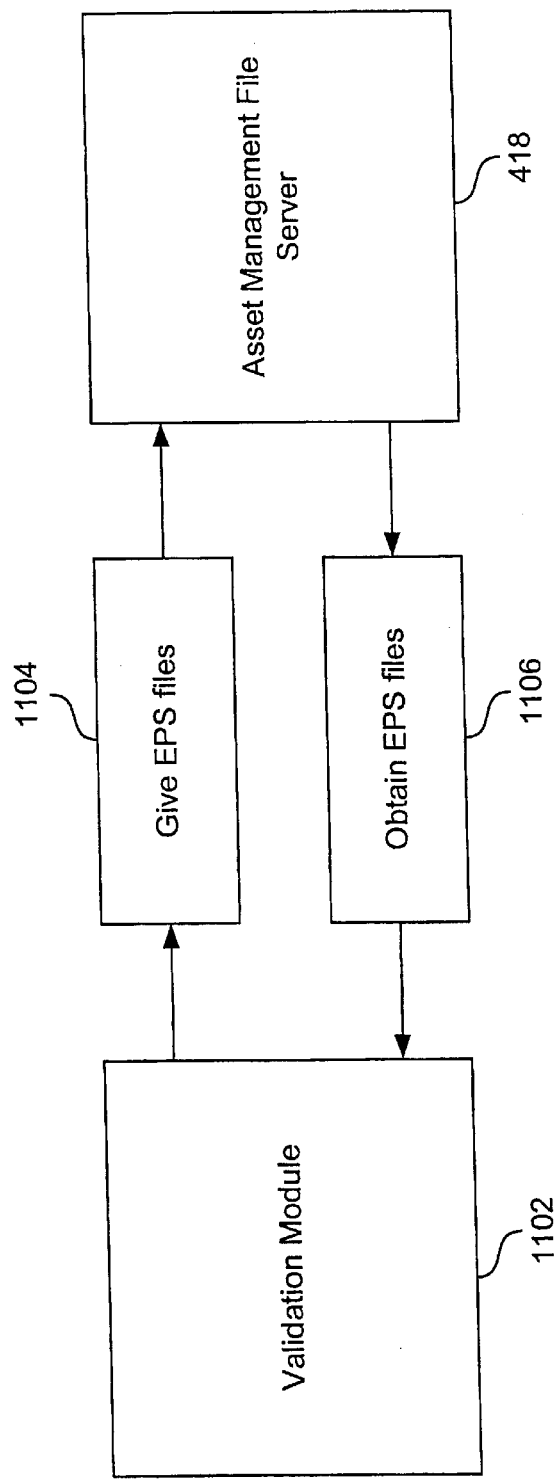
FIG. 18 illustrates validation of EPS files.

FIG. 18 illustrates validation of such EPS files. A validation module 1102 is shown providing unwashed EPS files 1104 to the asset management file server (AMFS) 418. The process described above washes the EPS file and the validation module 1102 obtains the washed EPS files 1106 from the AMFS 418. The validation module 1102 thereafter validates that the EPS files are washed, and will not accept such unwashed files. Validation may occur by looking at the footer of color-washed file, a stamp is placed in a file that has been washed.

Figure 19:
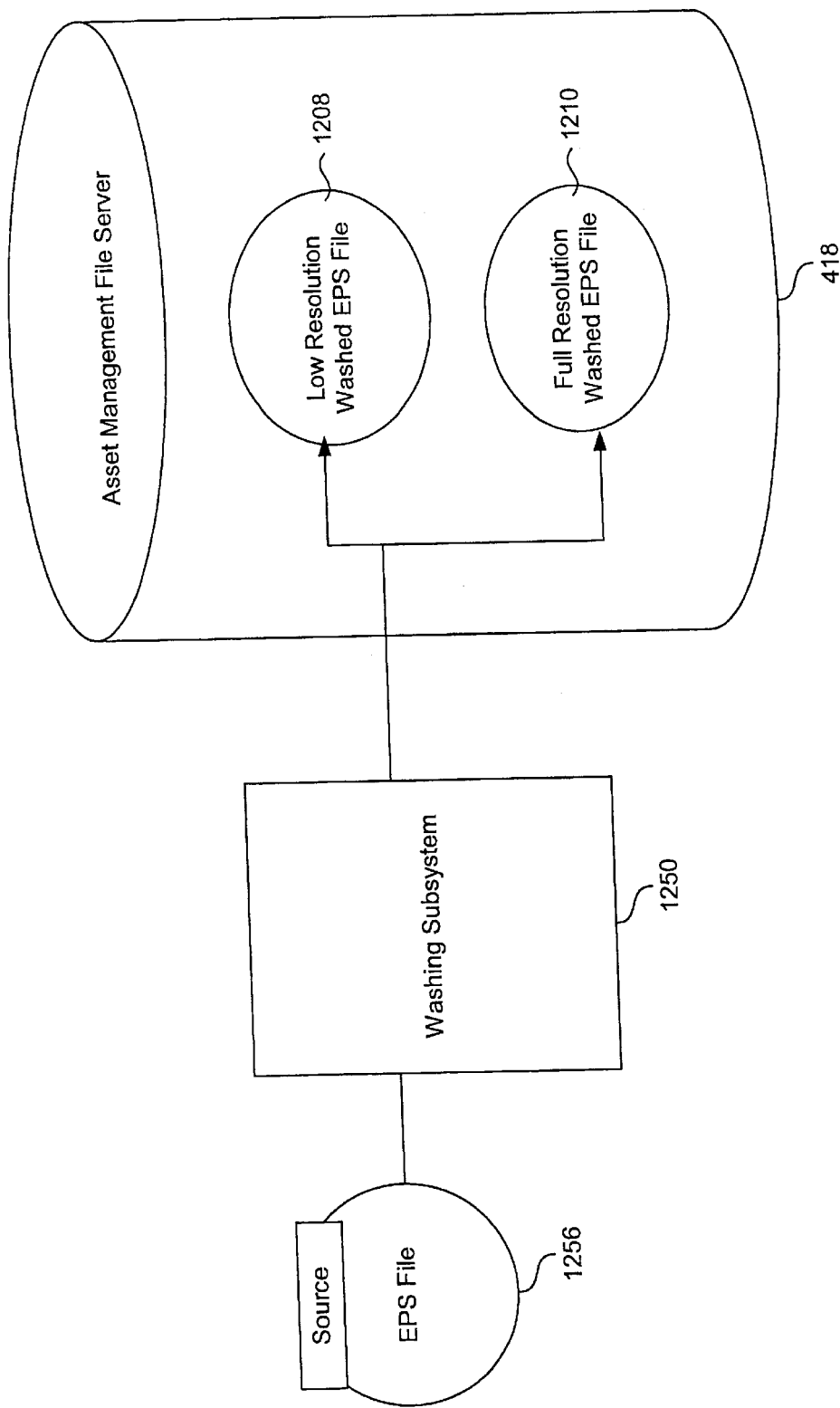
FIG. 19 is a block diagram showing elements used to create washed low and high resolution EPS files.

As also further detailed in the referenced applications, "high resolution" refers to graphics that are actually sent to a vendor's imagesetter at the time for printing. "Low resolution" refers to graphics that are previewed by customers from the OPC module web site, in the place of their high resolution counterparts. High resolution graphics can be extremely large and would be very unwieldy for viewing over the limited bandwidth connections that many customers use. Referring now to FIG. 19, a block diagram is shown of certain representative elements used to create washed low and high resolution EPS files. A source EPS file 1256 is shown being directed into washing subsystem 1250. The washing subsystem can be used to create either a lower resolution washed EPS file 1208, or a full (or high) resolution washed EPS file 1210. As mentioned above, these washed files are stored on the AMFS 418.

Figure 20:
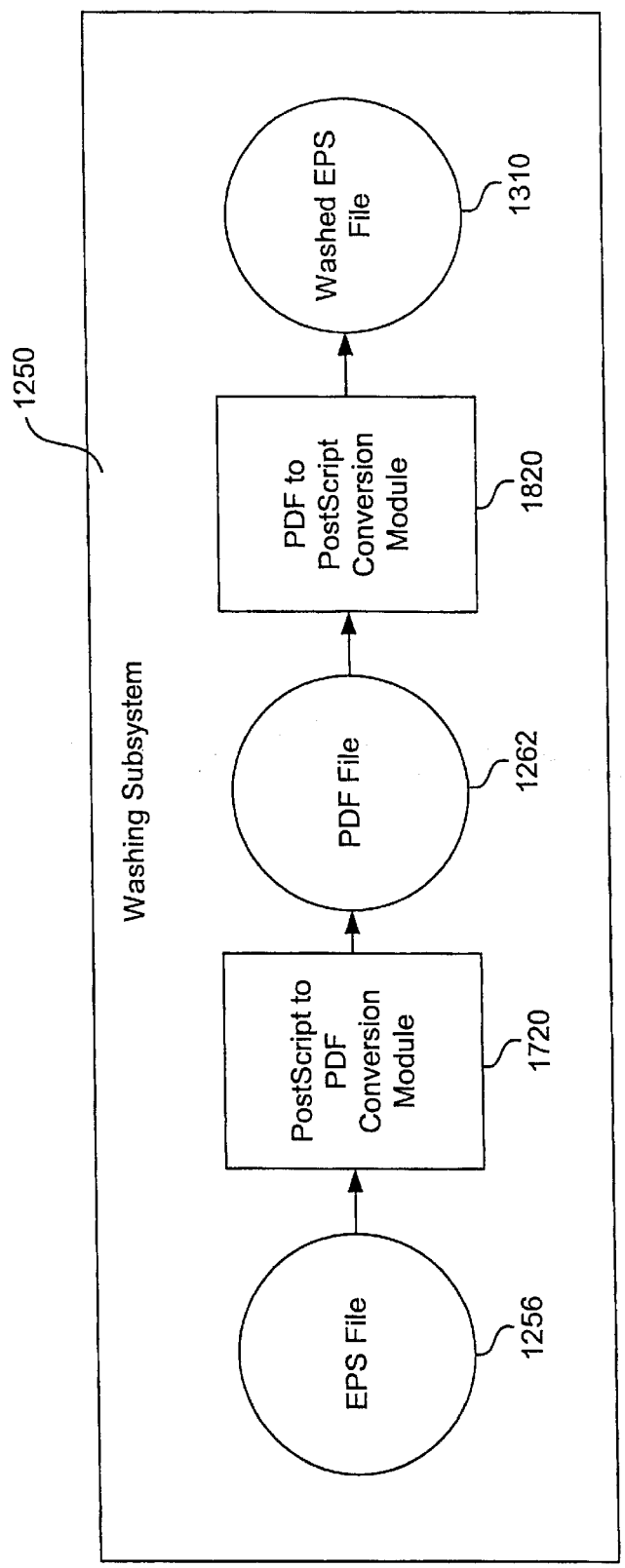
FIG. 20 illustrates a portion of the washing subsystem of FIG. 19 in further detail.

Referring now to FIG. 20, a portion of washing subsystem 1250 of FIG. 19 is shown in further detail. The source EPS file 1256 is fed into a PostScript to PDF conversion module 1720. A PDF file 1262 results (as stored on the AMFS). The PDF file is fed into PDF to PostScript conversion module 1820. The washed EPS file 1310 results and is stored on the AMFS.

Figure 21:
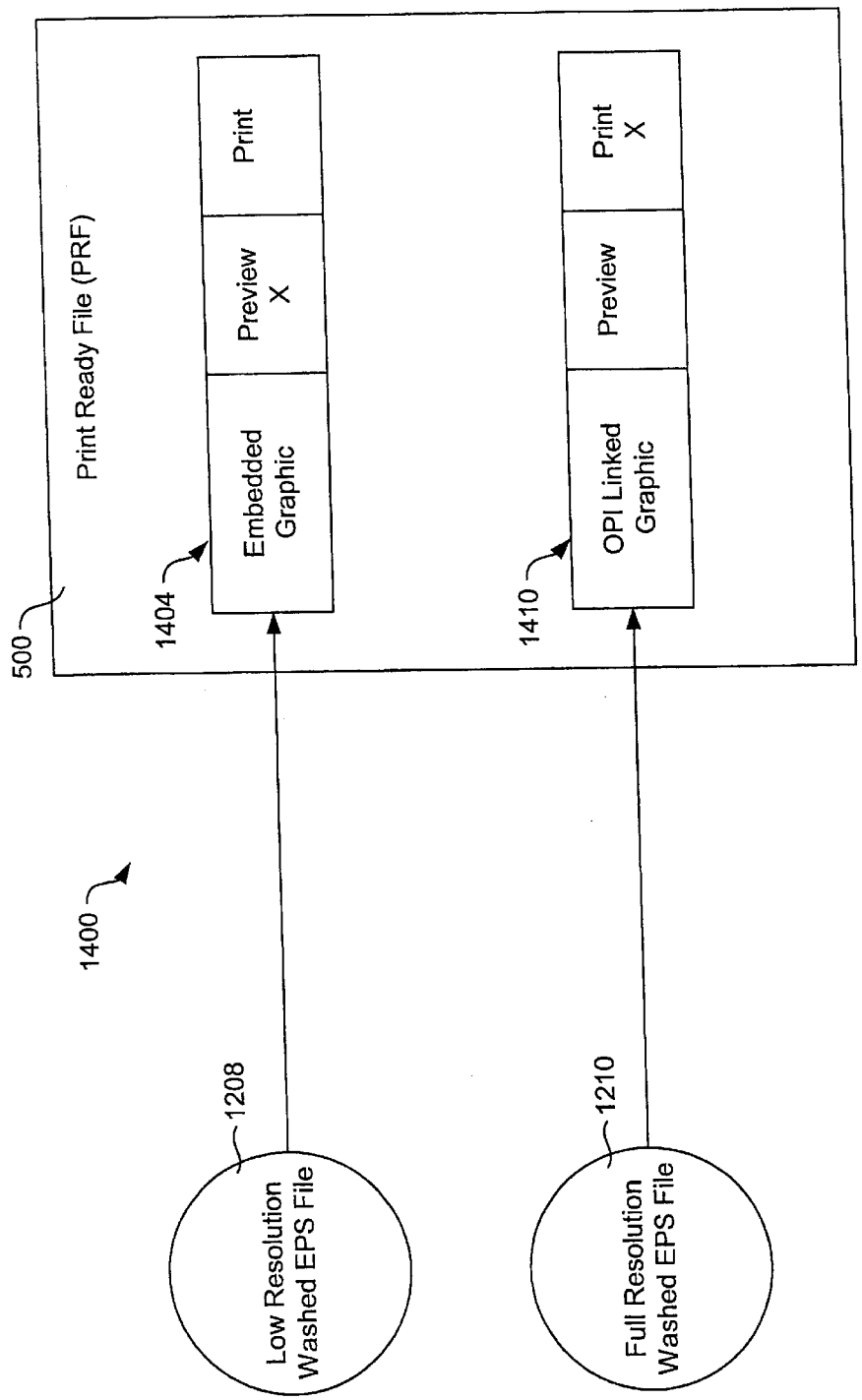
FIG. 21 shows flag settings for use in a consistent PostScript file.

FIG. 21 shows the flag settings for use in a consistent PostScript file to select wash/validate/preview (low resolution) or print (high resolution). For the low resolution washed EPS file 1208, the associated flag settings 1404 include an embedded graphic element, and the Preview flag is set. For the full resolution washed EPS file 1210, associated flag settings 1410 include an OPI-linked graphic element, and the Print flag is set.

FIG. 22 shows an example of a Document Structuring Conventions (DSC) header for an unwashed EPS file (with an EPS file embedded in it). FIG. 23 shows an example of a washed Print EPS file header and footer. Note that a normalized bounding box and additional colors are now shown in the DSC comments for the file. DSC comments are shown with a leading "%%" sign. Other comments are regular PostScript comments. The normalized bounding box is cleaned of comments (i.e., Adobe standard comments). Such comments are published by Adobe so that anyone looking at a particular file can find the bounding box and appropriately read it.

The contrasting header/footers in FIGS. 22 and 23 show the differences between a washed and an unwashed EPS file. For instance, in the unwashed file black was the only color showing in the DSC documented color comments. The EPS file actually has another EPS file embedded in it which has three process colors. In the unwashed EPS example the application which created the file created it improperly. Since the comments are not necessary to have the file processed by the PostScript interpreter, the application wrote the colors incorrectly. After washing, the colors magenta, yellow and black are also shown. Hence after washing, this necessary information from the internal PostScript files is moved into the DSC comments outside. One of the major reasons for washing is that a PostScript interpreter is needed in order to learn all the colors that are within the document. Distiller is such a PostScript interpreter, so when the file is rewritten via the PDF to PostScript conversion module 1820, the file will have the proper colors. A user of the file can thereafter look at the header and know the colors involved in printing (or viewing) the document.

Users might also generate EPS files with any random application (i.e., Freehand, Photoshop or the like). Such users might generate these files improperly, and such files would need to be parsed specifically for every possible variation. For instance, an outside PostScript file might have one font in it, and an inside PostScript file might have another four or five other fonts embedded in it. The outside comments would not show those internal fonts unless washing were performed to correct such comments. Still another benefit of washing is that the fonts are identified and the file can be rejected if the proper font is not found. The present system preferably requires that all the files have the necessary fonts included within them, and that such files cannot refer to any outside documents.

Trapping Subsystem

The trapping subsystem is further described in U.S. patent application Ser. No. 09/480,821, which is herein incorporated by reference.

Figure 24:
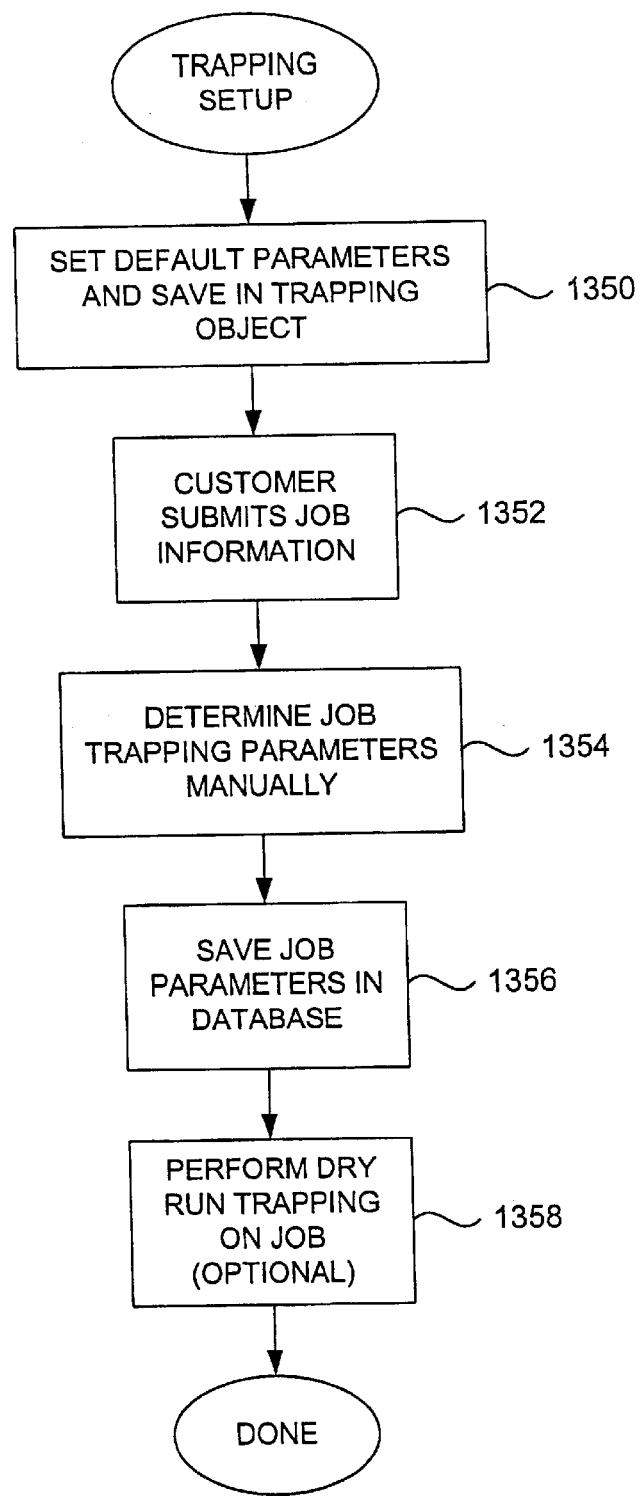
FIG. 24 is a block diagram illustrating a trapping subsystem according to one embodiment of the invention.

FIG. 24 is a block diagram illustrating a trapping subsystem 1300 according to one embodiment of the invention. Trapping subsystem 1300 provides an automated hosted environment to perform the pre-press application of trapping upon a suitable file to produce a resultant trapped file 1322. Subsystem 1300 includes ILIAD 410 which includes job trapping parameters for the job to be trapped and a client application such as plater service 428 or product setup module 409 that wishes to perform automated trapping. Trapping gateway service 1302 and trapping processor service 1304 are software processes running on a dedicated server computer that assist with automated trapping.

Either client application 428 or product setup module 409 may make a trapping request of gateway service 1302 which request is relayed to processor service 1304 and stored in a queue 1306. Processor service 1304 also has access to default parameters 1308 to perform automated trapping. Processor service 1304 produces parameter files 1310 for storage on asset management file server (AMFS) 418 and communicates a trap request to master farmer service 550, which is preferably implemented as described in FIGS. 8–11. Master farmer service 550 interacts with farm service 552 in order to request that trapping module 1320 perform a trap of a particular job in order to produce a trapped print ready file 1322 which is stored on AMFS 418.

Figure 25:
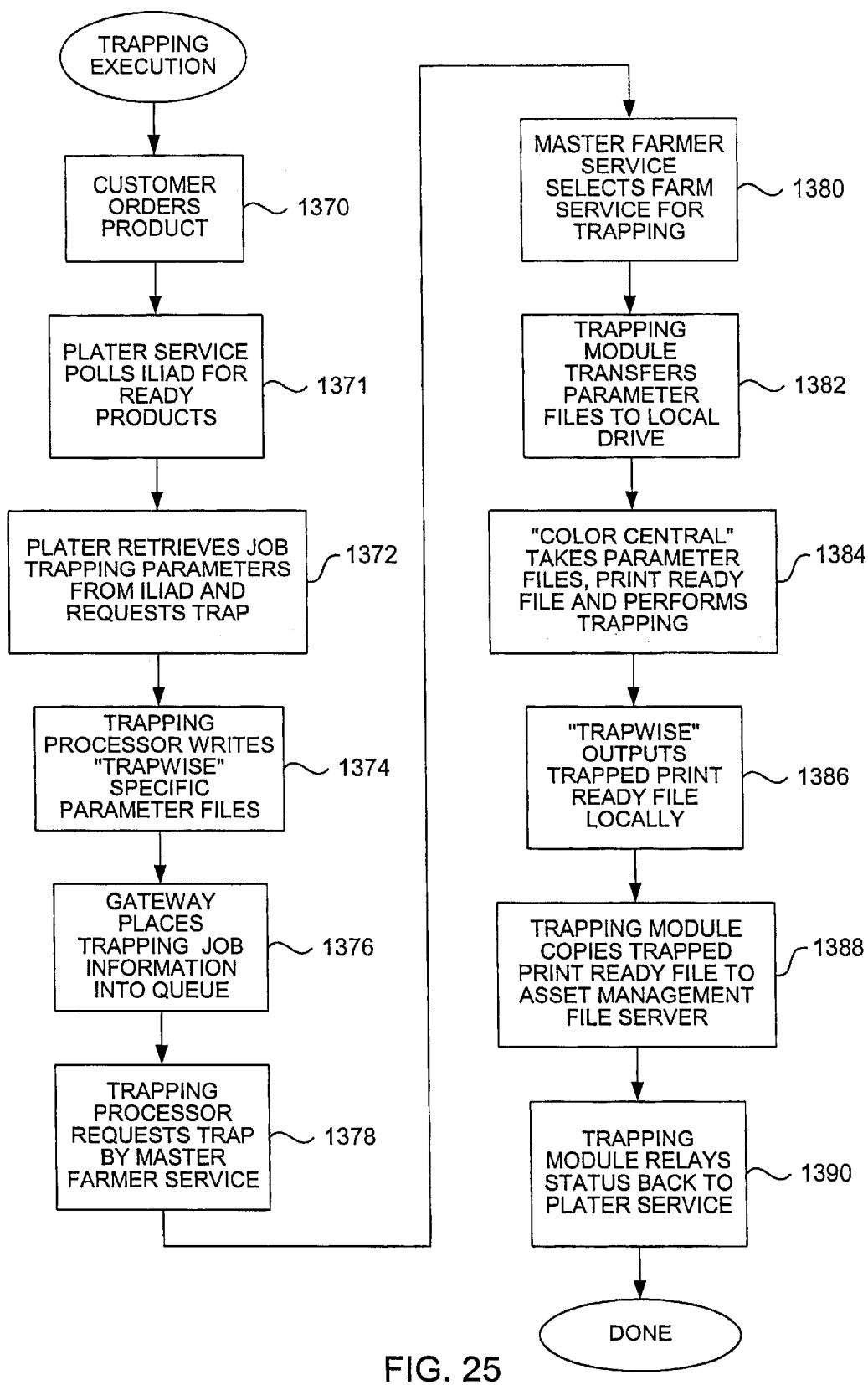
FIG. 25 is a flow diagram describing a process for setting up automated trapping.

FIG. 25 is a flow diagram describing a process for setting up automated trapping. The following steps may occur at any time and in any order before trapping is actually executed. In a performed embodiment, they are implemented as follows. Initially, a software trapping object is instantiated to represent the trapping of a particular job. In step 1350 various default parameters that are desired to be the same for all trapping jobs are set and hardcoded into trapping software associated with trapping processor service 1304. Preferably, these default parameters are stored in a database 1308 accessible by processor service 1304. For example, these default parameters indicate the third party application to be used for trapping, its version number, a language, memory usage settings, temporary file paths, error logging, named pipe configuration, and others.

In step 1352 a customer submits job specific information regarding a product to be printed. For example, a customer may be submitting information for business cards to be printed. Preferably, this step is implemented as described in step 904 of FIG. 13 and is performed using product setup module 409.

In step 1354 various of the trapping parameters for a specific job or for a particular line of products may be determined manually. Of course, the previously set default parameters may be relied upon and no additional parameters need be set in this step. If desired, though, either a representative from the customer or a representative from the entity implementing the on-line automated printing system may specify additional trapping parameters or may override various of the default parameters. These parameters may be entered using product setup module 409 or in another fashion. Examples of trapping parameters that may be set in this step include trap widths, overprint specifications, choke information, spread information, bleed information, and trap zones.

In step 1356 these additional job trapping parameters are then saved into ILIAD 410. In step 1358 an optional dry run of trapping may be performed on the job. In a dry run of trapping, the client application that requested trapping would most likely be product set up module 409 (for example) instead of plater service 428. Currently dry run plating is performed through the use of the product setup module (FD32). Essentially, the user selects a product and chooses a dry run format to view. In this case, the user would select the Trapped PRF dry run view. The product setup module asks the Farm to generate a PRF then asks the Farm to trap the PRF. The user can then view the trapped PRF through the use of any third party PostScript viewer. Once the above trapping setup process has been completed, the system is ready to execute trapping of a particular file.

Figure 26:
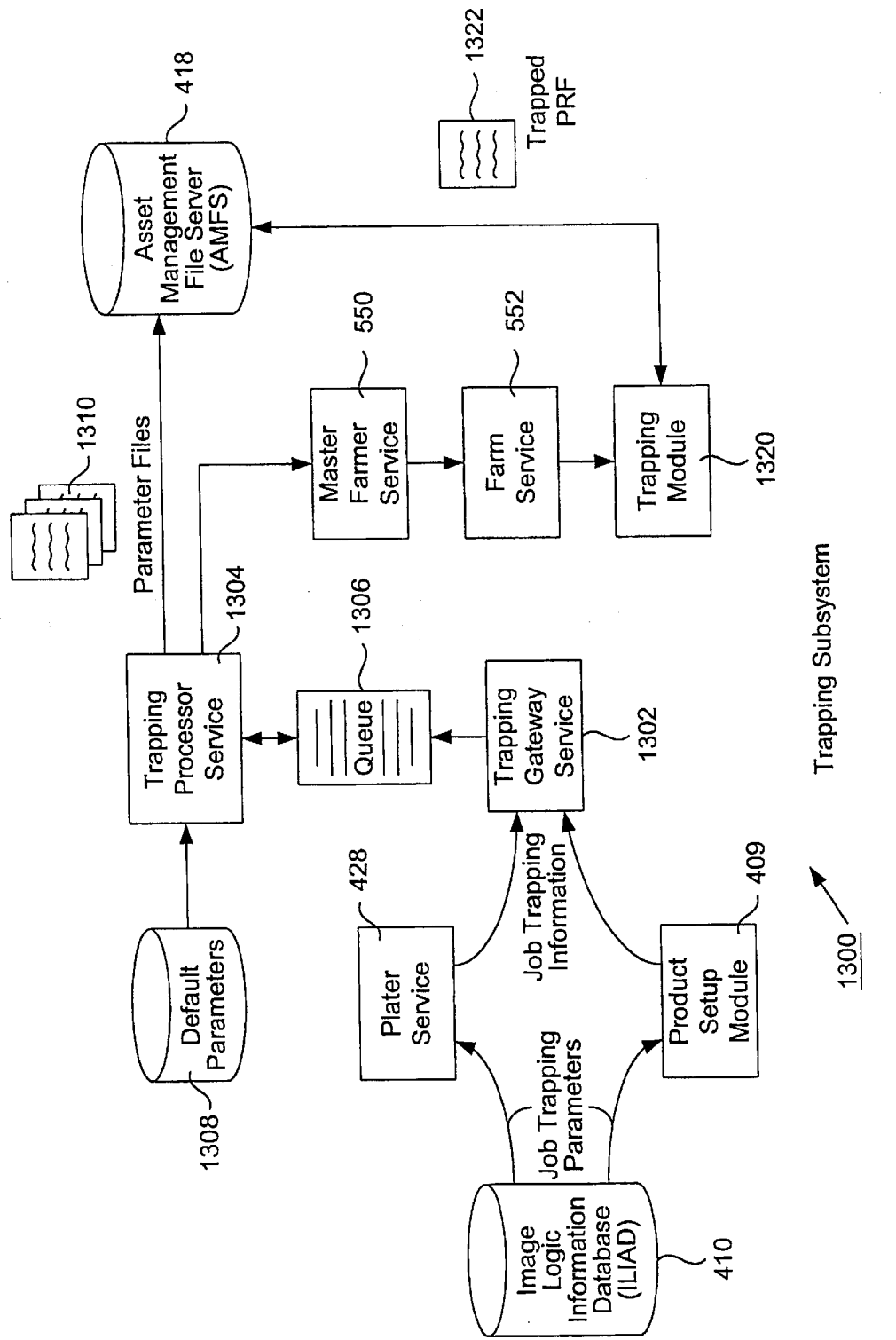
FIG. 26 is a flow diagram illustrating execution of an automated, hosted prepress trapping application.

FIG. 26 is a flow diagram illustrating execution of an automated, hosted pre-press trapping application. It should be appreciated that any of a variety of client applications may request that automated trapping occur. As noted above, product setup module 409 may request automated trapping of a particular file to perform a dry run. Other client applications that may request trapping include the plater service, or possibly the OPC module. The plater service traps files for print purposes, both the product setup module and OPC would trap files for previewing and/or testing.

The below example illustrates a scenario in which the client application is plater service 428 which is requesting automated trapping in the context of performing a print job for a customer.

In step 1370 a customer interacts with web server 408 and orders a particular product. Preferably, this step is implemented as previously described in step 906 of FIG. 13. For example, a customer may access their custom web site to provide a particular name and title for a new business card to be printed for a new employee. The style for the business card, standard information and a company logo will have already been supplied and proofed during customer set up which is step 904 of FIG. 13. Once a customer orders a new product to be printed, this information is stored in ILIAD.

In step 1371 the plater service continuously polls ILIAD to determine whether there is a product ready to be trapped. In one embodiment, a trapping flag may be set in association with the data stored in ILIAD to indicate to the plater service that a particular job needs to be trapped. In this example, the plater service is looking for a batched set of Print Ready Files that need to be trapped. Previously, batcher 426 has performed logical imposition according to standard techniques. In step 1372 the plater retrieves the previously stored job trapping parameters from ILIAD and request a trap of trapping gateway service 1302 for a particular job. Also passed from the plater service are the location of the input Print Ready File to be trapped and output location for the resultant trapped file. Together the job trapping parameters and the Print Ready File input and output are referred to as the trapping job information. This trapping job information is specific information intended for a third party application that will actually perform the trap. Additionally, the plater requests creation of a trapping object to represent the trapping job.

In step 1374 trapping processor 1304 (by way of the trapping object) writes specific parameter files 1310 using the trapping job information and any previously hardcoded default parameters 1308. In this example, the third party application that will be performing the trapping is the Trapwise software tool; thus, parameter files specific to this product are written in this step. An example of a parameter file for the Trapwise software tool may be found in Appendix A.

In step 1376, gateway service 1302 places all of the trapping job information into queue 1306. Preferably, this is performed by placing an object reference in the queue which refers to the previously created trapping object. In one embodiment, priority in the queue is determined based upon the type of client application requesting trapping. For example, a plater service requesting trapping would receive a higher priority than a product setup module requesting trapping. In step 1378 trapping processor 1304 requests a trap of a particular job in its queue 1306 by making a request of Master Farmer service 550.

In step 1380 the Master Farmer service selects a particular Farm service 552 to perform the trapping. Master Farmer service 550 preferably makes this selection as previously described in FIGS. 8–11 and takes into account load balancing, the optimal module to perform the trapping, etc. In this step Farm service 552 selects a particular trapping module 1320 to perform the trap.

In step 1382 the trapping module transfers parameter files 1310 and the particular Print Ready File to be trapped from asset management file server 418 to a local drive for more efficient processing. In step 1384 the software application Color Central takes the parameter files, the input Print Ready File and uses the Trapwise application to perform trapping of the Print Ready File. Using the applications Color Central and Trapwise in this fashion is a step known to those of skill in the art. Color Central is an automated front end to Trapwise and uses a "hot folder" implementation. Essentially, parameter files are placed in appropriate folders, then an input PostScript file is dropped into a "waiting" folder. Color Central sees the PostScript file in the waiting folder and communicates through named pipes to Trapwise the parameters, the file to be trapped, and its desired output location. The trapping module then polls the output location for file existence. In an alternative embodiment, such central control may be avoided by directing the input Print Ready File directly to Trapwise through a pipe. In other words, the use of the hot folder Color Central system could be eliminated and Trapwise directly controlled through the same named pipe mechanism Color Central currently uses.

In step 1386 Trapwise outputs the resultant trapped Print Ready File to a local drive. In step 1388 the trapping module copies the trapped file 1322 to asset management file server 418. In step 1390 the trapping module relays completion status back through the requesting processes to the client application which in this case is plater service 428. In other words, notice of completion is relayed to Farm service 552, to Master Farmer service 550, back to trapping processor 1304, back to trapping gateway 1302 and eventually back to the requesting client application.

It should be noted that the requesting client application and each service involved in the chain is continuously polling a service farther down the chain for any status information throughout the trapping process. For example, once plater service 428 requests a trap of trapping gateway 1302 it continually polls the trapping gateway for status. In turn, trapping gateway 1302 continuously checks the status of the job in queue 1306. Trapping processor 1304 continuously updates the job status in queue 1306 based upon information received from Master Farmer service 550. In other words, trapping processor 1304 is continually polling Master Farmer service 550 for job status. In turn, the Master Farmer is continually polling Farm service 552 for information regarding the status of the trapping being performed by trapping module 1320. Finally, trapping module 1320 is continually sends back status information to Farm service 552 including the length of time estimated to be remaining for trapping, whether the trapping job has been placed in a Farm queue for processing, whether the job is running, whether the job is done, and whether the job has an error.

Once the trapped Print Ready File 1322 has been stored in asset management file server 418 the system has successfully performed automated, hosted trapping of a file and the trapped file may now be used by another prepress application for further processing.

Imposition Subsystem

The imposition subsystem is further described in U.S. patent application Ser. No. 09/481,550, which is herein incorporated by reference.

Figure 27:
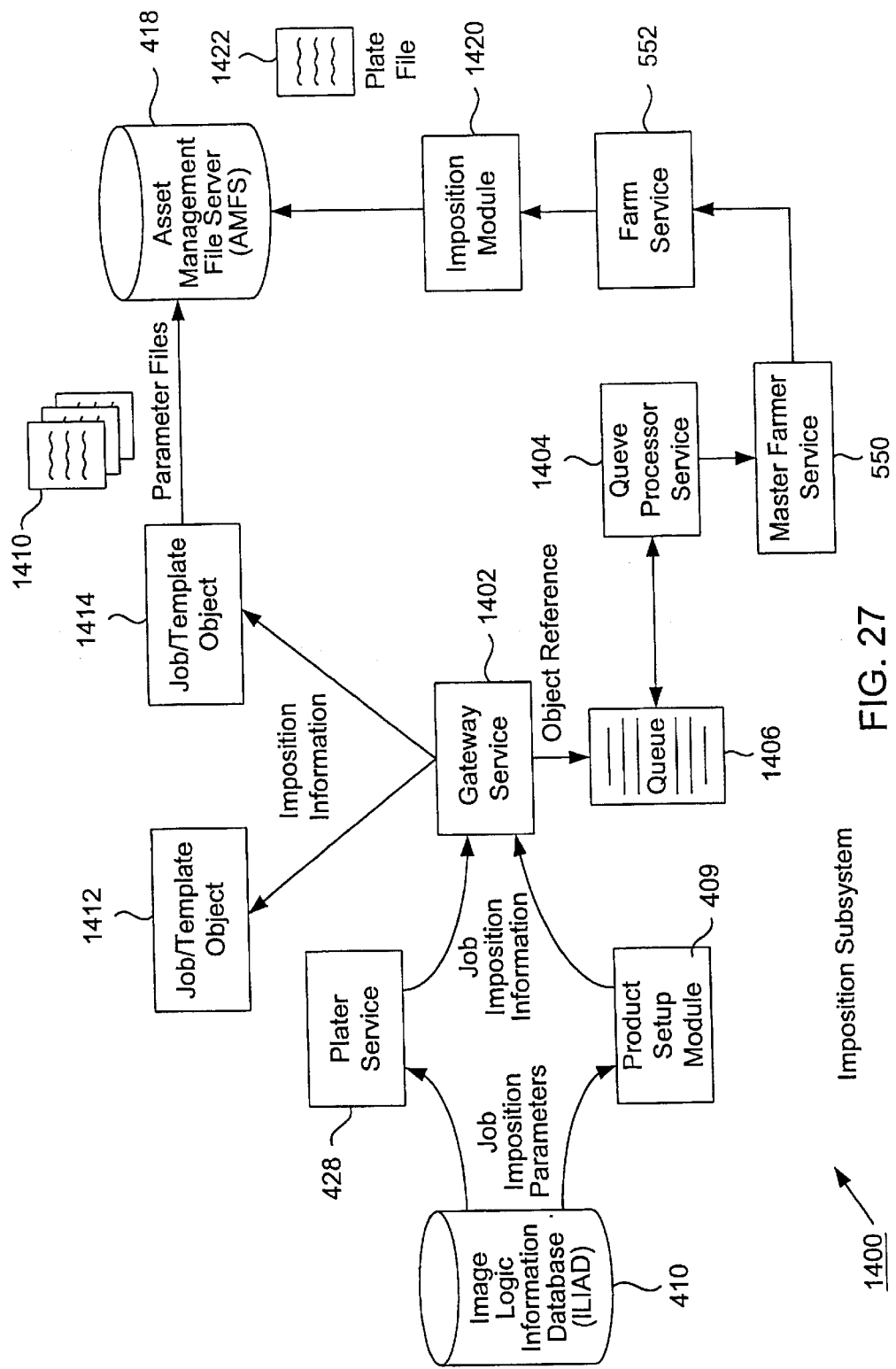
FIG. 27 is a block diagram illustrating an imposition subsystem according to one embodiment of the invention.
Figure 28:
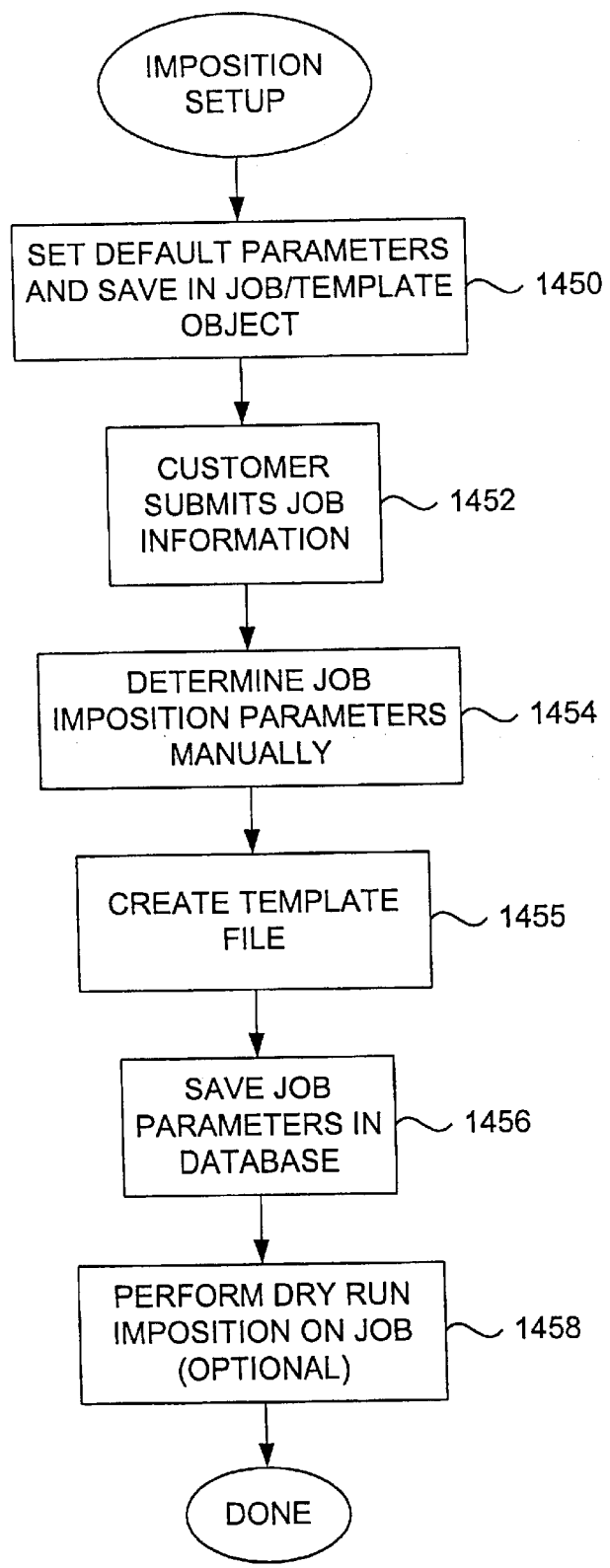
FIG. 28 is a flow diagram describing a process for setting up automated imposition.
Figure 29:
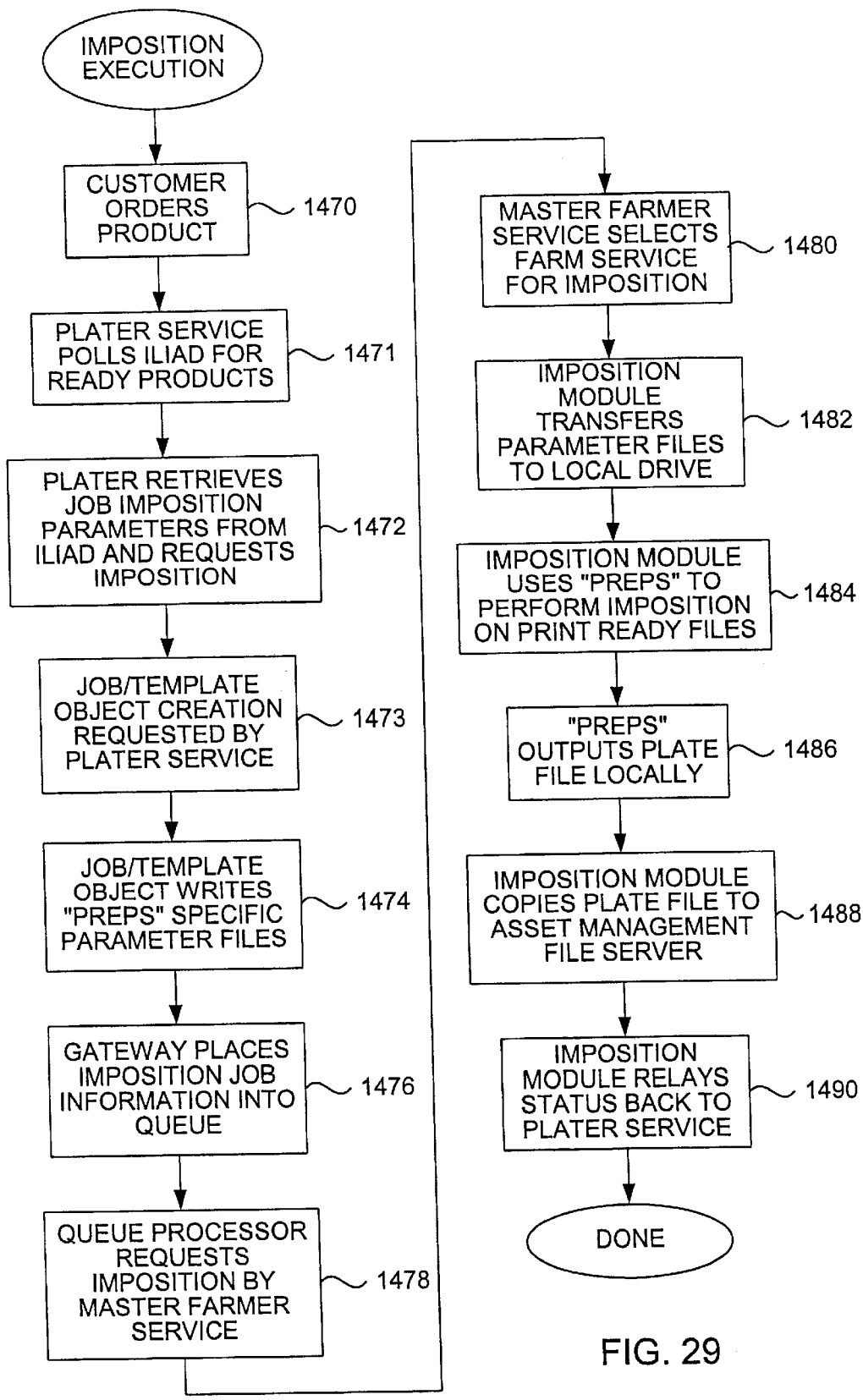
FIG. 29 is a flow diagram illustrating execution of an automated, hosted prepress imposition application.

Referring now to FIGS. 27–29, the imposition process 914 from FIG. 13 is shown and described. Prior to the imposition process, the global flag within the Print Ready File is changed to one representing Print only. Once the flag is flipped, the file is ready to be imposed into a file with many other such Print Ready Files. Imposition software takes several PostScript files and creates a single file with all imposed files embedded, adding crop marks, registration marks, and the like. During imposition, it is important that the OPI comments that were generated are so processed, and the embedded "preview" graphics are replaced. Preferably, the options for the software used in imposition should be set to force the processing of OPI. The preferred embodiment implements this step using software such as Preps by ScenicSoft which has an option called "OPI Force Merge."

FIG. 27 is a block diagram illustrating an imposition subsystem 1400 according to one embodiment of the invention. Imposition subsystem 1400 provides an automated hosted environment to perform the prepress application of imposition upon a suitable file to produce a resultant plate file 1422. Subsystem 1400 includes ILIAD 410 which includes job imposition parameters for the jobs to be imposed and a client application such as plater service 428 or product setup module 409 that wishes to perform automated imposition. Gateway service 1402 and queue processor service 1404 are software processes running on a dedicated server computer that assist with automated imposition.

Either client application 428 or product setup module 409 may make an imposition request of gateway service 1402 which request is relayed to queue processor service 1404 and stored in a queue 1406. Processor service 1404 also has access to default parameters to perform automated imposition. Imposition information for the job is stored in a job/template object 1412 or 1414; more than one job would require more job/template objects. Job/template object 1414 produces parameter files 1410 for storage on asset management file server (AMFS) 418. Queue processor service 1404 communicates an imposition request to master farmer service 550, which is preferably implemented as described in FIGS. 8–11. Master farmer service 550 interacts with farm service 552 in order to request that imposition module 1420 perform imposition of particular jobs in order to produce plate file 1422 which is stored on AMFS 418.

FIG. 28 is a flow diagram describing a process for setting up automated imposition. The following steps may occur at any time and in any order before imposition actually occurs. In a performed embodiment, they are implemented as follows. In step 1450 various default parameters that are desired to be the same for all imposition jobs are set and hardcoded into imposition software associated with job/template objects to be instantiated. For example, these default parameters indicate the third party application to be used for imposition, its version number, a language, memory usage settings, temporary file paths, and error logging.

In step 1452 a customer submits job specific information regarding a product to be printed. For example, a customer may be submitting information for business cards to be printed. Preferably, this step is implemented as described in step 904 of FIG. 13 and is performed using product setup module 409. Additionally, the customer may specify manufacturer-specific imposition requirements such as bleeds, gutters, margins, crop marks that are saved in ILIAD.

In step 1454 various of the imposition parameters for a specific job or for a particular line of products may be determined manually. Of course, the previously set default parameters may be relied upon and no additional parameters need be set in this step. If desired, though, either a representative from the customer or a representative from the entity implementing the on-line automated printing system may specify additional imposition parameters or may override various of the default parameters. These parameters may be entered using product setup module 409 or in another fashion. Most likely these parameters are determined internally, but a customer may specify a particular imposition such as 2-up, 4-up, 8-up, etc. Examples of imposition parameters that may be set in this step include bleeds, gutters, margins, and crop marks.

In step 1455 a template file is created to be used as input to a software tool that will actually perform the imposition; the template file is stored in AMFS 418. Preferably the file is created internally, but may also be supplied by a print vendor or customer. In a preferred embodiment the Preps software tool is used to perform imposition and the template file created is specific for that software. An example of a template file is shown in Appendix B.

In step 1456 the additional job imposition parameters from step 1454 are saved into ILIAD 410. Additionally, certain information from the template file is also stored into ILIAD such as file name, rows, columns, pages per position, template name, signature name(s), and number of sides.

In step 1458 an optional dry run of imposition may be performed on jobs. In a dry run of imposition, the client application that requested imposition would most likely be product set up module 409 (for example) instead of plater service 428. Currently dry run plating is performed through the use of the product setup module (FD32). Essentially, the user selects a product and chooses a dry run format to view. In this case, the user would select the Imposition PRF dry run view. The product setup module asks the Farm to generate a PRF then asks the Farm to impose the PRF. The user can then view the imposed PRF through the use of any third party PostScript viewer. Once the above imposition setup process has been completed, the system is ready to impose particular files.

FIG. 29 is a flow diagram illustrating execution of an automated, hosted pre-press imposition application. It should be appreciated that any of a variety of client applications may request that automated imposition occur. As noted above, product setup module 409 may request automated imposition of particular files to perform a dry run. Other client applications that may request imposition include the plater service, or the OPC module.

The below example illustrates a scenario in which the client application is plater service 428 which is requesting automated imposition in the context of performing a print job for a customer.

In step 1470 a customer interacts with web server 408 and orders a particular product. Preferably, this step is implemented as previously described in step 906 of FIG. 13. For example, a customer may access their custom web site to provide a particular name and title for a new business card to be printed for a new employee. The style for the business card, standard information and a company logo will have already been supplied and proofed during customer set up which is step 904 of FIG. 13. Once a customer orders a new product to be printed, this information is stored in ILIAD.

In step 1471 the plater service continuously polls ILIAD to determine whether there are products ready to be imposed. In one embodiment, an imposition flag may be set in association with the data stored in ILIAD to indicate to the plater service that particular jobs are ready to be imposed. In this example, the plater service is looking for a batched set of Print Ready Files that need to be imposed. Previously, batcher 426 has performed logical imposition according to standard techniques. In step 1472 the plater retrieves the previously stored job imposition parameters from ILIAD (along with any information from the template file that had been stored in ILIAD) and requests imposition from gateway service 1402. Also passed from the plater service are the location of the input Print Ready Files to be imposed, an output location for the resultant plate file, an imposition scheme choice (2-up, 4-up, etc.) and the location of the template file already created. Together this data is referred to as the imposition job information. This imposition job information is specific information intended for a third party application that will actually perform imposition.

In step 1473 the plater service requests that a job/template object 1414 be created to represent the imposition job and to hold the imposition job information. In step 1474 the job/template object writes specific parameter files 1410 using the imposition job information and any previously hard-coded default parameters. In this example, the third party application that will be performing the imposition is the Preps software tool; thus, parameter files specific to this product are written in this step. For this tool, the files written are a job file, a profile, a template file (already created) and a printer file (printer.ppd). An example of these parameter files for the Preps software tool may be found in Appendix B.

In step 1476, gateway service 1402 places the imposition job information into queue 1406. Preferably, this is performed by placing an object reference in the queue which refers to the previously created job/template object. In one embodiment, priority in the queue is determined based upon the type of client application requesting imposition. For example, a plater service requesting imposition would receive a higher priority than a product setup module requesting imposition. In step 1478 queue processor 1404 requests imposition of a particular job in its queue 1406 by making a request of Master Farmer service 550.

In step 1480 the Master Farmer service selects a particular Farm service 552 to perform imposition. Master Farmer service 550 preferably makes this selection as previously described in FIGS. 8–11 and takes into account load balancing, the optimal module to perform imposition, etc. In this step Farm service 552 selects a particular imposition module 1420 to perform imposition.

In step 1482 the imposition module transfers parameter files from asset management file server 418 to a local drive for more efficient processing. The location of the batched set of Print Ready Files for imposition is stored in the job file. In step 1484 the software application Preps is used by the imposition module to perform imposition on the batched set of Print Ready Files. The imposition module takes the parameter files, the Print Ready Files, a Preps DDE interface and uses the Preps application to perform imposition. Using the application Preps in this fashion is a step known to those of skill in the art. An example of a representative DDE file is found in Appendix B. In the preferred embodiment using Print Ready Files (PRF), each PRF is retrieved from the asset management file server 418. Each global flag of each PRF is set to "Print" mode.

In step 1486 Preps outputs the resultant plate file to a local drive. Plate file 1422 is an imposed, color-separated (if color separation has been performed) file that is imagesetter dependent. In step 1488 the imposition module copies the plate file 1422 to asset management file server 418. In step 1490 the imposition module relays completion status back through the requesting processes to the client application which in this case is plater service 428. In other words, notice of completion is relayed to Farm service 552, to Master Farmer service 550, back to queue processor service 1404, back to gateway service 1402 and eventually back to the requesting client application.

It should be noted that the requesting client application and each service involved in the chain is continuously polling a service farther down the chain for any status information throughout imposition. For example, once plater service 428 requests imposition of gateway 1402 it continually polls the gateway for status. In turn, gateway 1402 continuously checks the status of the job in queue 1406. Queue processor 1404 continuously updates the job status in queue 1406 based upon information received from Master Farmer service 550. In other words, queue processor 1404 is continually polling Master Farmer service 550 for job status. In turn, the Master Farmer is continually polling Farm service 552 for information regarding the status of the imposition being performed by imposition module 1420. Finally, imposition module 1520 continually sends back status information to Farm service 552 including the length of time estimated to be remaining for trapping, whether the trapping job has been placed in a Farm queue for processing, whether the job is running, whether the job is done, and whether the job has an error.

Once the plate file 1422 has been stored in asset management file server 418 the system has successfully performed automated, hosted imposition of a set of files and the plate file may now be used by the system for printing or other processing.

Color Separation Subsystem

The color separation subsystem is further described in U.S. patent application Ser. No. 09/480,332, which is herein incorporated by reference.

Figure 30:
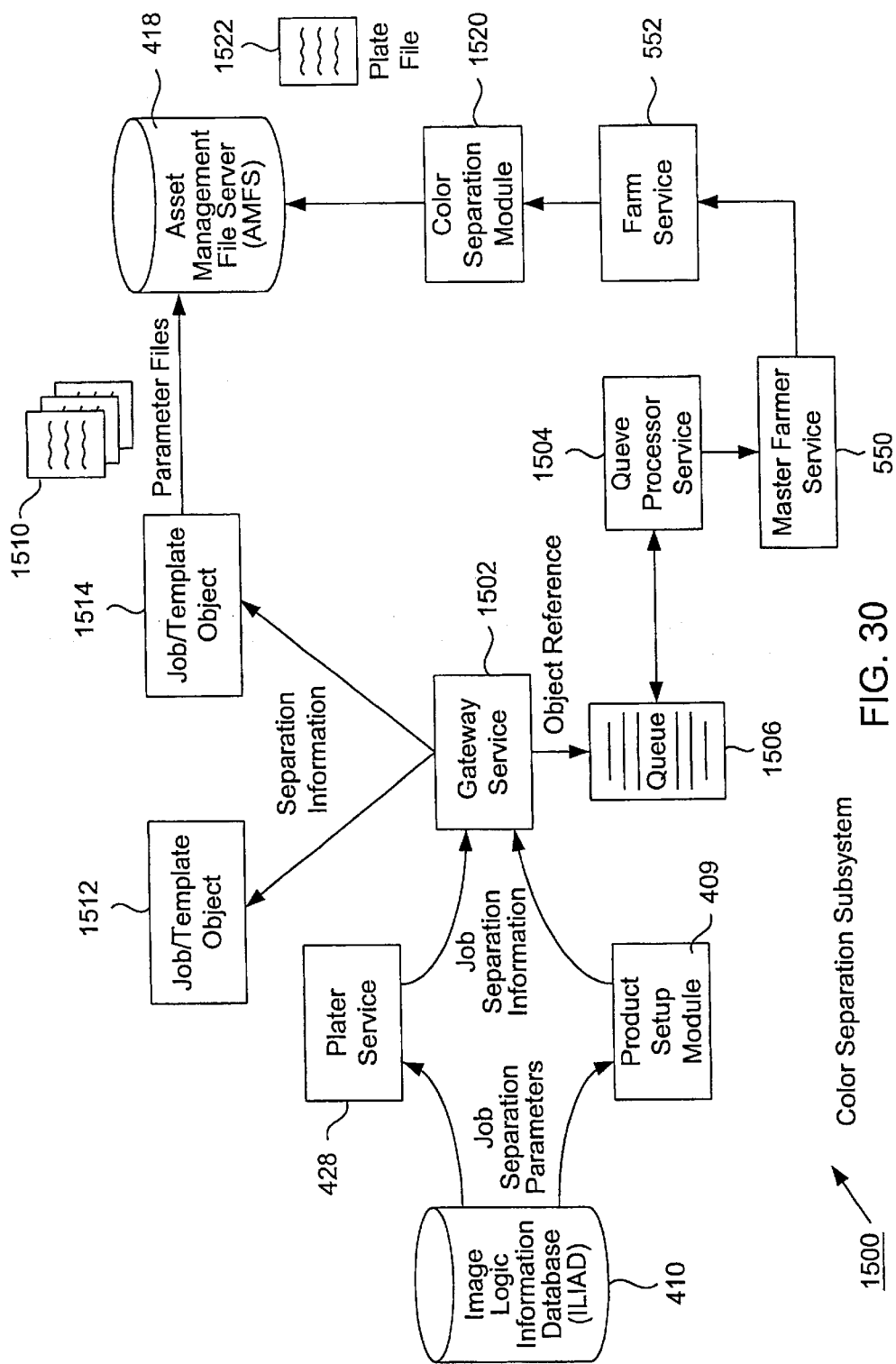
FIG. 30 is a block diagram illustrating a color separation subsystem according to one embodiment of the invention.
Figure 31:
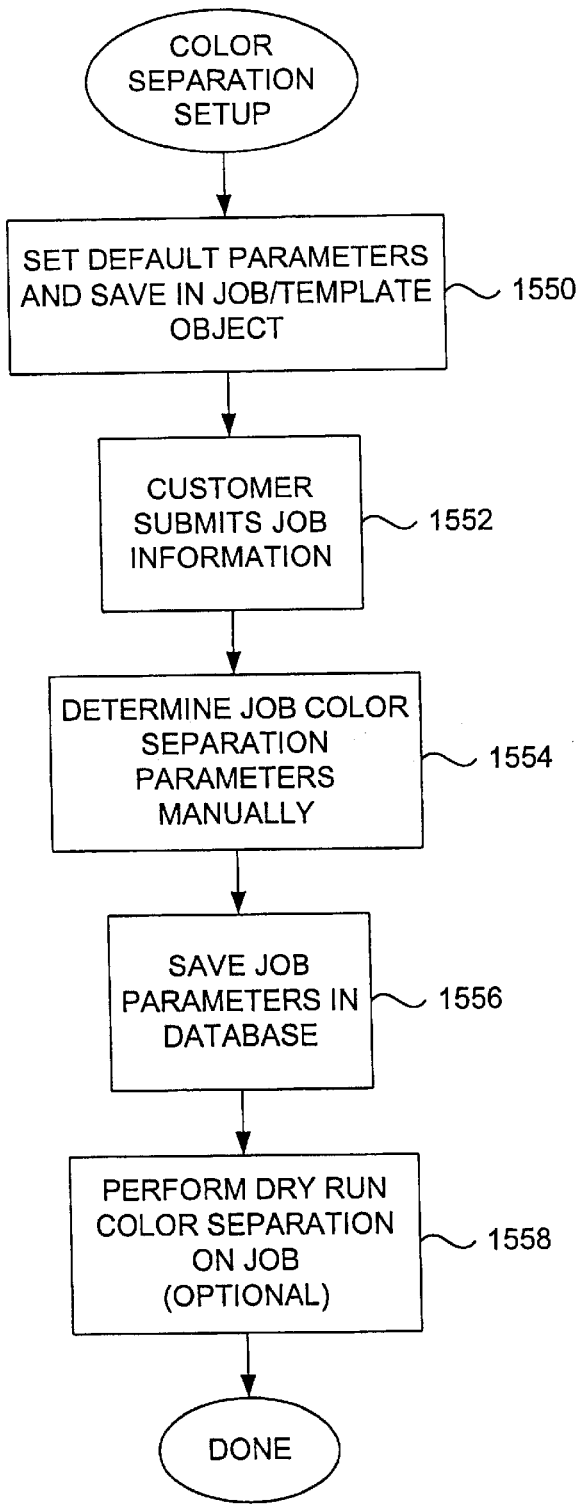
FIG. 31 is a flow diagram describing a process for setting up automated color separation.
Figure 32:
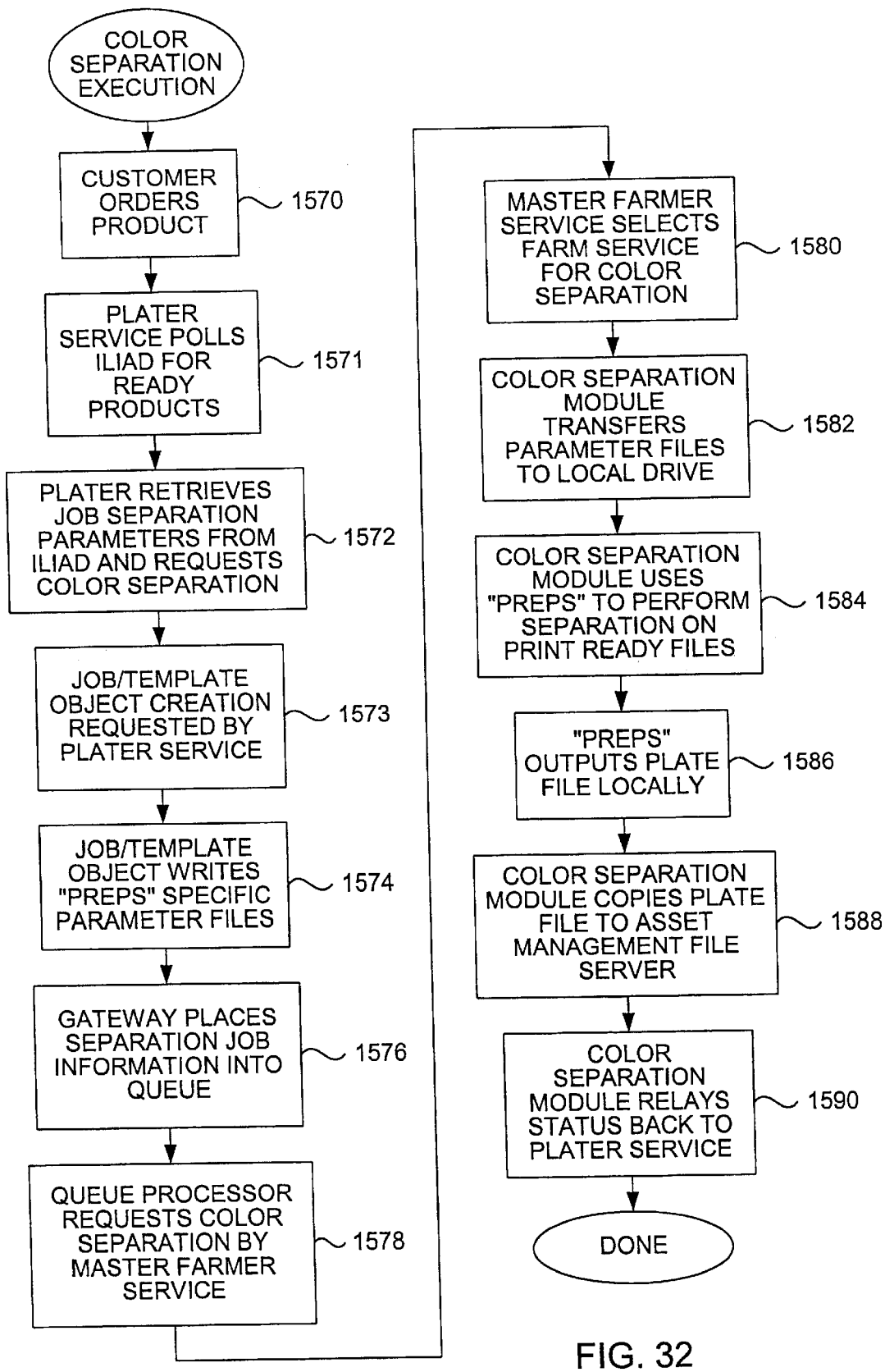
FIG. 32 is a flow diagram illustrating execution of an automated, hosted prepress color separation application.

Referring now to FIGS. 30–32, the color separation process 914 from FIG. 13 is shown and described. Color separation typically occurs just after or in conjunction with imposition and the result is the plate file. Just prior to the imposition process, the global flag within the Print Ready File is changed to one representing Print only. Once the flag is flipped, the file is ready to be imposed into a file with many other such Print Ready Files and then color separated. Imposition/color separation software takes several Post-Script files and creates a single file with all imposed files embedded, adding crop marks, registration marks, and the like. During imposition, it is important that the OPI comments that were generated are so processed, and the embedded "preview" graphics are replaced. Preferably, the options for the software used in imposition should be set to force the processing of OPI. The preferred embodiment implements this step using software such as Preps by ScenicSoft which has an option called "OPI Force Merge."

FIG. 30 is a block diagram illustrating a color separation subsystem 1500 according to one embodiment of the invention. Color separation subsystem 1500 provides an automated hosted environment to perform the pre-press application of color separation upon a suitable file to produce a resultant plate file 1522. Subsystem 1500 includes ILIAD 410 which includes job separation parameters for the job to be separated and a client application such as plater service 428 or product setup module 409 that wishes to perform automated color separation. Gateway service 1502 and queue processor service 1504 are software processes running on a dedicated server computer that assist with automated color separation.

Either client application 428 or product setup module 409 may make a separation request of gateway service 1502 which request is relayed to queue processor service 1504 and stored in a queue 1506. Processor service 1504 also has access to default parameters to perform automated color separation. Separation information for the job is stored in a job/template object 1512 or 1514; more than one job would require more job/template objects. Job/template object 1514 produces parameter files 1510 for storage on asset management file server (AMFS) 418. Queue processor service 1504 communicates a separation request to master farmer service 550, which is preferably implemented as described in FIGS. 8–11. Master farmer service 550interacts with farm service 552 in order to request that color separation module 1520 perform separation of a particular job in order to produce plate file 1522 which is stored on AMFS 418.

FIG. 31 is a flow diagram describing a process for setting up automated color separation. The following steps may occur at any time and in any order before color separation actually occurs. In a performed embodiment, they are implemented as follows. In step 1550 various default parameters that are desired to be the same for all color separation jobs are set and hardcoded into color separation software. For example, these default parameters indicate the third party application to be used for color separation, its version number, a language, memory usage settings, collate options, DCS options, centering options, location of ".ppd" file and temporary paths.

In step 1552 a customer submits job specific information regarding a product to be printed. For example, a customer may be submitting information for business cards to be printed. Preferably, this step is implemented as described in step 904 of FIG. 13 and is performed using product setup module 409. Additionally, the customer may specify manufacturer-specific color separation requirements such as color treatment (conversion of spot colors to process colors), linescreen, or angle values that are saved in the Iliad database.

In step 1554 various of the color separation parameters for a specific job or for a particular line of products may be determined manually. Of course, the previously set default parameters may be relied upon and no additional parameters need be set in this step. If desired, though, either a representative from the customer or a representative from the entity implementing the on-line automated printing system may specify additional separation parameters or may override various of the default parameters. These parameters may be entered using product setup module 409 or in another fashion. Most likely these parameters are determined internally, but a customer may specify particular parameters. Examples of color separation parameters that may be set in this step include linescreen, angle, conversion of spot colors to process, negativity, and polarity. In step 1556 the additional job separation parameters from step 1554 are saved into ILIAD 410.

In step 1558 an optional dry run of color separation may be performed on the job. In a dry run, the client application that requested color separation would most likely be product set up module 409 (for example) instead of plater service 428. Currently dry run plating is performed through the use of the product setup module (FD32). Essentially, the user selects a product and chooses a dry run format to view. In this case, the user would select the color separation PRF dry run view. The product setup module asks the Farm to generate a PRF then asks the Farm to color separate PRF. The user can then view the color separated PRF through the use of any third party PostScript viewer. Once the above color separation setup process has been completed, the system is ready to color separate particular files.

FIG. 32 is a flow diagram illustrating execution of an automated, hosted pre-press color separation application. It should be appreciated that any of a variety of client applications may request that automated color separation occur. As noted above, product setup module 409 may request automated color separation of a particular file to perform a dry run. Other client applications that may request color separation include the plater service, or possibly the OPC module.

The below example illustrates a scenario in which the client application is the plater service 428 which is requesting automated color separation in the context of performing a print job for a customer.

In step 1570 a customer interacts with web server 408 and orders a particular product. Preferably, this step is implemented as previously described in step 906 of FIG. 13. For example, a customer may access their custom web site to provide a particular name and title for a new business card to be printed for a new employee. The style for the business card, standard information and a company logo will have already been supplied and proofed during customer set up which is step 904 of FIG. 13. Once a customer orders a new product to be printed, this information is stored in ILIAD.

In step 1571 the plater service continuously polls ILIAD to determine whether there are products ready to be imposed and color separated. In one embodiment, a flag may be set in association with the data stored in ILIAD to indicate to the plater service that particular jobs are ready to be imposed and color separated. In this example, the plater service is looking for a batched set of Print Ready Files that need to be imposed and color separated. Previously, batcher 426 has performed logical imposition according to standard techniques. In step 1572 the plater retrieves the previously stored job separation parameters from ILIAD and requests color separation from gateway service 1502. Also passed from the plater service are the location of the input Print Ready Files to be imposed and color separated, an output location for the resultant plate file. Together this data is referred to as the separation job information. This separation job information is specific information intended for a third party application that will actually perform color separation.

In step 1573 the plater service requests that a job/template object 1514 be created to represent the color separation job and to hold the separation job information. In step 1574 the job/template object writes specific parameter files 1510 using the separation job information and any previously hardcoded default parameters. In this example, the third party application that will be performing the color separation is the Preps software tool; thus, parameter files specific to this product are written in this step. For this tool, the files written are a job file, a profile, a template file and a printer file (printer.ppd). An example of these parameter files for the Preps software tool may be found in Appendix B.

In step 1576 gateway service 1502 places the separation job information into queue 1506. Preferably, this is performed by placing an object reference in the queue which refers to the previously created job/template object. In one embodiment, priority in the queue is determined based upon the type of client application requesting color separation. For example, a plater service requesting color separation would receive a higher priority than a product setup module requesting color separation. In step 1578 queue processor 1504 requests color separation of a particular job in its queue 1506 by making a request of Master Farmer service 550.

In step 1580 the Master Farmer service selects a particular Farm service 552 to perform color separation. Master Farmer service 550 preferably makes this selection as previously described in FIGS. 8–11 and takes into account load balancing, the optimal module to perform color separation, etc. In this step Farm service 552 selects a particular color separation module 1520 to perform separation.

In step 1582 the color separation module transfers parameter files from asset management file server 418 to a local drive for more efficient processing. The location of the batched set of Print Ready Files for imposition and color separation is stored in the job file. In step 1584 the software application Preps is used by the color separation module to perform separation on the batched set of Print Ready Files. The color separation module takes the parameter files, the Print Ready Files, a Preps DDE interface and uses the Preps application to perform color separation. Using the application Preps in this fashion is a step known to those of skill in the art. An example of a representative DDE file is found in Appendix B. In the preferred embodiment using Print Ready Files (PRF), each PRF is retrieved from the asset management file server 418. Each global flag of each PRF is set to "Print" mode.

In step 1586 Preps outputs the resultant plate file to a local drive. Plate file 1522 is an imposed, color-separated (if imposition has been performed) file that is imagesetter dependent. In step 1588 the color separation module copies the plate file 1522 to asset management file server 418. In step 1590 the color separation module relays completion status back through the requesting processes to the client application which in this case is plater service 428. In other words, notice of completion is relayed to Farm service 552, to Master Farmer service 550, back to queue processor service 1504, back to gateway service 1502 and eventually back to the requesting client application.

It should be noted that the requesting client application and each service involved in the chain is continuously polling a service farther down the chain for any status information throughout color separation. For example, once plater service 428 requests color separation of gateway 1502 it continually polls the gateway for status. In turn, gateway 1502 continuously checks the status of the job in queue 1506. Queue processor 1504 continuously updates the job status in queue 1506 based upon information received from Master Farmer service 550. In other words, queue processor 1504 is continually polling Master Farmer service 550 for job status. In turn, the Master Farmer is continually polling Farm service 552 for information regarding the status of the color separation being performed by color separation module 1520. Finally, the color separation module 1520 continually sends back status information to Farm service 552 including the length of time estimated to be remaining for trapping, whether the trapping job has been placed in a Farm queue for processing, whether the job is running, whether the job is done, and whether the job has an error.

Once the plate file 1522 has been stored in asset management file server 418 the system has successfully performed automated, hosted color separation of a set of files and the plate file may now be used by the system for printing or other processing.

Postscript to Bitmap Conversion Subsystem

The postscript to bitmap conversion subsystem is further described in U.S. patent application Ser. No. 09/480,869, which is herein incorporated by reference.

Figure 33:
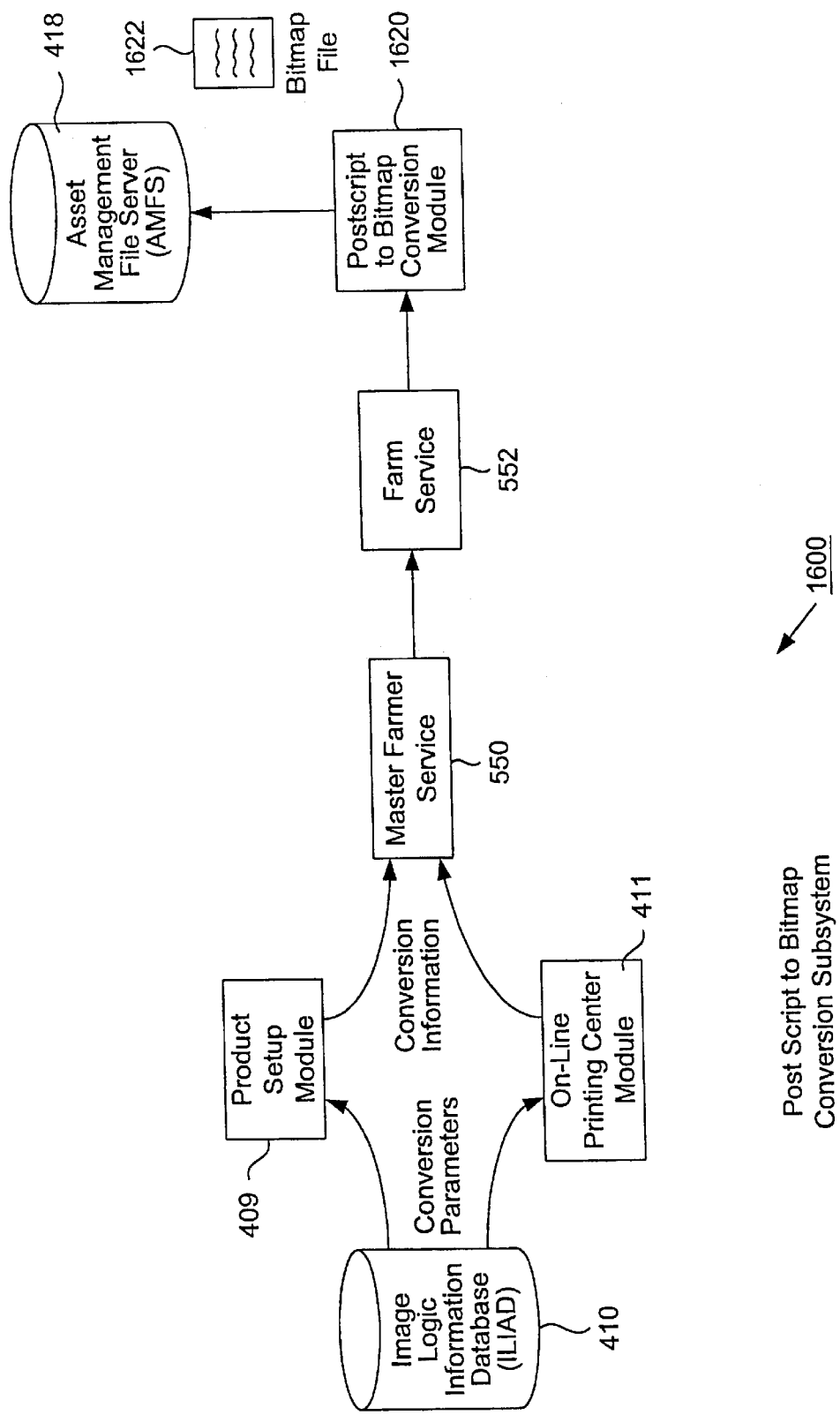
FIG. 33 is a block diagram illustrating a PostScript to bitmap format conversion subsystem according to one embodiment of the invention.

FIG. 33 is a block diagram illustrating a PostScript to bitmap format conversion subsystem 1600 according to one embodiment of the invention. Conversion subsystem 1600 provides an automated hosted environment to perform the pre-press application of converting a suitable PostScript file to a resultant bitmap file 1622. Subsystem 1600 includes ILIAD 410 which includes conversion parameters for the job and a client application such as on-line printing center module 411 or product setup module 409 that wishes to perform automated conversion.

Either client application such as on-line printing center module 411 or product setup module 409 may make a conversion request of master farmer service 550, which is preferably implemented as described in FIGS. 8–11. Conversion parameters along with an input file and an output destination (conversion information) are relayed from the client application to master farmer service 550. Master farmer service 550 interacts with farm service 552 in order to request that conversion module 1620 perform a conversion of a particular job in order to produce a bitmap file 1622 which is stored on AMFS 418.

Figure 34:
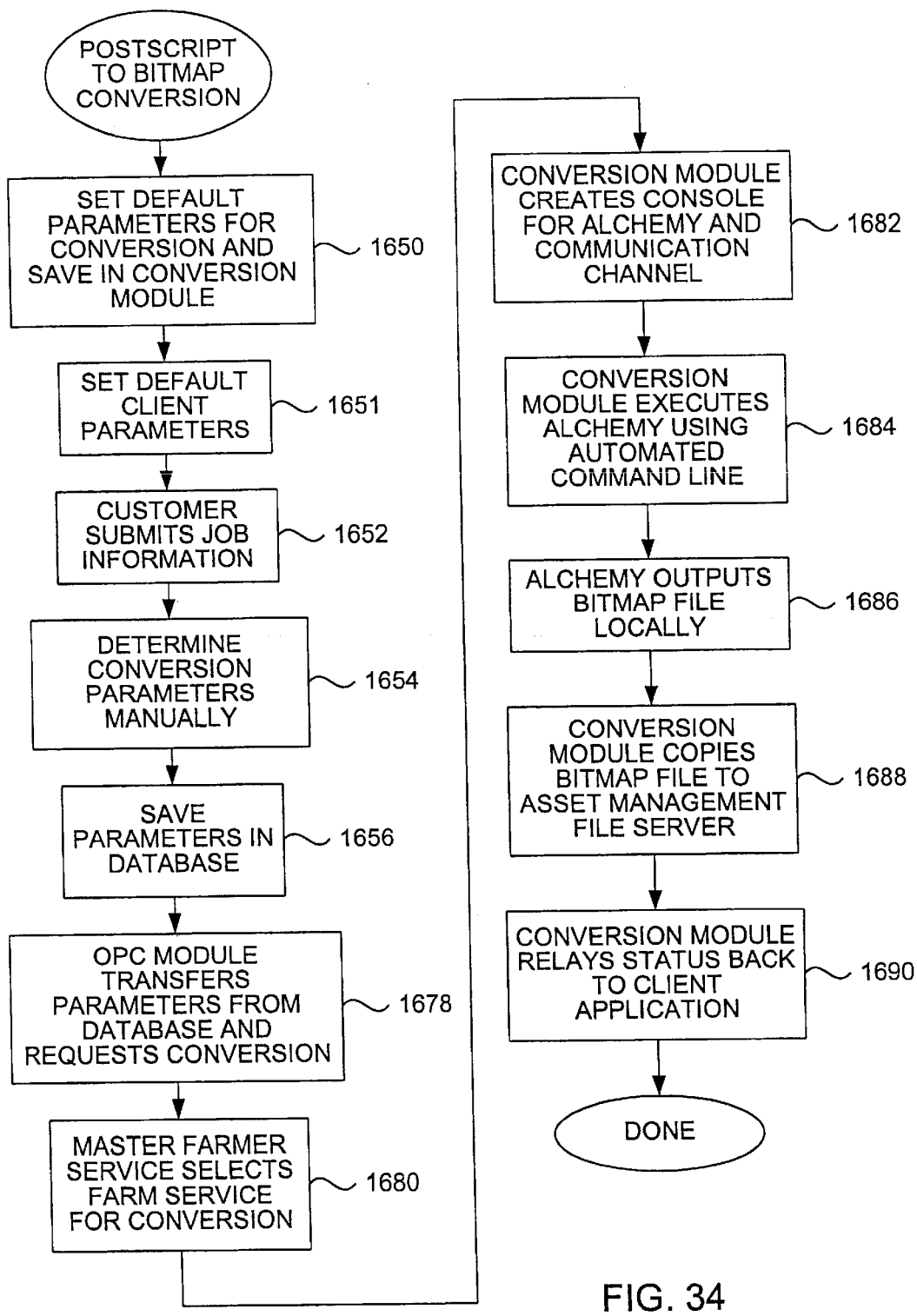
FIG. 34 is a flow diagram illustrating execution of an automated, hosted prepress PostScript to bitmap conversion application.

FIG. 34 is a flow diagram describing a process for initially setting up automated conversion and for executing a conversion. The following steps may occur at any time and in any order before conversion is actually executed. In a performed embodiment, they are implemented as follows. In step 1650 default parameters that are desired to be the same for all conversion jobs are set and hardcoded into conversion module 1620. Preferably, these default parameters are compiled into the module during development. Specifically, the application name for Alchemy "Alchlong.exe" is hardcoded and compiled.

In step 1651 default parameters that depend upon the particular client are set. These are parameters that would have different values depending upon the client that is requesting the conversion. For example, a client application, such as OPC, requesting conversion from PostScript to bitmap format, it might set the parameter OutputDPI to 100. Other client applications, such as the Product setup module, would set the parameter to 300 (for better image quality). Other examples of parameters that may be set differently for different client applications include OutputGrayscale, OutputJPEGCompression, and AntiAliasImage as shown in Table 1 below.

TABLE 1

| Parameters and Sample Values Used | |
|---|---|
| AntiAliasLevel (-Za switch) | 0–4 |
| AntiAliasImage (Boolean) | False |
| OutputWidthInPixels (-Zo switch) | 100 |
| OutputHeightInPixels (-Zo switch) | 100 |
| OutputDPI (-Zd) | 72 |
| OutputGrayscale (-b) | False |
| OutputJPEGCompression (-j) | 1 |

Once the above steps have finished, setup for conversion has been completed, and the system is ready to receive job-specific information from a customer in order to perform a conversion. In step 1652 a customer submits job specific information regarding a product to be printed. For example, a customer may be submitting information for business cards to be printed. Preferably, this step is implemented as described in step 904 of FIG. 13 and is performed using product setup module 409.

In step 1654 various of the conversion parameters for a specific job or for a particular line of products may be determined manually. Of course, the previously set default parameters may be relied upon and no additional parameters need be set in this step. If desired, though, either a representative from the customer or a representative from the entity implementing the on-line automated printing system may specify additional conversion parameters or may override various of the default parameters. These parameters may be entered using product setup module 409 or in another fashion. Examples of conversion parameters that may be set in this step include changing the dots per inch parameter from 300 to 72 if there is a slow network connection and a faster turnaround is desired, outputting grayscale images, input pixel height, input pixel width, zoom, and anitaliasing. In step 1656 these additional conversion parameters are then saved into ILIAD 410.

The following steps illustrate execution of an automated, hosted prepress conversion application. It should be appreciated that any of a variety of client applications may request that automated conversion occur. Product setup module 409 may request automated conversion from PostScript to bitmap format to perform a dry run of plating, and for creating preview and thumbnail images for proofing. Other client applications that may request conversion include the OPC module.

The below example illustrates a scenario in which the client application on-line printing center 411 is requesting automated conversion in order to prepare a proof for a customer (for non-PDF proofing). Firstly, a customer interacts with web server 408 and orders a particular product. Preferably, this step is implemented as previously described in step 906 of FIG. 13. For example, a customer may access their custom web site to provide a particular name and title for a new business card to be printed for a new employee. The style for the business card, standard information and a company logo will have already been supplied during customer set up which is step 904 of FIG. 13. At this point in time, the customer interacts with on-line printing center (OPC) module 411 on web server 408 to request a proof of the product to be ordered in bitmap format.

In step 1678 the OPC module 411 requests conversion of a particular job by making a request of Master Farmer service 550. Concurrently, OPC module 411 transfers any manually set parameters, any parameters saved into ILIAD, and source and destination file names to Master Farmer service 550. Together this information is collectively referred to as conversion information.

In step 1680 the Master Farmer service selects a particular Farm service 552 to perform the conversion and transfers the conversion information. Master Farmer service 550 preferably makes this selection as previously described in FIGS. 8–11 and takes into account load balancing, the optimal module to perform the conversion, etc. In this step Farm service 552 also selects a particular conversion module 1620 to perform the conversion.

In step 1682 the conversion module creates a "console" for the Alchemy software tool and also a communication channel using named pipes. This step is known to those of skill in the art. In step 1684 the conversion module takes the conversion parameters and the input file and executes the Alchemy software tool using an automated command line. Essentially, the conversion module calls the Alchemy tool and gives switches as parameters. Examples of the conversion module command line options used to control Alchemy (with explanations) are found in Appendix C.

In step 1686 Alchemy outputs the resultant bitmap file to a local drive. In step 1688 the conversion module copies the bitmap file 1622 to asset management file server 418. In step 1690 the conversion module relays completion status back through the requesting processes to the client application which in this case is OPC module 411. In other words, notice of completion is relayed to Farm service 552, to Master Farmer service 550, and eventually back to the requesting client application. During execution of the conversion, the conversion module peeks at the console to read the status of the ongoing conversion that is posted there by the Alchemy software tool.

It should be noted that the requesting client application and each service involved in the chain is continuously polling a service farther down the chain for any status information throughout the conversion process. For example, once OPC module 411 requests a conversion of Master Farmer service 550 it continually polls the service for status. In turn, the Master Farmer is continually polling Farm service 552 for information regarding the status of the conversion being performed by conversion module 1620. Finally, conversion module 1620 is continually sending back status information to Farm service 552 including the length of time estimated to be remaining for trapping, whether the trapping job has been placed in a Farm queue for processing, whether the job is running, whether the job is done, and whether the job has an error.

Once bitmap file 1622 has been stored in asset management file server 418 the system has successfully performed automated, hosted conversion of a file and the bitmap file may now be used by another prepress application for further processing.

Postscript to PDF Conversion Subsystem

The postscript to PDF conversion subsystem is further described in U.S. patent application Ser. No. 09/480,881, which is herein incorporated by reference.

Figure 35:
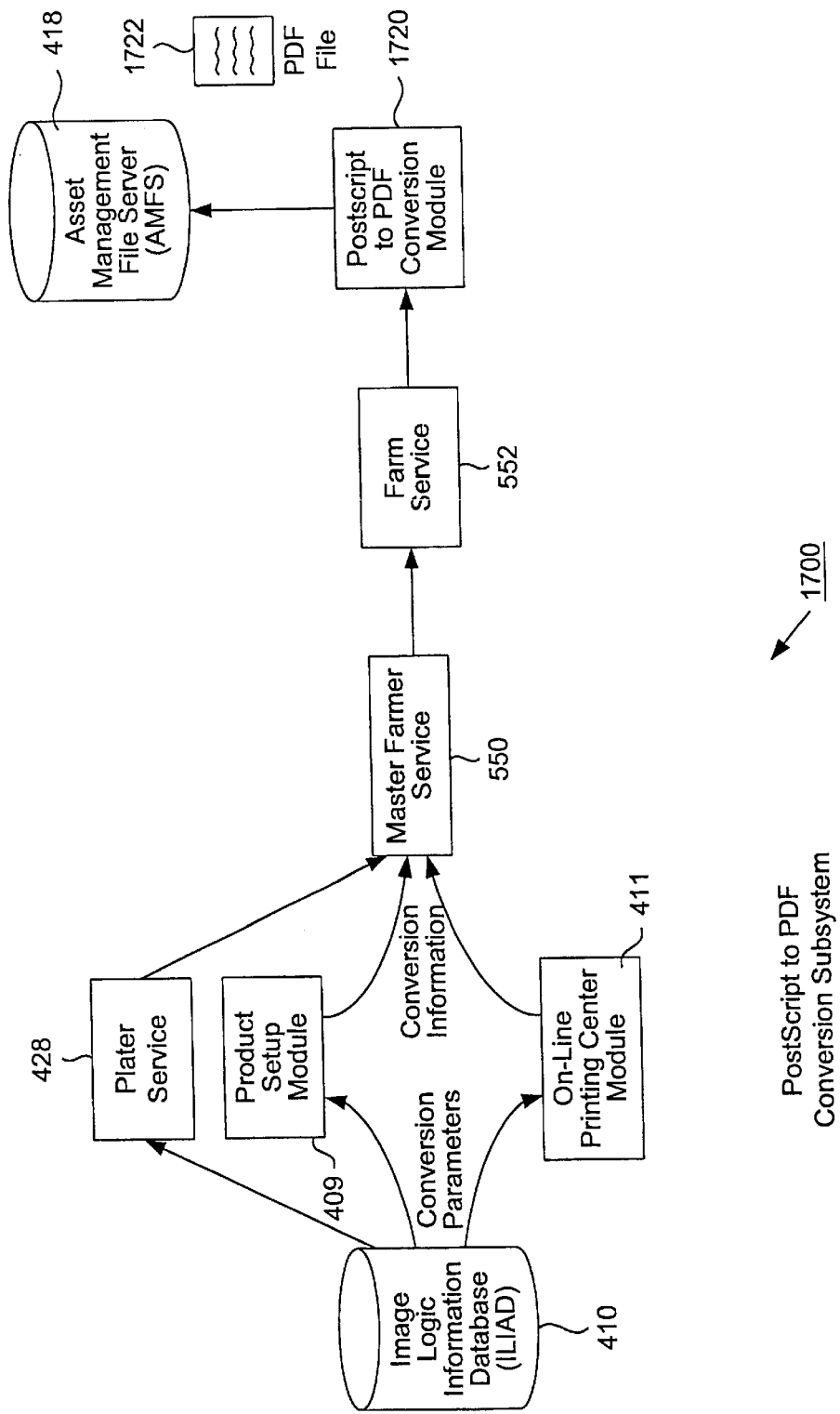
FIG. 35 is a block diagram illustrating a PostScript to PDF conversion subsystem according to one embodiment of the invention.

FIG. 35 is a block diagram illustrating a PostScript to PDF conversion subsystem 1700 according to one embodiment of the invention. Conversion subsystem 1700 provides an automated hosted environment to perform the pre-press application of converting a suitable PostScript file to a resultant PDF file 1722. Subsystem 1700 includes ILIAD 410 which includes conversion parameters for the job and a client application such as on-line printing center module 411, plater service 428 or product setup module 409 that wishes to perform automated conversion.

Any client application such as on-line printing center module 411, plater service 428 or product setup module 409 may make a conversion request of master farmer service 550, which is preferably implemented as described in FIGS. 8–11. Conversion parameters along with an input file and an output destination (conversion information) are relayed from the client application to master farmer service 550. Master farmer service 550 interacts with farm service 552 in order to request that conversion module 1720 perform a conversion of a particular job in order to produce PDF file 1722 which is stored on AMFS 418.

Figure 36:
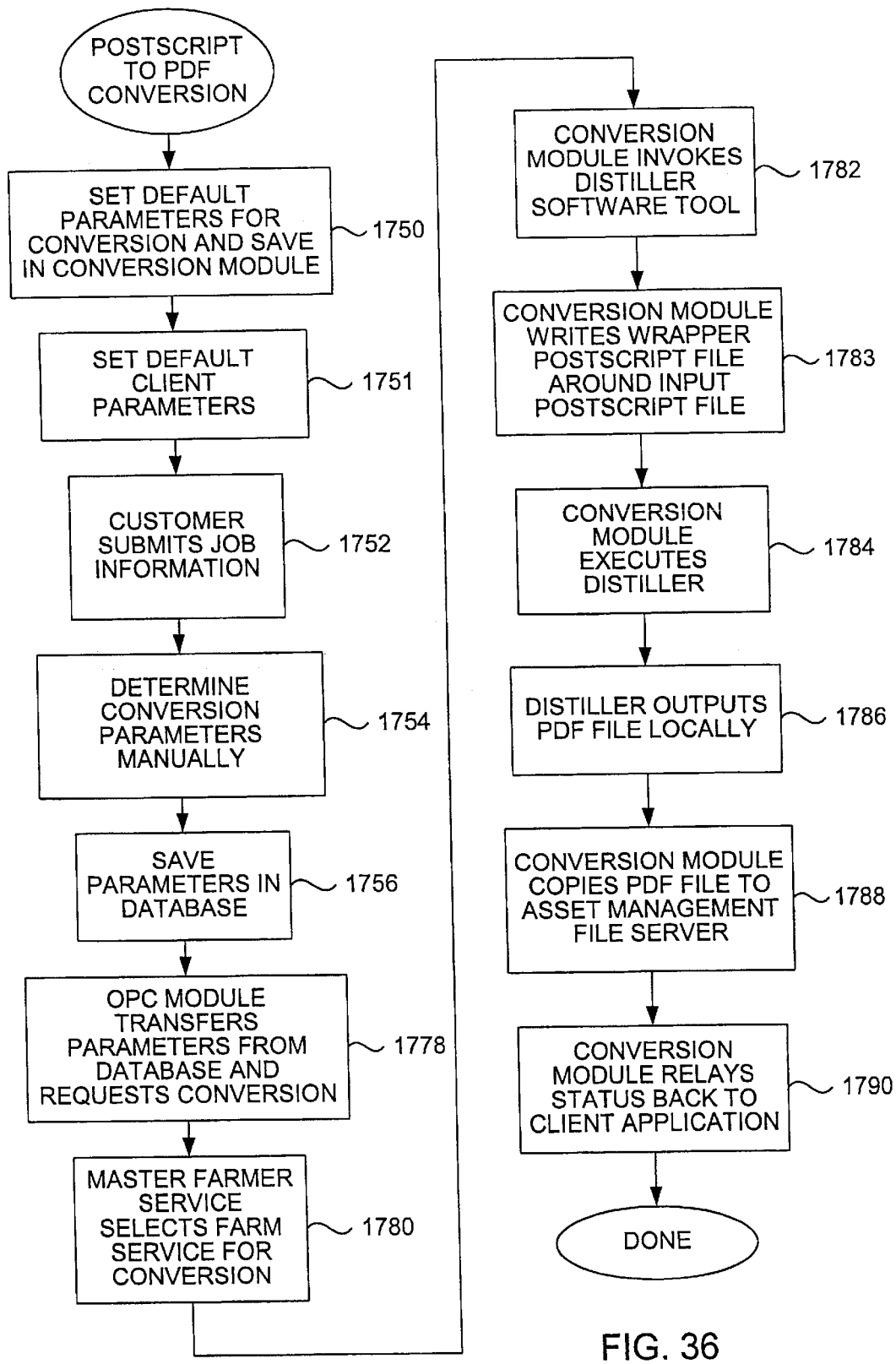
FIG. 36 is a flow diagram illustrating execution of an automated, hosted pre-press PostScript to PDF conversion application.

FIG. 36 is a flow diagram describing a process for initially setting up automated conversion and for executing a conversion. The following steps may occur at any time and in any order before conversion is actually executed. In a performed embodiment, they are implemented as follows. In step 1750 various default parameters that are desired to be the same for all conversion jobs are set and hardcoded into conversion module 1720. Preferably, these default parameters are compiled into the module during development. Examples of these hardcoded default parameters include temporary paths and Distiller executable location.

In step 1751 default parameters that depend upon the particular client are set. These are parameters that would have different values depending upon the client that is requesting the conversion. For example, if a color washing client application is requesting conversion from PostScript to PDF, it might set the parameter "Preserve OPI comments." Other client applications such as the on-line printing center (OPC) module or the plater would not preserve OPI comments in the context of proofing. The OPC and plater might set the parameter "Subset fonts." Other examples of parameters that may be set differently for different client applications include preserving halftones, auto rotation of pages, removal or preservation of transfer function information, downsampling values (dpi and bitdepth of color), embedding of fonts, and subsetting of fonts.

Once the above steps have finished, setup for conversion has been completed, and the system is ready to receive job-specific information from a customer in order to perform a conversion. In step 1752 a customer submits job specific information regarding a product to be printed. For example, a customer may be submitting information for business cards to be printed. Preferably, this step is implemented as described in step 904 of FIG. 13 and is performed using product setup module 409.

In step 1754 various of the conversion parameters for a specific job or for a particular line of products may be determined manually. Of course, the previously set default parameters may be relied upon and no additional parameters need be set in this step. If desired, though, either a representative from the customer or a representative from the entity implementing the on-line automated printing system may specify additional conversion parameters or may override various of the default parameters. These parameters may be entered using product setup module 409 or in another fashion. Examples of conversion parameters that may be set in this step include changing the dots per inch parameter from 300 to 72 (if there is a slow network connection and a faster turnaround is desired), subsetting of fonts if the conversion is for preview only, and preserving overprint settings to false if the conversion is for preview only. Examples of parameters that may be set are found below in Table 2. In step 1756 these additional conversion parameters are then saved into ILIAD 410.

TABLE 2

| Parameters and Sample Values Used | |
|---|---|
| ASCII85EncodePages | False |
| AutoRotatePages | 0 |
| CompatibilityLevel | 1.2 |
| LZWEncodePages | False |
| PreserveHalftoneInfo | False |
| PreserveOPIComments | False |
| PreserveOverprintSettings | False |
| TransferFunctionInfo | 0 |
| UCRandBGInfo | 1 |
| UseFlateCompression | True |
| AntiAliasColorImages | False |
| AutoFilterColorImages | True |
| ColorConversionStrategy | 0 |
| ColorImageDownsampleType | 0 |
| ColorImageFilter | 0 |
| ColorImageResolution | 3600 |
| ConvertCMYKImagesToRGB | True |
| ConvertImagesToIndexed | False |
| DownsampleColorImages | True |
| EncodeColorImages | True |
| AntiAliasGrayImages | False |
| AutoFilterGrayImages | True |
| DownsampleGrayImages | True |
| EncodeGrayImages | True |
| GrayImageDepth | −1 |
| GrayImageDownsampleType | 0 |
| GrayImageFilter | 0 |
| GrayImageResolution | Not Set |
| AntiAliasMonoImages | False |
| DownsampleMonoImages | True |
| EncodeMonoImages | True |
| MonoImageDepth | −1 |
| MonoImageDownsampleType | 0 |

TABLE 2-continued

| Parameters and Sample Values Used | |
|---|---|
| MonoImageFilter | 2 |
| MonoImageResolution | Not Set |
| EmbedAllfonts | True |
| SubsetFonts | True |
| MaxSubsetPct | 100 |

The following steps illustrate execution of an automated, hosted pre-press conversion application. It should be appreciated that any of a variety of client applications may request that automated conversion occur. Product setup module 409 may request automated conversion from PostScript to PDF to perform a dry run of plating, and for creating preview and thumbnail images for proofing. A color washing application may also request conversion of PostScript to PDF. The plater service 428 may also request conversion of PostScript to PDF for internal proofing. Other client applications that may request conversion include the OPC module which would convert PRF files to PDF for previewing.

The below example illustrates a scenario in which the client application on-line printing center 411 is requesting automated conversion in order to prepare a proof for a customer in PDF. Firstly, a customer interacts with web server 408 and orders a particular product. Preferably, this step is implemented as previously described in step 906 of FIG. 13. For example, a customer may access their custom web site to provide a particular name and title for a new business card to be printed for a new employee. The style for the business card, standard information and a company logo will have already been supplied during customer set up which is step 904 of FIG. 13. At this point in time, the customer interacts with on-line printing center (OPC) module 411 on web server 408 to request a proof of the product to be ordered in PDF.

In step 1778 the OPC module 411 requests conversion of a particular job by making a request of Master Farmer service 550. Concurrently, OPC module 411 transfers any manually set parameters, any parameters saved into ILIAD, and source and destination file names to Master Farmer service 550. Together this information is collectively referred to as conversion information.

In step 1780 the Master Farmer service selects a particular Farm service 552 to perform the conversion and transfers the conversion information. Master Farmer service 550 preferably makes this selection as previously described in FIGS. 8–11 and takes into account load balancing, the optimal module to perform the conversion, etc. In this step Farm service 552 also selects a particular conversion module 1720 to perform the conversion.

In step 1782 the conversion module invokes the Distiller software tool. In step 1783 the conversion module writes a wrapper PostScript file around the input PostScript file to be converted. The wrapper file is written using the conversion parameters passed from ILIAD 410, any parameters overridden manually by the client, and hardcoded parameters. An example of C code that may be used to produce a wrapper file using the Distiller API is found in Appendix D. In step 1784 the conversion module executes the Distiller software tool by sending the wrapper PostScript file to Distiller.

In step 1786 Distiller outputs the resultant PDF file to a local drive. In step 1788 the conversion module copies the PDF file 1722 to asset management file server 418. In step 1790 the conversion module relays completion status back through the requesting processes to the client application which in this case is OPC module 411. In other words, notice of completion is relayed to Farm service 552, to Master Farmer service 550, and eventually back to the requesting client application. During execution of the conversion, the conversion module looks at the Distiller status bar to determine status.

It should be noted that the requesting client application and each service involved in the chain is continuously polling a service farther down the chain for any status information throughout the conversion process. For example, once OPC module 411 requests a conversion of Master Farmer service 550 it continually polls the service for status. In turn, the Master Farmer is continually polling Farm service 552 for information regarding the status of the conversion being performed by conversion module 1720. Finally, conversion module 1720 continually sends back status information to Farm service 552 including the length of time estimated to be remaining for trapping, whether the trapping job has been placed in a Farm queue for processing, whether the job is running, whether the job is done, and whether the job has an error.

Once PDF file 1722 has been stored in asset management file server 418 the system has successfully performed automated, hosted conversion of a file and the PDF file may now be used by another prepress application for further processing.

PDF to Postscript Conversion Subsystem

The PDF to postscript conversion subsystem is further described in U.S. patent application Ser. No. 09/481,372, which is herein incorporated by reference.

Figure 37:
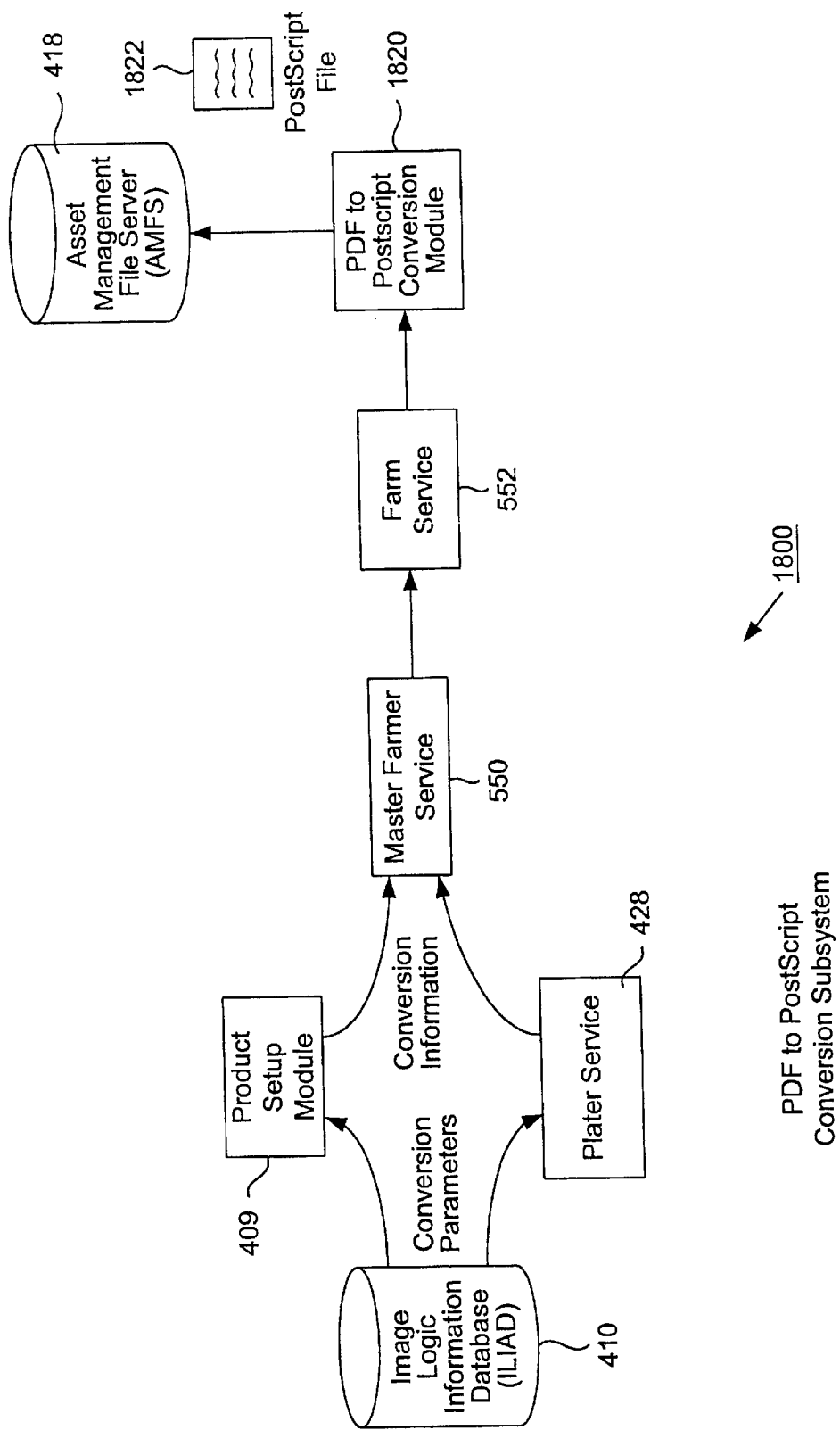
FIG. 37 is a block diagram illustrating a PDF to PostScript conversion subsystem according to one embodiment of the invention.

FIG. 37 is a block diagram illustrating a PDF to PostScript conversion subsystem 1800 according to one embodiment of the invention. Conversion subsystem 1800 provides an automated hosted environment to perform the pre-press application of converting a suitable PDF file to a resultant PostScript file 1822. Subsystem 1800 includes ILIAD 410 which includes conversion parameters for the job and a client application such as plater service 428 or product setup module 409 that wishes to perform automated conversion.

Any client application such as plater service 428 or product setup module 409 may make a conversion request of master farmer service 550, which is preferably implemented as described in FIGS. 8–11. Conversion parameters along with an input file and an output destination (conversion information) are relayed from the client application to master farmer service 550. Master farmer service 550 interacts with farm service 552 in order to request that conversion module 1820 perform a conversion of a particular job in order to produce PostScript file 1822 which is stored on AMFS 418.

Figure 38:
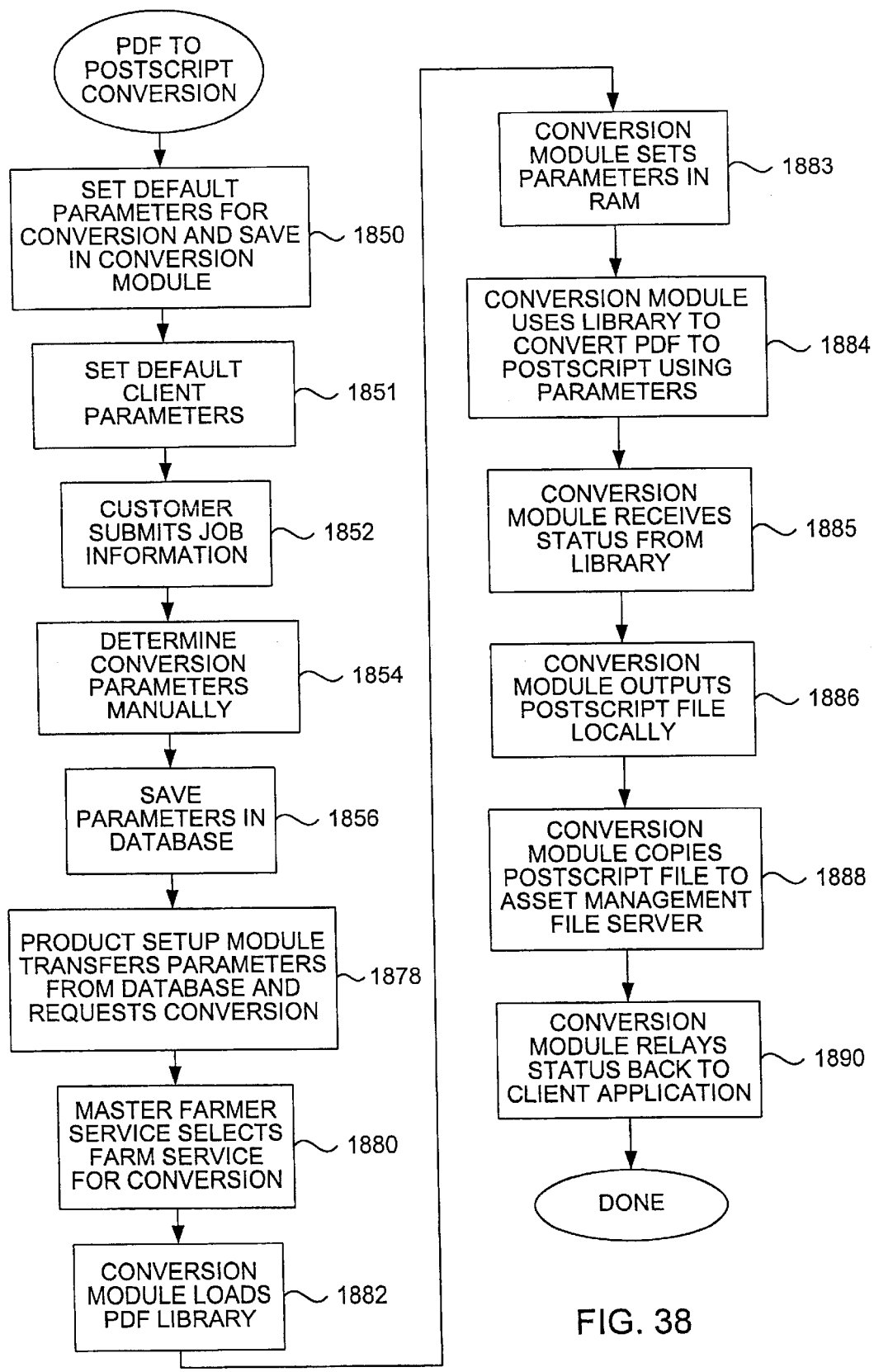
FIG. 38 is a flow diagram illustrating execution of an automated, hosted pre-press PDF to PostScript conversion application.

FIG. 38 is a flow diagram describing a process for initially setting up automated conversion and for executing a conversion. The following steps may occur at any time and in any order before conversion is actually executed. In a performed embodiment, they are implemented as follows. In step 1850 various default parameters that are desired to be the same for all conversion jobs are set and hardcoded into conversion module 1820. Preferably, these default parameters are compiled into the module during development. Examples of these hardcoded default parameters include emitHalftones, centerCropBox, emitPageRotation, emitTTFontsFirst, and emitDSC.

In step 1851 default parameters that depend upon the particular client are set. These are parameters that would have different values depending upon the client that is requesting the conversion. For example, the Plater could output Level 1 or Level 2 postscript (depending upon whether the target manufacturing partner supports Level 2 or not). By default, Level 1 would be chosen (as it is the lowest common denominator), however Level 2 could be output by modifying the psLevel and binaryOK parameters. In the case of washing, Level 1 PostScript would always be produced as washing seeks to convert an input PostScript file to the lowest common denominator.

Once the above steps have finished, setup for conversion has been completed, and the system is ready to receive job-specific information from a customer in order to perform a conversion. In step 1852 a customer submits job specific information regarding a product to be printed. For example, a customer may be submitting information for business cards to be printed. Preferably, this step is implemented as described in step 904 of FIG. 13 and is performed using product setup module 409.

In step 1854 various of the conversion parameters for a specific job or for a particular line of products may be determined manually. Of course, the previously set default parameters may be relied upon and no additional parameters need be set in this step. If desired, though, either a representative from the customer or a representative from the entity implementing the on-line automated printing system may specify additional conversion parameters or may override various of the default parameters. These parameters may be entered using product setup module 409 or in another fashion. Examples of conversion parameters that may be set in this step include changing font handling information for embedding fonts once per output PostScript file or once per PostScript page in the file. Examples of parameters used by the PDF library (either set manually or by default) are found below in Table 3.

TABLE 3

Parameters and Sample Values Used

| Parameters: | Sample Values used: |
|---|---|
| PsLevel | 1 |
| OutputType | PDOutput_EPSNoPrev (Adobe PDF library constant) |
| IncBaseFonts | KIncludeNever (Adobe PDF library constant) |
| IncEmbeddedFonts | KIncludeOncePerDoc (Adobe PDF library constant) |
| incType1Fonts | KIncludeOncePerDoc (Adobe PDF library constant) |
| IncTrueTypeFonts | KIncludeOncePerDoc (Adobe PDF library constant) |
| IncCIDFonts | KIncludeOncePerDoc (Adobe PDF library constant) |
| incType3Fonts | KIncludeOnEveryPage (Adobe PDF library constant) |
| IncProcsets | KIncludeOncePerDoc (Adobe PDF library constant) |
| IncOtherResources | KIncludeOncePerDoc (Adobe PDF library constant) |
| emitTTFontsFirst. | false |
| EmitShowpage | false |
| EmitDSC | true |
| SetupProcsets | true |
| EmitColorSeps | true |
| EmitRawData | false |
| BinaryOK | false |
| TTasT42 | true |
| Scale | 100.0 |
| EmitHalftones | true |
| CenterCropBox | true |
| EmitPageRotation | false |
| EmitSeparableImagesOnly (RGB color conversion) | true |
| EmitExtGState | true |

In step 1856 these additional conversion parameters are then saved into ILIAD 410.

The following steps illustrate execution of an automated, hosted prepress conversion application. It should be appreciated that any of a variety of client applications may request that automated conversion occur. A color washing application may request conversion of PDF to PostScript. The plater service 428 may also request conversion of PDF to PostScript for creating level 2 or level 3 PostScript. Other client applications that may request conversion include the plater service which would use it to output different levels of PostScript.

The below example illustrates a scenario in which the client application product setup module 409 is requesting automated conversion as part of color washing. Firstly, a customer interacts with web server 408 and orders a particular product. Preferably, this step is implemented as previously described in step 906 of FIG. 13. For example, a customer may access their custom web site to provide a particular name and title for a new business card to be printed for a new employee. The style for the business card, standard information and a company logo will have already been supplied during customer set up which is step 904 of FIG. 13. At this point in time, product setup module either automatically or at the direction of an internal employee requests color washing of the product to be ordered—which will generate a request for conversion from PDF to PostScript.

In step 1878 the product setup module 409 requests conversion of a particular job by making a request of Master Farmer service 550. Concurrently, product setup module 409 transfers any manually set parameters, any parameters saved into ILIAD, and source and destination file names to Master Farmer service 550. Together this information is collectively referred to as conversion information.

In step 1880 the Master Farmer service selects a particular Farm service 552 to perform the conversion and transfers the conversion information. Master Farmer service 550 preferably makes this selection as previously described in FIGS. 8–11 and takes into account load balancing, the optimal module to perform the conversion, etc. In this step Farm service 552 also selects a particular conversion module 1820 to perform the conversion.

In step 1882 the conversion module loads the PDF library. In step 1883 the module sets parameters in RAM for the PDF library to use. An example of C code that may be used to store parameters in RAM is found in Appendix E. In step 1884 the conversion module uses the PDF library to convert PDF to PostScript using the stored parameters. In step 1885 the conversion module receives status from the PDF library indicating that the conversion is complete. Status of jobs in process is done through use of the Windows API. First, the target PostScript file's output size is estimated. Second, a separate thread of execution is created for creating the target PostScript file. While the file is being written by the separate thread, the main thread polls the target PostScript file at short intervals, watching it being written. The main thread has an estimate of the size of the output file and updates status accordingly.

In step 1886 the conversion module outputs the resultant PostScript file to a local drive. In step 1888 the conversion module copies the PostScript file 1822 to asset management file server 418. In step 1890 the conversion module relays completion status back through the requesting processes to the client application which in this case is product setup module 409. In other words, notice of completion is relayed to Farm service 552, to Master Farmer service 550, and eventually back to the requesting client application. During execution of the conversion, the conversion module polls the output file to determine status.

It should be noted that the requesting client application and each service involved in the chain is continuously polling a service farther down the chain for any status information throughout the conversion process. For example, once product setup module 409 requests a conversion of Master Farmer service 550 it continually polls the service for status. In turn, the Master Farmer is continually polling Farm service 552 for information regarding the status of the conversion being performed by conversion module 1820. Finally, conversion module 1820 is continually sending back status information to Farm service 552 including the length of time estimated to be remaining for trapping, whether the trapping job has been placed in a Farm queue for processing, whether the job is running, whether the job is done, and whether the job has an error.

Once PostScript file 1822 has been stored in asset management file server 418 the system has successfully performed automated, hosted conversion of a file and the PostScript file may now be used by another pre-press application for further processing.

Automated, Hosted Prepress Applications

Figure 39:
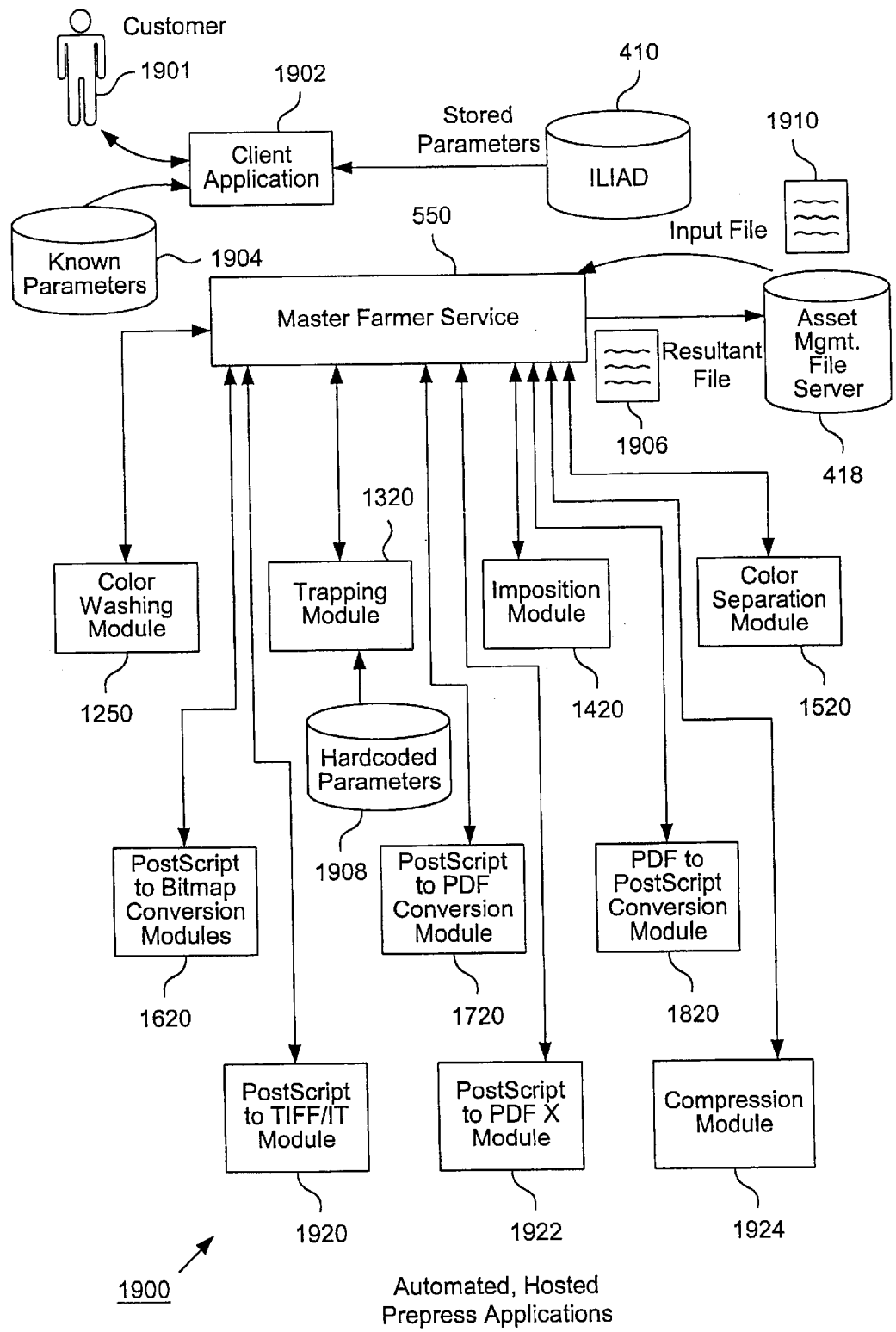
FIG. 39 illustrates automated, hosted prepress applications.

FIG. 39 is a block diagram 1900 of one technique by which any number of prepress application s may be hosted on a computer system. The above descriptions present embodiments in which various prepress applications are hosted and run automatically when requested. FIG. 39 illustrates a general view showing how any number of prepress applications can be hosted in a computer system and coordinated through the Master Farmer service 550. Additional server computers may be added should the load (demand for) on a particular prepress application be high.

Customer 1901 is a print customer, an internal employee of the entity implementing the system, or the system itself. Client application 1902 is any of the client applications described above herein such as plater service, product setup module, color washing subsystem, OPC module, etc., and may be any software application desiring processing of a file by any of the prepress applications available. Known parameters 1904 are built into the client application or specified by the customer upon request and provide fixed parameters that the client application wishes to use with the requested prepress application. Upon request, further parameters are pulled from ILIAD 410 that have been stored previously. These parameters may have been stored during a previous job, during customer setup, during product setup, etc. Use of these known parameters 1904, stored parameters from ILIAD 410 and any hardcoded parameters 1908 provide for consistent, standard processing of print jobs.

Upon request, Master Farmer service 550 requests processing of an input file 1910 stored on AMFS 418. This input file may be a Print Ready File, a regular PostScript file, a PDF file, a bitmap file, or any other suitable file that needs to be processed in the context of print production. Master Farmer service 550 then makes use of one of the listed modules shown to process the file and produce a resultant output file 1906 to be stored on AMFS 418. Details on how this processing may occur have been provided above. Parameters 1908 may also be hardcoded into each module (only shown with trapping module 1320, but may be hardcoded into each module) at compile time to provide standard values that the developers wish to have incorporated into each module. Examples of desired types of hardcoded parameters have been provided above.

A wide variety of other types of modules may be hosted within the above-described system to provide further automated, hosted functionality. For example, PostScript to TIFF/IT module 1920 provides RIP processing of a PostScript file. PostScript to PDFxx module 1922 may be used to convert a file to any version of PDF now or later available. Compression module 1924 may be used to compress a file using a program such as DynaZip and the like.

Thus, system 1900 illustrates the capability to host a multitude of prepress applications that may be called by any of a variety of client applications for use within a printing environment. The system is automated which provides speed, is highly scalable to allow for heavy use of particular modules, and produces consistent results.

Alternative Embodiments

In the preferred implementation, a PostScript file format is altered and used to store additional information about a product which allows the system to use that file in all stages of the production process. Alternate implementations may use a different file format to achieve this goal. For example, the system might use the Portable Document Format (PDF) to store this information. PDF is similar to PostScript in many respects, and could easily be modified to fulfill the objectives of the present invention. Other file formats that may be used are Windows Metafile, or PDF/X. Also, while use of level 1 PostScript has been described above, level 2 and/or level 3 (and/or subsequent versions) of PostScript might similarly be used. Moreover, a Print Ready File described herein may be implemented in other similar language such as PDF.

Computer System Embodiment

Figure 40A:
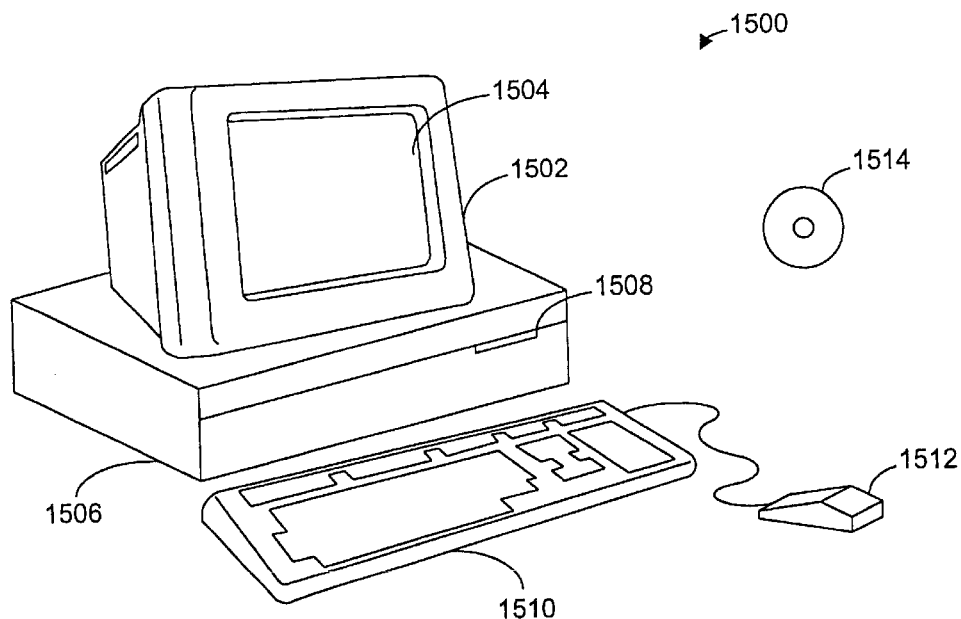
FIGS. 40A and 40B illustrate a computer system suitable for implementing embodiments of the present invention.
Figure 40B:
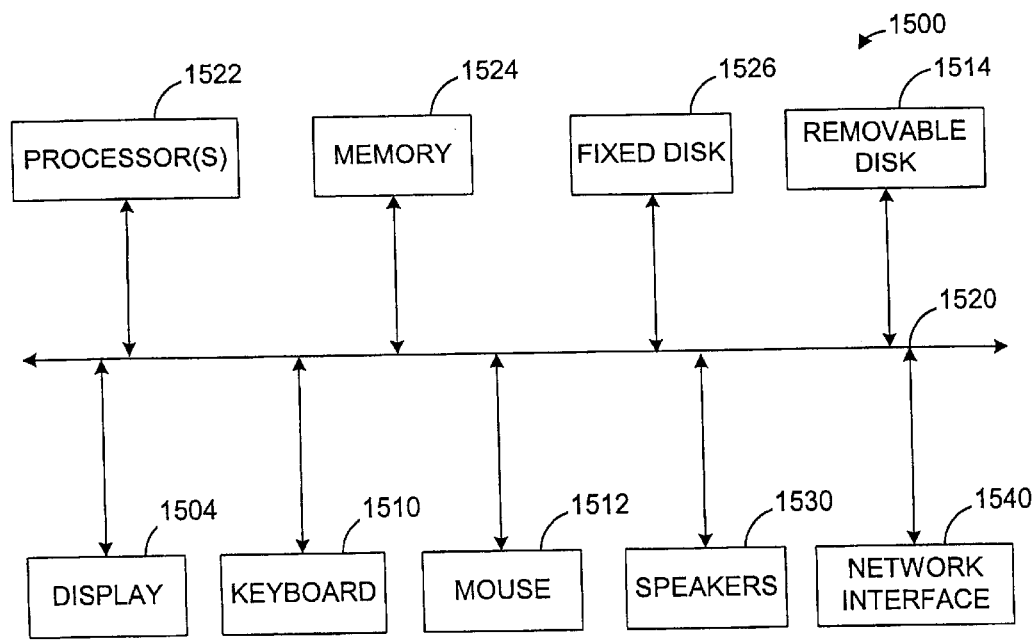

FIGS. 40A and 40B illustrate a computer system 900 suitable for implementing embodiments of the present invention. FIG. 40A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 40B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of processing of a file within an automated system, said method comprising:

storing said file in a first database in communication with said automated system;

storing one or more parameters in a second database;

requesting of a prepress software module that processing of said file be performed;

retrieving automatically said one or more parameters from said second database;

transferring said one or more parameters to a prepress software tool;

executing said prepress software tool, said software tool automatically performing prepress processing of said file using said one or more parameters without user intervention; and outputting the resulting file from said prepress software tool, whereby prepress processing of said file is performed automatically.

2. A method as recited in claim 1, wherein at least one of said one or more parameters are entered manually.

3. A method as recited in claim 1, wherein said prepress software tool can perform color washing, trapping, imposition, color separation, postscript-to-bitmap conversion, postscript-to-PDF conversion, PDF-to-postscript conversion, PostScript-to-TIFF/IT conversion, postscript-to-PDFX conversion, or compression.

4. A method as recited in claim 1, further comprising:
setting one or more default parameters for processing of said file, thereby allowing said default parameters to be set differently for various clients that make requests.

5. A method as recited in claim 1, wherein said step of executing further comprises:
initializing said prepress software tool, thereby allowing said prepress software tool to be executed automatically in said automated system.

6. A method as recited in claim 1, further comprising:
requesting of a service that prepress processing of said file be performed.

7. A method as recited in claim 6, wherein said service is a master service.

8. A method as recited in claim 1, wherein said step of executing is performed under control of said prepress software module.

9. A method as recited in claim 1,
wherein said automated system is an automated printing system for producing printed materials and said resulting file is used to produce said printed materials; and
where said file includes instructions for printing printed materials.

10. A method of processing a file within an automated system, said method comprising:
storing said file in a first database in communication with said automated system;
storing one or more parameters in a second database;
requesting of a service that processing of said file be performed;
requesting of a prepress software module that processing of said file be performed;
retrieving automatically said one or more parameters from said second database;
transferring said one or more parameters to a prepress software tool;
executing said prepress software tool, said prepress software tool automatically performing processing of said file using said one or more parameters without user intervention;
outputting said file from said prepress software tool, whereby processing of said file is performed automatically;
setting one or more default parameters for processing of said file, thereby allowing said default parameters to be set differently for various clients that make requests;
wherein said one or more parameters are automatically provided to said prepress software tool from said prepress software module, thereby allowing said prepress software tool to be executed without user intervention; and
wherein said step of executing further comprises initializing said prepress software tool, thereby allowing said prepress software tool to be executed automatically in said automated system.

11. A method as recited in claim 10, wherein said prepress software tool performs color washing, trapping, imposition, color separation, postscript-to-bitmap conversion, postscript-to-PDF conversion, PDF-to-postscript conversion, PostScript-to-TIFF/IT conversion, postscript-to-PDFX conversion, or compression.

12. A method as recited in claim 10,
wherein said automated system is an automated printing system for producing printed materials and said resulting file is used to produce said printed materials, and
where said file includes instructions for printing materials.

* * * * *